(12) United States Patent
Archer et al.

(10) Patent No.: US 12,031,007 B2
(45) Date of Patent: Jul. 9, 2024

(54) FOAM ARTICLE WITH ENHANCED PROPERTIES

(71) Applicant: NIKE, Inc., Beaverton, OR (US)

(72) Inventors: Paul Irving Archer, Portland, OR (US); Hossein Allen Baghdadi, Portland, OR (US); Jay Constantinou, Portland, OR (US); Sami Mohamad Fakhouri, Portland, OR (US); Floyd Whitney Miles, Beaverton, OR (US); Joseph Thomas Muth, North Plains, OR (US); Bradley C. Tutmark, Aloha, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 18/203,289

(22) Filed: May 30, 2023

(65) Prior Publication Data

US 2023/0407033 A1     Dec. 21, 2023

Related U.S. Application Data

(63) Continuation of application No. 17/195,161, filed on Mar. 8, 2021, now Pat. No. 11,702,527.
(Continued)

(51) Int. Cl.
*C08J 9/12* (2006.01)
*A43B 1/14* (2006.01)
(Continued)

(52) U.S. Cl.
CPC .................. *C08J 9/12* (2013.01); *A43B 1/14* (2013.01); *A43D 119/00* (2013.01);
(Continued)

(58) Field of Classification Search
CPC ...... C08J 9/12; C08J 2367/00; C08J 2467/00; C08J 2203/06; C08J 2203/08;
(Continued)

(56) References Cited

U.S. PATENT DOCUMENTS 3,447,251 A     6/1969   Drexler
3,682,579 A     8/1972   Hujik
(Continued)

FOREIGN PATENT DOCUMENTS

CA      2462150 A1      4/1999
CN     102167840 A      8/2011
(Continued)

OTHER PUBLICATIONS

Rodriguez-Perez et al., "Mechanical Behaviour at Low Strains of LDPE Foams with Cell Sizes in the Microcellular Range: Advantages of Using These Materials in Structural Elements", Cellular Polymers, vol. 27 No. 6, available online at: <https://www.researchgate.net/publication/43945663>, Nov. 2008, pp. 347-362.
Extended European Search Report received for European Patent Application No. 23172527.6, dated Aug. 30, 2023, 5 pages.
Extended European Search Report received for European Patent Application No. 23178056.0, dated Aug. 30, 2023, 8 pages.
(Continued)

*Primary Examiner* — K. Boyle
(74) *Attorney, Agent, or Firm* — Shook, Hardy & Bacon L.L.P.

(57) ABSTRACT

A foam article, such as a cushioning element for an article of footwear, apparel or sporting equipment is provided that comprises a foam component, such as a midsole, having a number of beneficial physical characteristics. The cushioning element is a low-density foamed component with a surface skin that encases the remaining foam volume. The cushioning element has a number of foam volumes, arranged to achieve a more consistent foam component. Additionally, the cushioning element includes a series of concentric ridges extending radially outwardly from injection gate vestige locations, and a number of striation bands
(Continued)

near the perimeter of the cushioning element. The location of the gate vestiges can be beneficially arranged to produce intersecting flow boundaries that are located away from key strain areas of the cushioning element. The cushioning element is more environmentally-friendly, requiring less energy to produce while still providing acceptable energy return and low density.

20 Claims, 16 Drawing Sheets

Related U.S. Application Data

(60) Provisional application No. 63/137,872, filed on Jan. 15, 2021, provisional application No. 63/071,393, filed on Aug. 28, 2020, provisional application No. 63/042,324, filed on Jun. 22, 2020, provisional application No. 62/987,648, filed on Mar. 10, 2020, provisional application No. 62/987,227, filed on Mar. 9, 2020, provisional application No. 62/987,329, filed on Mar. 9, 2020, provisional application No. 62/987,224, filed on Mar. 9, 2020.

(51) Int. Cl.
*A43D 119/00* (2006.01)
*B25J 15/00* (2006.01)
*B29C 44/10* (2006.01)
*B29C 44/58* (2006.01)
*B29C 44/60* (2006.01)
*B29C 45/00* (2006.01)
*B29C 45/04* (2006.01)
*B29C 45/78* (2006.01)
*B29D 35/00* (2010.01)
*B29D 35/08* (2010.01)
*B29D 35/12* (2010.01)
*B29D 35/14* (2010.01)
*G06K 19/04* (2006.01)
*B29K 21/00* (2006.01)
*B29K 67/00* (2006.01)
*B29K 105/04* (2006.01)
*B29L 31/50* (2006.01)

(52) U.S. Cl.
CPC ......... *B25J 15/0019* (2013.01); *B29C 44/105* (2013.01); *B29C 44/58* (2013.01); *B29C 44/60* (2013.01); *B29C 45/0001* (2013.01); *B29C 45/04* (2013.01); *B29C 45/78* (2013.01); *B29D 35/0036* (2013.01); *B29D 35/0045* (2013.01); *B29D 35/081* (2013.01); *B29D 35/122* (2013.01); *B29D 35/128* (2013.01); *B29D 35/148* (2013.01); *G06K 19/045* (2013.01); B29C 2945/76531 (2013.01); B29C 2945/76752 (2013.01); B29K 2021/003 (2013.01); B29K 2067/00 (2013.01); B29K 2105/04 (2013.01); B29L 2031/50 (2013.01); B29L 2031/504 (2013.01); C08J 2367/00 (2013.01); C08J 2467/00 (2013.01)

(58) Field of Classification Search
CPC .............. C08J 2205/044; C08J 2300/30; C08J 2400/30; C08J 9/0061; C08J 9/122; C08J 9/34; A43B 1/14; A43B 13/187; A43B 1/0063; A43B 13/02; A43D 119/00; B25J 15/0019; B29C 44/105; B29C 44/58; B29C 44/60; B29C 45/0001; B29C 45/04; B29C 45/78; B29C 2945/76531; B29C 2945/76752; B29C 44/10; B29C 44/42; B29C 44/424; B29C 44/428; B29C 44/427; B29D 35/0036; B29D 35/0045; B29D 35/081; B29D 35/122; B29D 35/128; B29D 35/148; B29D 35/061; B29D 35/0018; G06K 19/045; B29K 2021/003; B29K 2067/00; B29K 2105/04; B29L 2031/50; B29L 2031/504; Y02P 70/62; Y02W 30/62

See application file for complete search history.

(56) References Cited

U.S. PATENT DOCUMENTS

| | | | |
|---|---|---|---|
| 3,871,806 A | 3/1975 | Leunig | |
| 3,891,362 A | 6/1975 | Devita | |
| 4,372,525 A | 2/1983 | Uhlig | |
| 5,288,451 A | 2/1994 | Schad | |
| 6,007,748 A | 12/1999 | Krajcir | |
| 6,146,423 A | 11/2000 | Cohen et al. | |
| 6,266,897 B1* | 7/2001 | Seydel | A43B 13/16 36/25 R |
| 6,599,597 B1 | 7/2003 | Bonk et al. | |
| 6,688,956 B1 | 2/2004 | Yokley et al. | |
| 8,869,430 B2 | 10/2014 | Chao et al. | |
| 9,021,720 B2 | 5/2015 | Hazenberg et al. | |
| 9,956,732 B2 | 5/2018 | Murphy et al. | |
| 10,383,396 B1 | 8/2019 | Malinowski et al. | |
| 10,448,704 B2 | 10/2019 | Dupre et al. | |
| 2001/0023510 A1 | 9/2001 | Masubuchi | |
| 2003/0071386 A1 | 4/2003 | Lilienthal et al. | |
| 2005/0037104 A1 | 2/2005 | Kao et al. | |
| 2006/0046004 A1 | 3/2006 | Ekart et al. | |
| 2006/0082009 A1 | 4/2006 | Quail et al. | |
| 2006/0082010 A1 | 4/2006 | Quail | |
| 2008/0175942 A1 | 7/2008 | Chi-jin | |
| 2008/0193585 A1 | 8/2008 | Glaesener et al. | |
| 2010/0242312 A1 | 9/2010 | Lim et al. | |
| 2012/0052143 A1 | 3/2012 | Chen et al. | |
| 2012/0137449 A1 | 6/2012 | Ransom et al. | |
| 2012/0196115 A1 | 8/2012 | Choe et al. | |
| 2014/0179818 A1 | 6/2014 | Takashima et al. | |
| 2014/0259801 A1 | 9/2014 | Grondin | |
| 2014/0265016 A1 | 9/2014 | Nguyen et al. | |
| 2015/0047775 A1 | 2/2015 | Ginns et al. | |
| 2015/0174803 A1* | 6/2015 | Newman | B29C 45/14811 264/40.1 |
| 2015/0298413 A1 | 10/2015 | Yang | |
| 2016/0039162 A1 | 2/2016 | Murphy et al. | |
| 2016/0144546 A1 | 5/2016 | Song et al. | |
| 2016/0318267 A1 | 11/2016 | Koiso et al. | |
| 2017/0203529 A1 | 7/2017 | Wu | |
| 2018/0065287 A1 | 3/2018 | Park et al. | |
| 2018/0133943 A1 | 5/2018 | Aiba et al. | |
| 2018/0147752 A1 | 5/2018 | Nürnberg et al. | |
| 2018/0213886 A1 | 8/2018 | Connell et al. | |
| 2019/0073709 A1 | 3/2019 | Hayes et al. | |
| 2019/0276626 A1 | 9/2019 | Baghdadi | |
| 2019/0351592 A1 | 11/2019 | Falken | |
| 2019/0366590 A1 | 12/2019 | Farris et al. | |
| 2021/0031474 A1 | 2/2021 | Tsai et al. | |
| 2021/0276293 A1 | 9/2021 | Allen et al. | |
| 2021/0276294 A1 | 9/2021 | Baghdadi | |
| 2021/0277199 A1 | 9/2021 | Irving et al. | |
| 2021/0354345 A1 | 11/2021 | Archer et al. | |
| 2021/0354349 A1 | 11/2021 | Archer et al. | |

FOREIGN PATENT DOCUMENTS

| | | |
|---|---|---|
| CN | 106182664 A | 12/2016 |
| CN | 107415131 A | 12/2017 |
| CN | 108115946 A | 6/2018 |
| CN | 106696198 B | 10/2018 |
| DE | 3145346 A1 | 5/1983 |
| DE | 3319967 A1 | 12/1984 |
| DE | 3723830 A1 | 1/1989 |
| DE | 4022778 A1 | 1/1992 |

(56) References Cited

FOREIGN PATENT DOCUMENTS

| | | | |
|---|---|---|---|
| EP | 1166991 | A2 | 1/2002 |
| EP | 1266928 | A1 | 12/2002 |
| EP | 3025844 | A1 | 6/2016 |
| EP | 3326774 | A1 | 5/2018 |
| IT | 201700072079 | A1 | 12/2018 |
| JP | 5-104583 | A | 4/1993 |
| JP | H05104583 | A | 4/1993 |
| JP | 8-207188 | A | 8/1996 |
| JP | 2002-355872 | A | 12/2002 |
| JP | 2004-314625 | A | 11/2004 |
| JP | 2009-190251 | A | 8/2009 |
| KR | 10-0757966 | B1 | 9/2007 |
| TW | I256961 | B | 6/2006 |
| TW | 200922769 | A | 6/2009 |
| TW | 201512262 | A | 4/2015 |
| TW | 201902666 | A | 1/2019 |
| WO | 02/38674 | A2 | 5/2002 |
| WO | 2016/022829 | A1 | 2/2016 |
| WO | 2016/077820 | A1 | 5/2016 |
| WO | 2017/202840 | A1 | 11/2017 |
| WO | 2018/222714 | A1 | 12/2018 |
| WO | 2018/222968 | A1 | 12/2018 |
| WO | 2019/101375 | A1 | 5/2019 |
| WO | 2019/236500 | A1 | 12/2019 |

OTHER PUBLICATIONS

Extended European Search Report received for European Patent Application No. 23179009.8, dated Aug. 31, 2023, 7 pages.
Notice of Allowance received for U.S. Appl. No. 17/194,812, dated Aug. 23, 2023, 7 pages.
Notice of Allowance received for U.S. Appl. No. 17/194,815, dated Aug. 23, 2023, 8 pages.
Intention to Grant received for European Patent Application No. 21715396.4, dated Dec. 6, 2023, 7 pages.
Office Action received for European Patent Application No. 21714773.5, dated Nov. 6, 2023, 6 pages.
Office Action received for European Patent Application No. 21715087.9, dated Dec. 5, 2023, 5 pages.
Office Action received for European Patent Application No. 21715095.2, dated Nov. 6, 2023, 5 pages.
1 Notice of Allowance received for U.S. Appl. No. 17/195,067, dated Sep. 15, 2023, 10 pages.
Non-Final Office Action received for U.S. Appl. No. 18/203,309, mailed on Jan. 3, 2024, 6 pages.
Office Action received for European Application No. 21715711.4, mailed on Dec. 14, 2023, 5 pages.
Office Action received for European Application No. 22196248.3, mailed on Dec. 21, 2023, 4 pages.

* cited by examiner

FOAM ARTICLE WITH ENHANCED PROPERTIES

CROSS-REFERENCE TO RELATED APPLICATIONS

This application, titled "Foam Article with Enhanced Properties," is a continuation of U.S. Non-Provisional patent application Ser. No. 17/195,161, filed Mar. 8, 2021, and titled "Foam Article with Enhanced Properties, which claims priority to U.S. Provisional Patent Application No. 62/987,329, filed Mar. 9, 2020, and titled "Foam Article with Enhanced Properties" and to U.S. Provisional Patent Application No. 62/987,648, filed Mar. 10, 2020, and titled "Foam Article with Enhanced Properties" and to U.S. Provisional Patent Application No. 62/987,227, filed Mar. 9, 2020, and titled "Injection Molding System and Tooling" and to U.S. Provisional Patent Application No. 63/137,872, filed Jan. 15, 2021, and titled "Injection Molding System and Tooling" and to U.S. Provisional Patent Application No. 62/987,224, filed Mar. 9, 2020, and titled "Footwear Component Manufacturing System and Methods" and to U.S. Provisional Patent Application No. 63/042,324, filed Jun. 22, 2020, and titled "Manufacturing Processes and Systems for Forming Footwear Soles Using Recycled Thermoplastic Copolyester Recyclate" and to U.S. Provisional Patent Application No. 63/071,393, filed Aug. 28, 2020, and titled "Manufacturing Processes and Systems for Forming Footwear Soles Using Recycled Thermoplastic Copolyester Recyclate." These applications are assigned to the same entity as the present application, and are incorporated herein by reference in the entirety.

STATEMENT REGARDING FEDERALLY SPONSORED RESEARCH OR DEVELOPMENT

Not applicable.

TECHNICAL FIELD

The present invention relates to a foam article, such as a cushioning element, such as a midsole for an article of footwear, having a number of enhanced properties.

BACKGROUND

Foam articles, such as cushioning elements can be used in an article of footwear, apparel or sporting equipment. An article of footwear may be designed to accommodate a foot of a wearer performing various activities. One component of such articles of footwear is a cushioning element, such as a midsole. The midsole provides cushioning, stability and/or structure to the article of footwear.

SUMMARY

This Summary is provided to introduce a selection of concepts in a simplified form that are further described below in the Detailed Description. This Summary is not intended to identify key features or essential elements of the claimed subject matter, nor is it intended to be used as an aid in determining the scope of the claimed subject matter. The present invention is defined by the claims.

At a high level, aspects herein relate to a foam article, such as a cushioning element for an article of footwear, apparel or sporting equipment. In some aspects, the article comprises a physically foamed, injection molded component, such as a midsole, having a number of beneficial physical characteristics. In some aspects, the physically foamed article is the product of foaming a thermoplastic elastomer material using a physical foaming agent, or a combination of a physical forming agent and a chemical agent. In some aspects, the article comprises a foam component, wherein the foam component has a foam volume, wherein the foam volume includes a foam core and an integrally-formed skin that encases the foam core, wherein both the foam core and the skin comprise a single thermoplastic elastomer material. Optionally, the foam core can comprise a plurality of integrally formed and connected foam sub-volumes. These foam sub-volumes can form a series of integrally formed and connected portions of foam in the core, and a series of concentric ridges on the exterior surface of the skin, typically which appear to extend radially outward from an injection gate vestige location. Striation bands may appear on the exterior surface of the skin, particularly near the perimeter of the foam article. The foam core (including its sub-volumes and portions of foam) can have an open-cell structure or a closed-cell structure. Additional components, such as solid molded components, can optionally be combined with the foam component to form an article such as a sole structure for an article of footwear. The article has a number of contiguous and integrated foam sub-volumes, designed to achieve a more consistent foam component with fewer, and/or smaller, foam defects. The ridges and striation bands may be structurally advantageous. The location of the gate vestiges can be beneficially designed to produce flow fronts or boundaries, between and coupling adjacent foam sub-volumes, that are located away from key strain areas of the article. In other aspects, the article is more environmentally-sustainable, requiring less energy to produce while still providing good energy return and low density.

At a high level, aspects herein relate to a foamed article, such as cushioning element for an article of footwear, apparel or sporting equipment. The article comprises a foamed component, such as a midsole, having a foamed article volume comprising a plurality of foam sub-volumes, with one injection gate vestige for each foam sub-volume. Each foam sub-volume has a corresponding aspect ratio greater than 2.7.

Other aspects herein relate to a foamed article, such as a cushioning element for an article of footwear, apparel or sporting equipment. The article comprises a foamed component, such as a midsole, the component comprising a foamed article volume comprising a plurality of foam sub-volumes each having one gate vestige of a plurality of gate vestiges. The component further includes a gate vestige axis extending between a first gate vestige of the plurality of gate vestiges and a second gate vestige of the plurality of gate vestiges, wherein at least a third gate vestige of the plurality of gate vestiges is offset from the gate vestige axis.

Other aspects herein relate to a foam article, such as a cushioning element for an article of footwear, apparel or sporting equipment. The article comprises a foamed component, such as a midsole, the component having a foamed article volume comprising a plurality of foam sub-volumes, the component further comprising one injection gate vestige at an outward-facing surface of each foam sub-volume, wherein a plurality of ridges on the outward-facing surface extend radially outwardly from an injection gate vestige of at least one of the plurality of foam sub-volumes. In some aspects, the plurality of ridges form a series of concentric circles.

Other aspects herein relate to a foam article, such as a cushioning element for an article of footwear, apparel or sporting equipment. The article comprises a foamed component, such as a midsole, the component comprising a profile defined by an outer side wall, the component having a top surface and a bottom surface, and an outer perimeter edge at the intersection of the outer side wall and the top surface, the top surface having a plurality of striation bands extending inwardly from the outer perimeter edge.

Other aspects herein relate to a foam article, such as a cushioning element for an article of footwear, apparel or sporting equipment. The article comprises a foamed component, the component comprising a profile defined by an outer side wall, the component having a top surface and a bottom surface, and an outer perimeter edge at the intersection of the outer side wall and the top surface, wherein at least one of the outer side wall, the top surface and the bottom surface have a substantially solid surface skin with a thickness of between 0.3 millimeters and 1.0 millimeters.

Other aspects herein relate to a foam article, such as a cushioning element for an article of footwear, apparel or sporting equipment. The article comprises a foamed component having a ratio of energy efficiency to energy intensity (EE/EI) greater than 1.5. In other aspects, the article comprises a physically foamed component having a ratio of energy efficiency to the product of energy intensity and density (EE/EI*$\rho$) value greater than 7. In other aspects, the article comprises a foamed component having a ratio of energy return to energy intensity (ER/EI) greater than 8,500. In other aspects, the article comprises a foamed component having a ratio of energy return to the product of the energy intensity and the density, ER/(EI*$\rho$) greater than 45,000.

Also presented herein are manufacturing systems, processes and control logic for forming foamed thermoplastic polymer articles incorporating recycled thermoplastic materials, methods for operating such systems, shoe structure segments fabricated from such articles, and footwear assembled with such segments. In a general sense, the present technology enables the waste from an injection molding operation (e.g., runner waste, flashing, reused foam, etc.) to be reincorporated/integrated into a subsequently formed midsole such that the net waste from the molding operation is greatly reduced and/or eliminated. By way of example, there is presented a manufacturing process for fabricating a single-piece foamed midsole of an athletic shoe using scrap and/or waste (collectively "recycled") thermoplastic, such as a regrind thermoplastic polyester elastomer (TPE-E) composition. The midsole is a foam component with a foam volume, which includes a foam core and an integrally formed skin that encases the foam core.

In an injection molding application, spent scrap and waste thermoplastic material, such as foamed and/or unfoamed TPE-E composition, is ground into granular form and mixed into a composition containing virgin polymer. The mixture of ground/pelletized recycled material and virgin material is heated into a polymer melt composition, which is then passed, under pressure, through an injection barrel. While in the injection barrel, a supercritical fluid (SCF), such as supercritical nitrogen or supercritical carbon dioxide, may be injected into the polymer melt composition contained in the barrel, where the SCF dissolves in the melt to form a molten single-phase solution (SPS). The injection molding system foams and molds the ground virgin and recycled polymer using a microcellular molding process in which the SCF is employed as a physical blowing agent. The SPS may then be flowed into the mold cavity, at which point system conditions are modulated to activate transition of the SCF to a gas (e.g., nucleation to a gas) and the polymer to solidify. This transition of the polymer composition in the mold cavity may cause the polymer composition to expand (e.g., by foaming) to fill the mold cavity and, once solidified, retain the shape of the foam polymer product. The tooling and components of the injection molding system, as well as the calibrated parameters for operating the molding system, may be specifically tailored to mold foamed polymer articles using recycled TPE-E composition. Recombination of regrind and virgin polymer material may occur, as mentioned above, inside an injection barrel via a dry blend process; alternatively, regrind and virgin material recombination may occur on a separate extrusion line and, once combined, the pre-blended pellets may then be fed into the injection molder.

Aspects of this disclosure are also directed to manufacturing systems and processes for fabricating footwear, apparel, and sporting goods from scrap and waste plastic. In an example, a method is presented for manufacturing foamed polymer articles from recycled TPE-E or TPE-E composition. This representative method includes, in any order and in any combination with any of the above or below disclosed features and options: inputting a batch of recycled thermoplastic polyester elastomer composition; grinding the recyclate batch into a ground recyclate material; combining a metered amount of the ground recyclate material with ground or pelletized virgin thermoplastic polyester elastomer composition into a mixed batch, the metered amount being about 20% by mass or less of a total mass of the mixed batch; melting the mixed batch into a polymer melt composition; adding a physical foaming agent to the polymer melt composition; injecting the polymer melt composition with the physical foaming agent into an internal cavity of a mold tool; forming the foamed polymer article by activating the physical foaming agent such that the physical foaming agent causes the polymer melt composition to expand and fill the mold tool's internal cavity; and extracting the foamed polymer article from the mold tool.

In another example, a method of manufacturing a foamed polymer article includes, in any order and in any combination with the above and/or below concepts: grinding a recyclate batch of recycled thermoplastic polyester elastomer composition into a ground recyclate material; combining a metered amount of the ground recyclate material and a virgin polymer material of virgin thermoplastic polyester elastomer composition into a mixed batch; melting the ground recyclate material and the virgin polymer material into a polymer melt composition; adding a physical foaming agent to the polymer melt composition; injecting the polymer melt composition with the physical foaming agent into an internal cavity of a mold tool; activating the physical foaming agent such that the physical foaming agent causes the polymer melt composition to expand and fill the internal cavity of the mold tool to form the foamed polymer article; and removing the formed foamed polymer article from the mold tool.

In yet another example, a method of manufacturing a foamed polymer article includes, in any order and in any combination with the above and/or below concepts: adding a physical foaming agent to a polymer melt composition, the polymer melt composition including a blend of a recyclate polymer material and a virgin polymer material, both of virgin thermoplastic polyester elastomer compositions, the recyclate polymer material being about 20% by mass or less of a total mass of the polymer melt composition; injecting the polymer melt composition with the physical foaming agent into an internal cavity of a mold tool; activating the physical foaming agent such that the physical foaming agent causes the polymer melt composition to expand and fill the internal cavity of the mold tool to form the foamed polymer article; and removing the formed foamed polymer article from the mold tool.

Further aspects of this disclosure are directed to control logic and algorithms for operating manufacturing systems that fabricate footwear, apparel, and sporting goods from scrap and waste plastic. In an example, a method is presented for operating a manufacturing system to reduce waste during production of a foamed polymer article, such as a sole component of a shoe. This representative method includes, in any order and in any combination with any of the above or below disclosed features and options: injecting a mixed thermoplastic composition resin into a mold, the mixed thermoplastic composition resin including a mixture of virgin thermoplastic composition resin and recycled thermoplastic composition resin, and the mold comprising an internal mold cavity that is fluidly connected to one or more filling portions, such as a sprue, runner, and/or gate; and foaming the mixed thermoplastic composition resin within the internal mold cavity to form the foamed polymer article. In this method, the mass of the recycled thermoplastic composition resin within the internal mold cavity is greater than or equal to a mass of the mixed thermoplastic composition resin within the filling portion of the mold. As such, it may be possible for the entirety of thermoplastic composition within the filling portion of the mold to be fully incorporated into subsequently formed soles.

In another example, a method of reducing waste during production of a foamed sole component of a shoe includes, in any order and in any combination with any of the above or below disclosed features and options: injecting a mixed thermoplastic composition resin into a mold, the mixed thermoplastic composition resin comprising a mixture of a virgin thermoplastic composition resin and a recycled thermoplastic composition resin, and the mold comprising a sole cavity portion fluidly coupled to a filling portion; and foaming the mixed thermoplastic composition resin within the sole cavity portion to form the foamed sole component of the shoe, wherein a mass of the recycled thermoplastic composition resin within the sole cavity portion is greater than or equal to a mass of the mixed thermoplastic composition resin within the filling portion.

Further aspects of the present disclosure are directed to sporting goods, apparel, footwear, and segments of footwear fabricated from any of the disclosed processes and materials. For instance, an article of footwear, such as an athletic shoe, includes an upper that receives and attaches to the user's foot. A single-piece or multilayered sole structure, which is attached to a lower portion of the upper, supports thereon the user's foot. This sole structure includes an outsole that defines the ground-engaging portion of the footwear. The sole structure is fabricated with one or more foamed sole components, each of which includes a metered amount of a (ground or pelletized) recycled thermoplastic polyester elastomer composition and a (ground or pelletized) virgin thermoplastic polyester elastomer composition. The metered amount of recycle TPE-E composition is about 20% by mass or less of a total mass of the mixed batch.

Further aspects of this disclosure are directed to a method of manufacturing a foamed polymer article. In this instance, the method includes: grinding a recyclate batch of recycled thermoplastic polyester elastomer composition into a ground recyclate material; combining a metered amount of the ground recyclate material and a virgin polymer material of virgin thermoplastic polyester elastomer composition into a mixed batch; prior to or after combining, melting the ground recyclate material and the virgin polymer material into a polymer melt composition; adding a physical foaming agent to the polymer melt composition; injecting the polymer melt composition with the physical foaming agent into an internal cavity of a mold tool; activating the physical foaming agent such that the physical foaming agent causes the polymer melt composition to expand and fill the internal cavity of the mold tool to form the foamed polymer article; and removing the formed foamed polymer article from the mold tool. The formed foamed polymer article has: a ratio of energy efficiency to energy intensity that is greater than about 1.3; a ratio of energy efficiency to the product of energy intensity and density that is greater than about 5.9; a ratio of energy return to energy intensity that is greater than about 7,225; and/or a ratio of energy return to the product of energy intensity and density that is greater than about 38,250.

Additional aspects of this disclosure are directed to method of reducing waste during production of a foamed polymer article. In this instance, the method includes: injecting a mixed thermoplastic composition resin into a mold, the mixed thermoplastic composition resin comprising a mixture of a virgin thermoplastic composition resin and a recycled thermoplastic composition resin; and foaming the mixed thermoplastic composition resin within an internal mold cavity of a molding system to form the foamed polymer article, wherein a mass of the recycled thermoplastic composition resin within the mixed thermoplastic composition resin is at least about 20% by mass of a total mass of the mixed thermoplastic composition resin.

For any of the disclosed systems, methods, articles, and footwear, the recycled TPE-E composition in the recyclate batch includes scrap material or waste material, or both, that was recovered from an un-foamed batch of extruded TPE-E composition and/or a foamed batch of injection molded TPE-E composition. As yet a further option, the recycled and virgin TPE-E compositions may be derived from a dihydroxy-terminated polydiol material, such as a poly (alkylene oxide)diol, or a C2-C8 diol material, such as an ethanediol, propanediol, butanediol, pentanediol, or an aromatic dicarboxylic acid material, such as a C5-C16 dicarboxylic acid, or any combination thereof. In addition, the physical foaming agent may be added by injecting the physical foaming agent into the polymer melt composition while the polymer melt composition is contained in an injection barrel of an injection molding system. The physical foaming agent may be an SCF, such as supercritical nitrogen and/or supercritical carbon dioxide.

For any of the disclosed systems, methods, articles, and footwear, the mixed batch of ground recyclate material and virgin polymer material may have a set point temperature of at least about 150° C. or, in some embodiments, ranging from about 190° C. to about 265° C. In this regard, the mixed batch of recyclate and virgin materials may have an average peak crystallization temperature of at least about 90° C. or, in some embodiments, ranging from about 135° C. to about 165° C. A resultant foamed polymer article may have a cell size average, e.g., by volume of a longest cell dimension, of less than about 0.68 mm or, in some embodiments, about 0.18 mm to about 0.58 mm. Creating the polymer melt composition may comprise melting then mixing the recyclate and virgin materials or melting a mixed batch already containing the recyclate and virgin materials.

For any of the disclosed systems, methods, articles, and footwear, the resultant foamed polymer article exhibits: a ratio of energy efficiency to energy intensity that is between about 1.1 and about 1.9; a ratio of energy efficiency to the product of energy intensity and density that is between about 4.8 and about 9.1; a ratio of energy return to energy intensity that is between about 6,000 and about 11,000; and/or a ratio of energy return to the product of energy intensity and density that is greater than about 45,000. The recycled and virgin thermoplastic polyester elastomer compositions may be derived from a block copolymer, a segmented copolymer, a random copolymer, and/or condensation copolymer, and may have a weight average molecular weight (Mw) of at least about 30,000 Daltons or, in some embodiments, about 50,000 Daltons to about 200,000 Daltons.

For any of the disclosed systems, methods, articles, and footwear, the ground recyclate material may be processed prior to melting the mixed batch. This processing may include adding a filler, pigment, and/or processing aid to the ground recyclate material (before or after incorporation into the mixed batch). As yet a further option, adding the physical foaming agent to the polymer melt composition may include dissolving a supercritical inert fluid into the polymer melt composition under pressure to form a single-phase solution. Moreover, activating the physical foaming agent may include releasing the pressure to expand the supercritical inert fluid. Receiving the recyclate batch of recycled TPE-E composition may include obtaining, from a sprue, a runner, and/or a gate of an injection molding system, scrap segments of a prior-foamed polymer article formed from a prior mixed batch of ground recyclate material and virgin polymer material.

For any of the disclosed systems, methods, articles, and footwear, a resultant foamed article formed with recycled polymer material may have an energy return measurement that is within a predefined tolerance of an energy return measurement of a comparable foamed article formed entirely or almost entirely from virgin polymer material. For example, the predefined tolerance of a foamed sole component formed with recyclate is about 75% to about 99% of the energy return measurement of a comparable shoe sole component formed from virgin material. A shoe sole component may be considered "comparable" to another sole component if the two articles share an equivalent or nearly equivalent common shape, size, and/or method of molding. A percent by mass of the recycled thermoplastic resin within the mixed thermoplastic resin may be less than about 30% or, in some embodiments, between about 1% and about 20%.

For any of the disclosed systems, methods, articles, and footwear, the filling portion of the mold comprises one or more cold runners. In this instance, the filling portion may include one or more hot runners disposed within one or more runner plates, which may be stacked on and fluidly coupled to one or more mold plates that define therein the internal mold cavity. Moreover, the filling portion may consist of one or more channels that direct a flow of mixed thermoplastic resin from a nozzle or hot runner of an injection molding apparatus to the internal mold cavity portion of the mold. As yet a further option, the ground recyclate material may have an irregular shape with a largest measurement of about 1-10 mm, and the virgin polymer material has a pellet size of about 1-10 mm. A foamed sole component may have a melting temperature of at least about 190° C. and an average peak crystallization temperature of at least about 135° C.

BRIEF DESCRIPTION OF THE DRAWINGS

Examples are described in detail below with reference to the attached drawing FIGURES, wherein.

DETAILED DESCRIPTION

Figure 1:
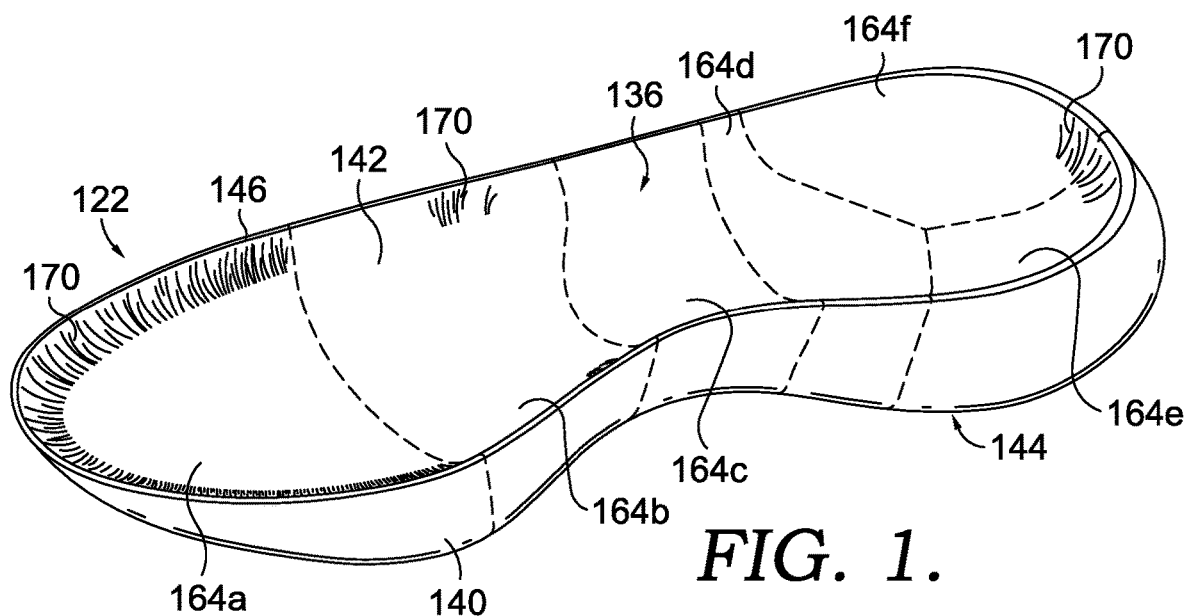
FIG. 1 provides a perspective view of a foam article in the form of a cushioning element as a midsole for an article of footwear, in accordance with aspects described herein.

Aspects herein relate to a foam article, such as a cushioning element for an article of footwear, apparel or sporting equipment. In some aspects, the article comprises a physically foamed, injection molded component, such as a midsole, having a number of beneficial physical characteristics. In some aspects, the physically foamed article is the product of foaming a thermoplastic elastomer material using a physical foaming agent, or a combination of a physical forming agent and a chemical agent. In some aspects, the article comprises a foam component, wherein the foam component has a foam volume, wherein the foam volume includes a foam core and an integrally-formed skin that encases the foam core, wherein both the foam core and the skin comprise a single thermoplastic elastomer material. Optionally, the foam core can comprise a plurality of integrally formed and connected foam sub-volumes. These foam sub-volumes can form a series of integrally formed and connected portions of foam in the core, and a series of concentric ridges on the exterior surface of the skin, typically which appear to extend radially outward from an injection gate vestige location. Striation bands may appear on the exterior surface of the skin, particularly near the perimeter of the foam article. The foam core (including its sub-volumes and portions of foam) can have an open-cell structure or a closed-cell structure. Additional components, such as solid molded components, can optionally be combined with the foam component to form an article such as a sole structure for an article of footwear. The article has a number of contiguous and integrated foam sub-volumes, designed to achieve a more consistent foam component with fewer, and/or smaller, foam defects. The ridges and striation bands may be structurally advantageous. The location of the gate vestiges can be beneficially designed to produce flow fronts or boundaries, between and coupling adjacent foam sub-volumes, that are located away from key strain areas of the article. In other aspects, the article is more environmentally-sustainable, requiring less energy to produce while still providing good energy return and low density.

At a high level, aspects herein relate to a foam article, such as a cushioning element for an article of footwear, apparel or sporting equipment. The article comprises a foamed component, such as a midsole, having a foamed article volume comprising a plurality of foam sub-volumes, with one injection gate vestige for each foam sub-volume. Each foam sub-volume has a corresponding aspect ratio greater than 2.7.

Other aspects herein relate to a foam article, such as a cushioning element for an article of footwear, apparel or sporting equipment. The article comprises a foamed component, such as a midsole, the component comprising a foamed article volume comprising a plurality of foam sub-volumes each having one gate vestige of a plurality of gate vestiges. The component further includes a gate vestige axis extending between a first gate vestige of the plurality of gate vestiges and a second gate vestige of the plurality of gate vestiges, wherein at least a third gate vestige of the plurality of gate vestiges is offset from the gate vestige axis.

Other aspects herein relate to a foam article, such as a cushioning element for an article of footwear, apparel or sporting equipment. The article comprises a foamed component, such as a midsole, the component having a foamed article volume comprising a plurality of foam sub-volumes, the component further comprising one injection gate vestige at an outward-facing surface of each foam sub-volume, wherein a plurality of ridges on the outward-facing surface extend radially outwardly from an injection gate vestige of at least one of the plurality of foam sub-volumes. In some aspects, the plurality of ridges form a series of concentric circles.

Other aspects herein relate to a foam article, such as a cushioning element for an article of footwear, apparel or sporting equipment. The article comprises a foamed component, such as a midsole, the component comprising a profile defined by an outer side wall, the component having a top surface and a bottom surface, and an outer perimeter edge at the intersection of the outer side wall and the top surface, the top surface having a plurality of striation bands extending inwardly from the outer perimeter edge.

Other aspects herein relate to a foam article, such as a cushioning element for an article of footwear, apparel or sporting equipment. The article comprises a foamed component, the component comprising a profile defined by an outer side wall, the component having a top surface and a bottom surface, and an outer perimeter edge at the intersection of the outer side wall and the top surface, wherein at least one of the outer side wall, top surface and bottom surface have a substantially solid surface skin surrounding a foam core, with a thickness of between 0.3 millimeters and 1.0 millimeters, wherein the skin and foam core comprise a single thermoplastic elastomeric material.

Other aspects herein relate to a foam article, such as a cushioning element for an article of footwear, apparel or sporting equipment. The article comprises a foamed component having a ratio of energy return to energy intensity (EE/EI) greater than 1.5. In other aspects, the article comprises a foamed component having a ratio of energy return to the product of energy intensity and density (EE/EI*$\rho$) value greater than 7.

The article disclosed herein may be a cushioning element used on an article of footwear, an item of apparel, or a piece of sporting equipment. In some aspects, the article of footwear disclosed herein has a general configuration suitable for various activities, such as walking, running, jumping, and the like. An article of footwear may take on various forms in order to provide support to a wearer when performing various activities. Exemplary articles of footwear may include athletic footwear, sandals, dress footwear, boots, loafers, and the like. The term "footwear" may be used herein for simplicity, in reference to aspects of the articles of footwear. However, the concepts described herein may be applied to a variety of other types of footwear.

Figure 15:
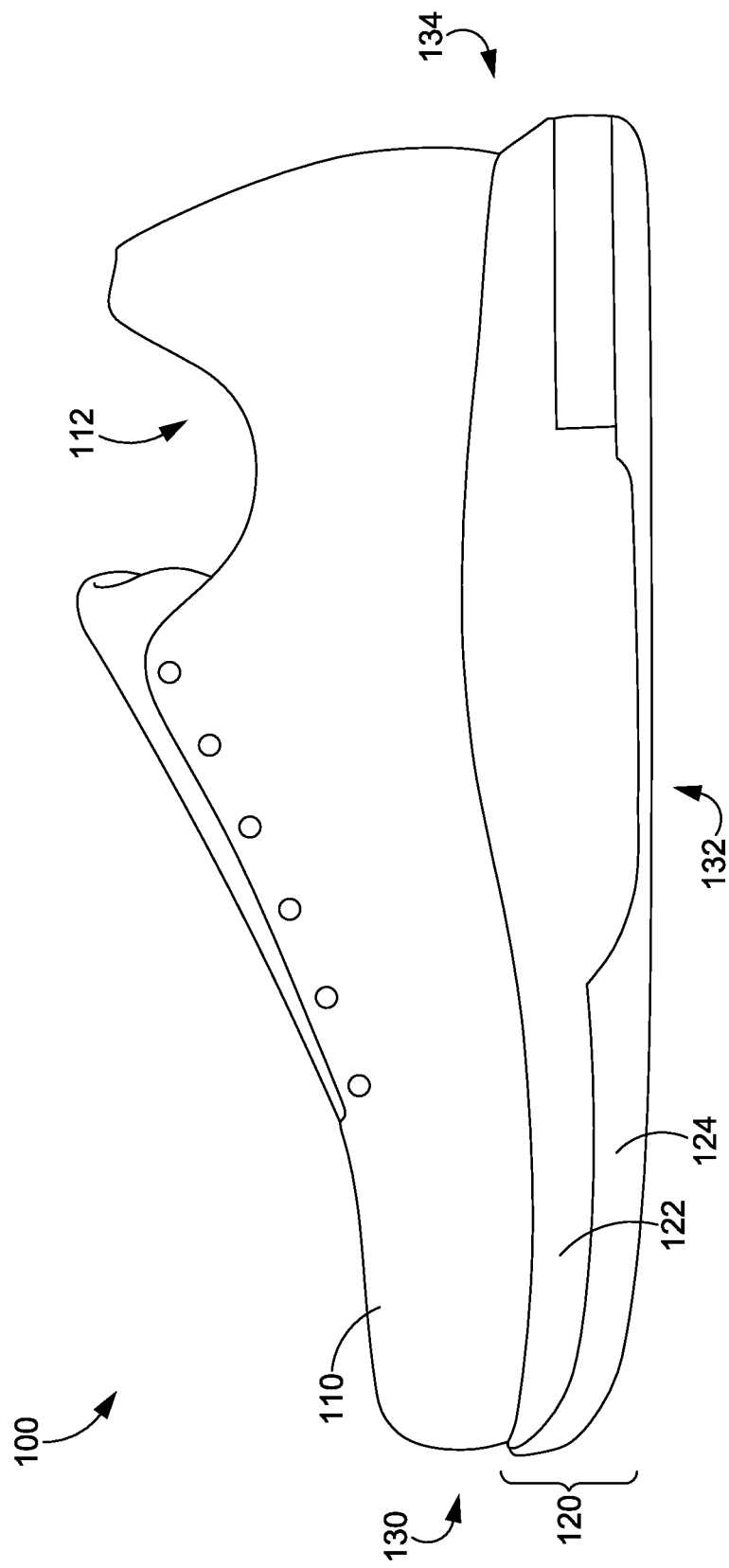
FIG. 15 provides a side view of the midsole of FIG. 1 within an article of footwear, in accordance with aspects described herein.

An exemplary article of the footwear 100 is provided in FIG. 15, in accordance with aspects herein. The footwear 100 includes an upper 110 and a sole structure 120. For reference purposes, the footwear 100 may have a toe end 130, a mid-foot area 132, and a heel end 134. The toe end 130 is proximate to portions of the footwear 100 that correspond with the toes and the joints connecting the metatarsals with the phalanges of a foot of a wearer, in the as-worn position. For reference purposes, the as-worn position refers to a position of the foot of the wearer in relation to the footwear when the wearer dons the footwear 100. The mid-foot area 132 generally includes portions of the footwear 100 corresponding with middle portions of the foot including, at least, the cuboid, navicular, medial cuneiform, intermediate cuneiform, and lateral cuneiform bones of the foot of the wearer, in the as-worn position. The heel end 134 is opposite the toe end 130 and is proximate to portions of the footwear 100 that correspond with the heel of the foot, including the calcaneus bone of the foot of the wearer, in the as-worn position. The toe end 130, the mid-foot area 132, and the heel end 134 are not intended to demarcate precise areas of the footwear 100, but rather are intended to represent general ends and areas of the footwear 100 to aid in the following discussion.

The upper 110 defines a cavity within the footwear 100 for receiving and securing a foot relative to the sole structure 120. The cavity may be shaped to accommodate the foot and extends along a lateral side of the foot, along a medial side of the foot, over the foot, around a heel of the foot, and may extend under the foot. Access to the cavity may be provided by an ankle opening 112 located near atop portion of the upper 110, in the as-worn position. In some aspects, the upper 110 may include a strobel. Various portions of the upper 110 may be made from a plurality of elements, including textiles, polymer sheet layers, foam layers, leather, synthetic leather, and the like, that may be joined together or seamlessly formed (e.g., woven or knit) to provide the cavity within the footwear 100.

The sole structure 120 may have, among other things, in some aspects, a cushioning element, such as a midsole 122, and an outsole 124. The sole structure 120 may attenuate ground reaction forces and absorb energy as the footwear 100 contacts the ground. The midsole 122, among other things, may act as a cushioning element. Additionally, aspects of the sole structure 120 may provide stability to at least the foot of the wearer during various activities, such as rapid lateral direction changes, lunges, and jumping.

In some aspects, the article of the footwear 100 can also include one or more fluid-filled chambers, such as airbags/airsoles, disposed (i) between the upper 110 and the midsole 122, (ii) within a pocket in the midsole 122, and/or (iii) between the midsole 122 and the outsole 124. The fluid-filled chamber may be formed using any suitable manufacturing technique, such as blow molding, thermoforming and post-inflation, and the like. The fluid-filled bladder can be produced from single-layer films or multiple-layer films, such as multiple-layer barrier films. Barrier films, such as those disclosed in Bon et al., U.S. Pat. No. 6,599,597, can include alternating layers of structure materials (e.g., thermoplastic polyurethane) and gas-barrier materials (e.g., ethylenevinyl alcohol). Fluid-filled chambers with such barrier films are beneficial for good flexibility for use as footwear cushioning elements as well as retaining pressurized gases for extended durations (e.g., pressurized nitrogen). Alternatively, the fluid-filled chamber can retain gases at ambient pressure (e.g., atmospheric pressure). In some aspects, the fluid-filled chamber can also include one or more tensile elements, such as those disclosed in Chao et al., U.S. Pat. No. 8,869,430 and Hazenberg et al., U.S. Pat. No. 9,021,720. Each tensile element may include a series of tensile strands (e.g., polyamide and/or thermoplastic polyurethane strands) extending between the major film surfaces of the fluid-filled chamber.

In further aspects, the article of the footwear 100 can also include one or more midsole plates disposed (i) between the upper 110 and the midsole 122, (ii) between multiple stacks of the midsole 122, and/or (iii) between the midsole 122 and the outsole 124. Examples of suitable plates for use in the article of footwear include those disclosed in Dupre et al., U.S. Pat. No. 10,448,704 and Connell et al., U.S. publication No. 2018/0213886. Each plate may be formed from a non-foamed polymer material or, alternatively, from a composite of one or more polymeric materials and entrained fibers (e.g., carbon fibers). As such, each plate can exhibit relatively rigid, yet flexible properties to distribute forces associated with the use of the article of the footwear 100 when the article of the footwear 100 strikes a ground surface.

Figure 2:
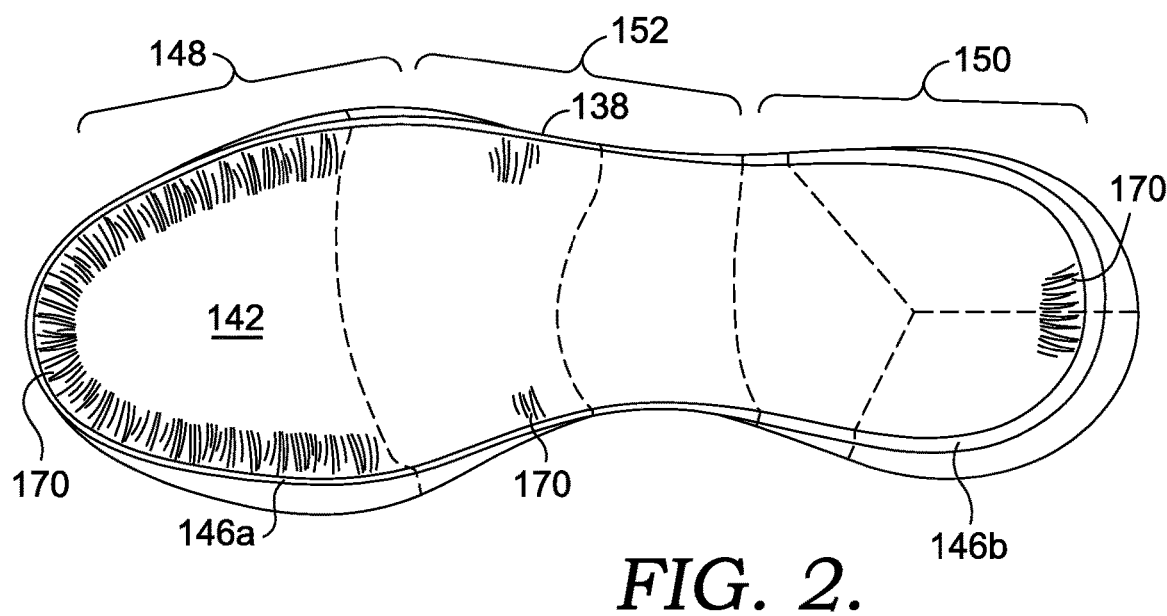
FIG. 2 provides a top view of the midsole of FIG. 1, in accordance with aspects described herein.

FIGS. 1-5 provide views of one aspect of the foam article, shown as a the midsole 122, that may serve a variety of purposes that include supporting and controlling foot motions and as a cushioning element (attenuating impact forces that are generated when a foot contacts the ground). For reference purposes, the midsole 122 may have a foamed component 136, having a profile 138 defined by an outer side wall 140. The component 136 further has a top surface 142 and a bottom surface 144 spaced from the top surface 142. In some aspects, the foam component 136 has a foam core and an integrally formed surface skin, wherein both the foam core and the surface skin comprise a single thermoplastic elastomeric material. In some aspects, the surface skin forms the top surface 142, the bottom surface 144 and the side wall 140. The bottom surface 144 of the midsole 122 may be joined to the outsole 124, such as by an adhesive, or the midsole 122 may be over-molded with the outsole 124. The upper 110 may be joined to the top surface 142, such as by an adhesive. An outer perimeter edge 146 extends around the periphery of the midsole 122 at the intersection of the outer side wall 140 and the top surface 142. Like the footwear 110, the midsole 122 has a corresponding toe area 148, a heel area 150 and a mid-foot area 152 that extends generally between the toe area 148 and the heel area 150. The toe area 148, the mid-foot area 152 and the heel area 150 are not intended to demarcate precise areas of the midsole 122 but are intended to represent respective areas of the footwear 100 that provide a frame of reference. The perimeter edge 146 may, in some aspects, transition from a narrower edge 146a near the toe area 148 to a wider edge 146b near the heel area 150. The bottom surface 144 extends between the outer side walls 140 on the bottom of the midsole 122 and extends from the heel area 150 to the toe area 148. As best seen in FIGS. 1 and 2, the top surface 142 extends between the outer side walls 140 on the top of the midsole 122 and also extends from the heel area 150 to the toe area 148. In some aspects the top surface 142 is formed in a concave or cup shape by the mold, and in some aspects the area adjacent the perimeter edge 146 has a smaller radius of curvature as the top surface 142 transitions to the perimeter edge 146.

Figure 17:
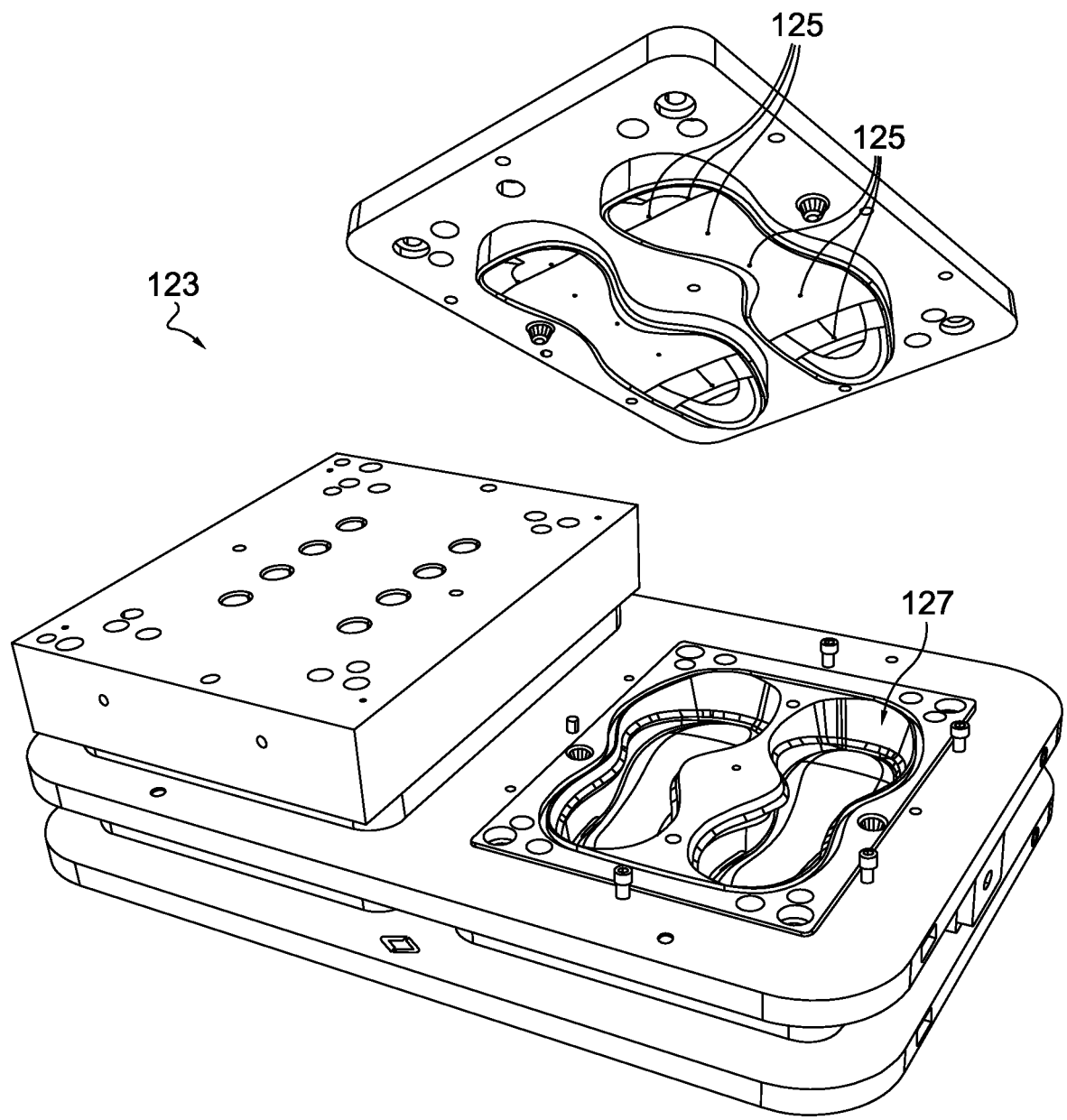
FIG. 17 provides a perspective view of one aspect of a three-piece mold used to form the midsole of FIG. 1.

The midsole 122 is produced in a mold 123 (such as that shown in FIG. 17), where a mixture of a molten thermoplastic elastomer and a foaming agent are injected into the mold cavity 127 through a number of gate openings 125. In one aspect, the midsole 122 is formed in a mold having six gates, evidenced by six remaining gate vestiges 160 protruding slightly from the bottom surface 144 of the midsole 122. In some aspects, the gate vestiges 160 do not protrude from the bottom surface 144 of the midsole 122, but are evidenced by other factors discussed below. The gate vestiges 160 are labeled 160a-160f in FIG. 3, extending from the toe area 148 to the heel area 150. Each gate vestige 160 has a corresponding foam sub-volume 164 (correspondingly labeled 164a-164f in FIG. 3) representing a sub-volume of the entire article volume of the midsole 122 substantially filled from the composition injected through a corresponding gate at a gate vestige 160 location. It should be understood that foam from adjacent gate vestiges 160 will flow together to fill the article volume to form a foam-filled the midsole 122.

Single Gate

Figure 18:
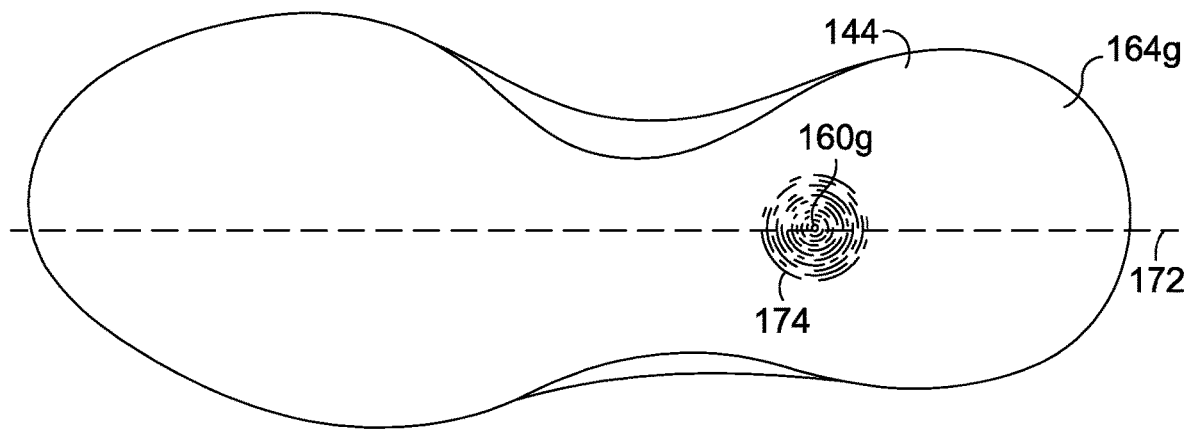
FIG. 18 provides a bottom view of the midsole of FIG. 1, in accordance with aspects described herein.
Figure 19:
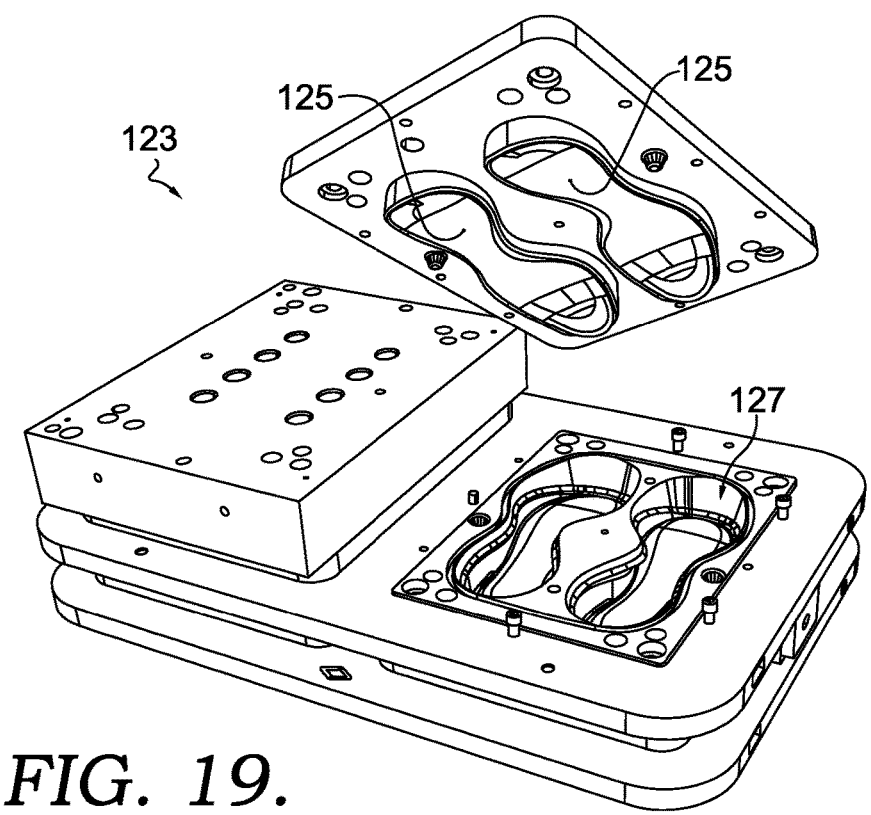
FIG. 19 provides a perspective view of one aspect of a three-piece mold used to form the midsole of FIG. 3.

In other aspects, the midsole 122 is produced in a mold 123 (such as that shown in FIG. 19), where a mixture of a molten thermoplastic elastomer and a foaming agent are injected into the mold cavity 127 through a single gate opening 125 in each mold cavity. In this aspect, the midsole 122 is formed in a mold having a single gate opening 125, evidenced by a single remaining gate vestige 160g (as shown in FIG. 18) protruding slightly from the bottom surface 144 of the midsole 122. In some aspects, the gate vestige 160g does not protrude from the bottom surface 144 of the midsole 122, but is evidenced by other factors discussed below. In this aspect, the single gate vestige 160g has a corresponding foam volume 164g (the entire foam volume being filled through the single gate 125). In some aspects, the single gate opening 125 is located along a central axis 172, and slightly forward of the heel area. Other locations of a single gate opening 125 could also be used, in some aspects.

Striation Bands

As best seen in FIGS. 2, 7 and 9-13, the physical foaming, along with the mold design and the process conditions (such as pressure, time and temperature) may be coordinated to produce striation bands 170 in the top surface 142 adjacent at least some areas of the perimeter edge 146 in at least some of the foam sub-volumes 164. In one aspect, the striation bands 170 extend substantially radially from the perimeter edge 146 toward at least one gate vestige 160. In one aspect, the striation bands 170 extend at least 5 millimeters (mm) inwardly from the perimeter edge 146, or at least 10 mm inwardly from the perimeter edge 146, or at least 15 millimeters inwardly from the perimeter edge 146. The striation bands 170, in one aspect, generally extend around the entire periphery of the toe area 148 of the midsole 122. In another aspect, the striation bands 170 extend at least in the center of the heel area 150, near a gate vestige axis 172 of the midsole 122. In one aspect, the striation bands 170 extend from the perimeter edge 146 in at least one section of the mid-foot area 152. In one aspect, the striation bands 170 are formed by the shear applied to the foamed polymer as it expands at increasing velocity as the mold cavity narrows or gets thinner in this region. This thinner region is formed as the top surface 142 meets with the side wall 140, generally in areas that form a thinner wall, as opposed to a gradually rounded boundary. This thinner area near the perimeter edge 146 is used to embed the upper 110 and provide a smooth transition between the midsole 122 and the upper 110 when the midsole 122 is within the footwear 100. These thinner-walled areas are more prone to tearing, particularly in the toe area 148. Additionally, these thinner-walled areas can extend relatively higher above the remainder of the top surface 142, and as such are potentially more vulnerable to tearing. The striation bands 170 are portions of the foamed component where polymer chains present in this portion have a higher degree of orientation relative to portions of the midsole 122 without the striation bands 170. Without intending to be bound by any theory, it is believed that the striation bands 170 may increase the strength and tear resistance of the midsole 122 in thinner wall areas, such as those areas adjacent the perimeter edge 146. The striation bands 170 may also form a slightly textured surface, increasing the surface area of the top surface 142 near the perimeter edge 146, allowing an increase in bond strength of any adhesive used to couple the midsole 122 to a corresponding part. In one aspect, the striation bands 170 may extend about 5 millimeters, or about 10 millimeters, or about 15 millimeters or about 20 millimeters from the perimeter edge 146.

Gate Location and Flow

Figure 3:
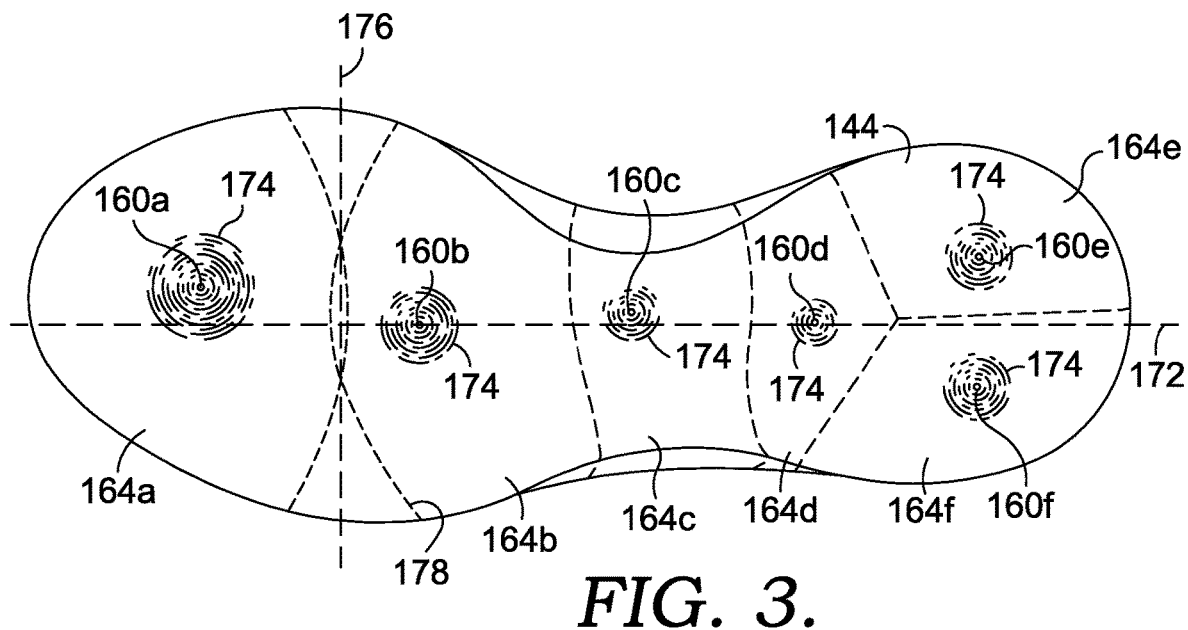
FIG. 3 provides a bottom view of the midsole of FIG. 1, in accordance with aspects described herein.
Figure 4:
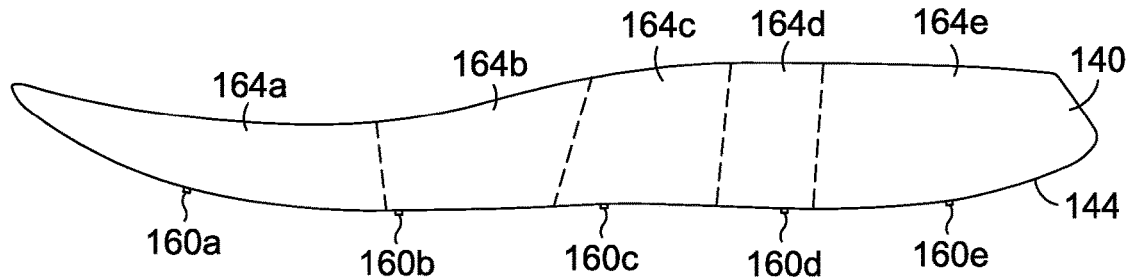
FIG. 4 provides a medial side view of the midsole of FIG. 1, in accordance with aspects described herein.
Figure 5:
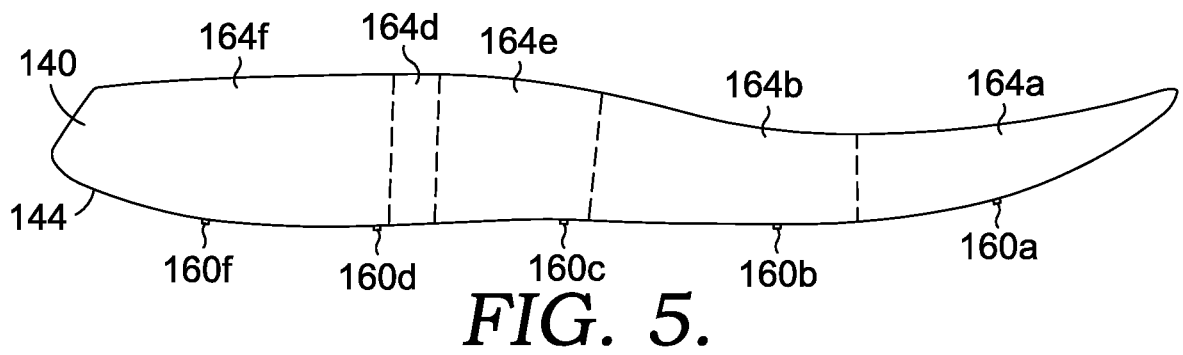
FIG. 5 provides a lateral side view of the midsole of FIG. 1, in accordance with aspects described herein.
Figure 8:
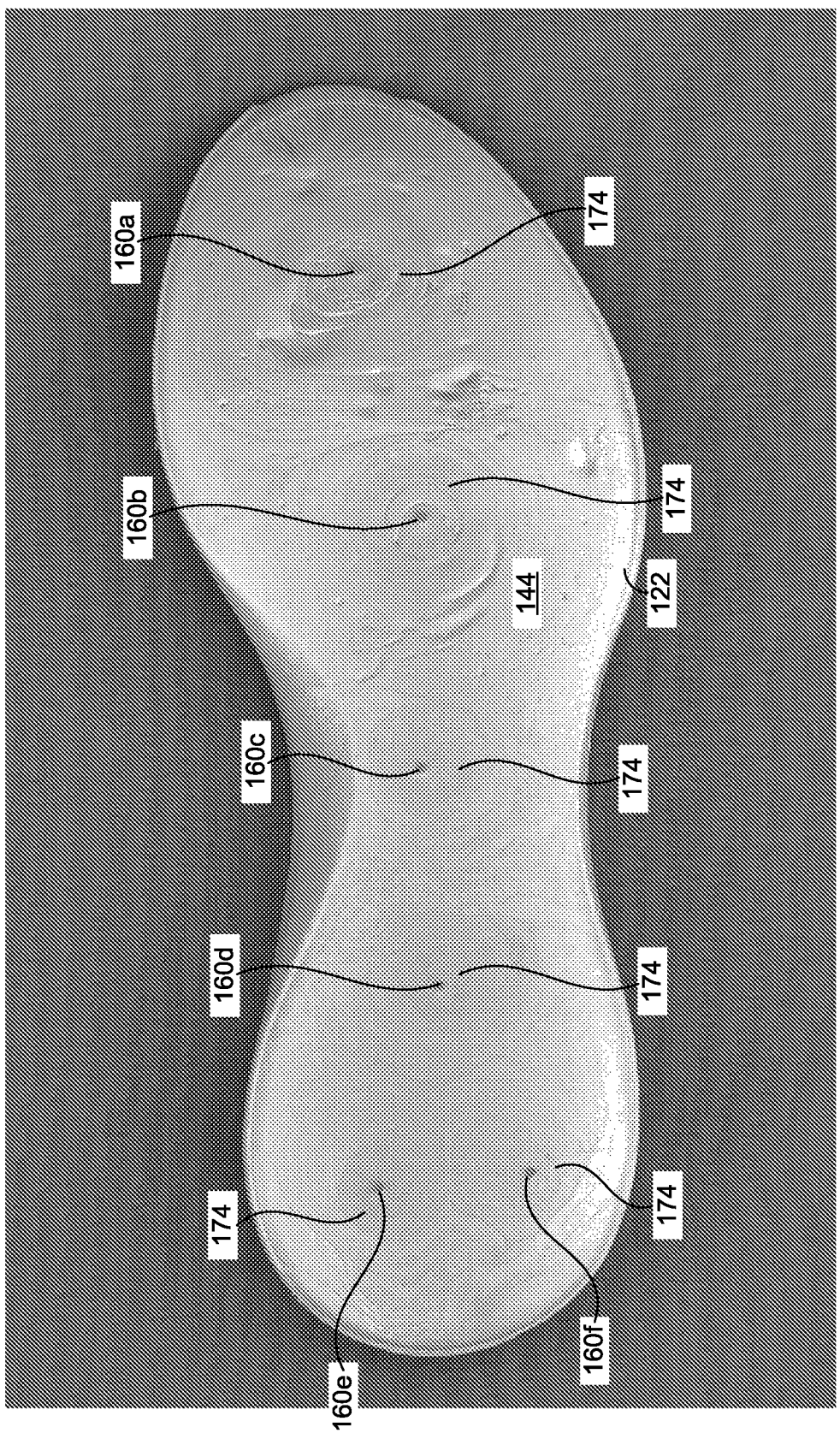
FIG. 8 provides a bottom image of an aspect of the midsole of FIG. 1, in accordance with aspects described herein.
Figure 9:
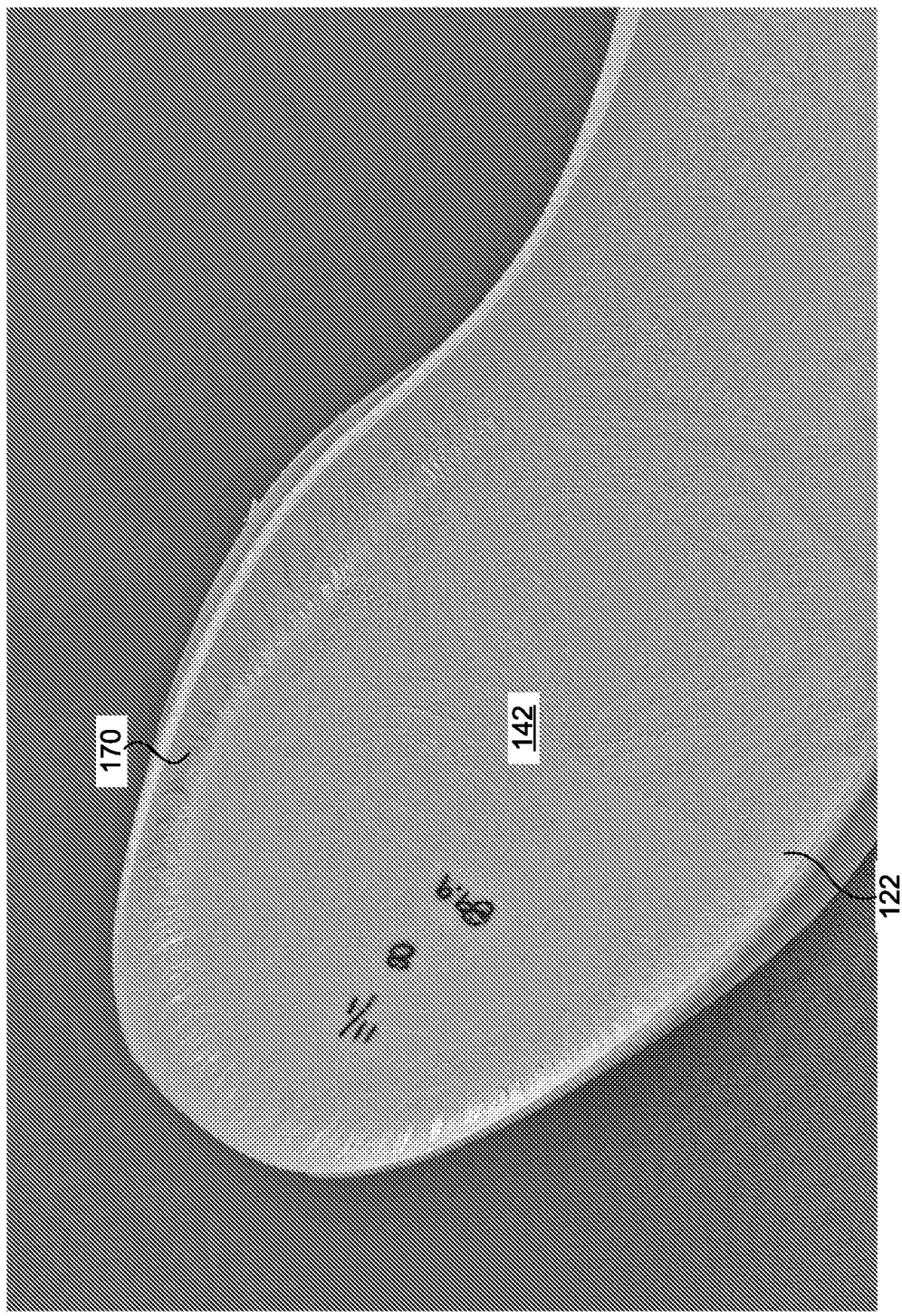
FIG. 9 provides an enlarged view of a portion of the midsole of FIG. 7, in accordance with aspects described herein.
Figure 10:
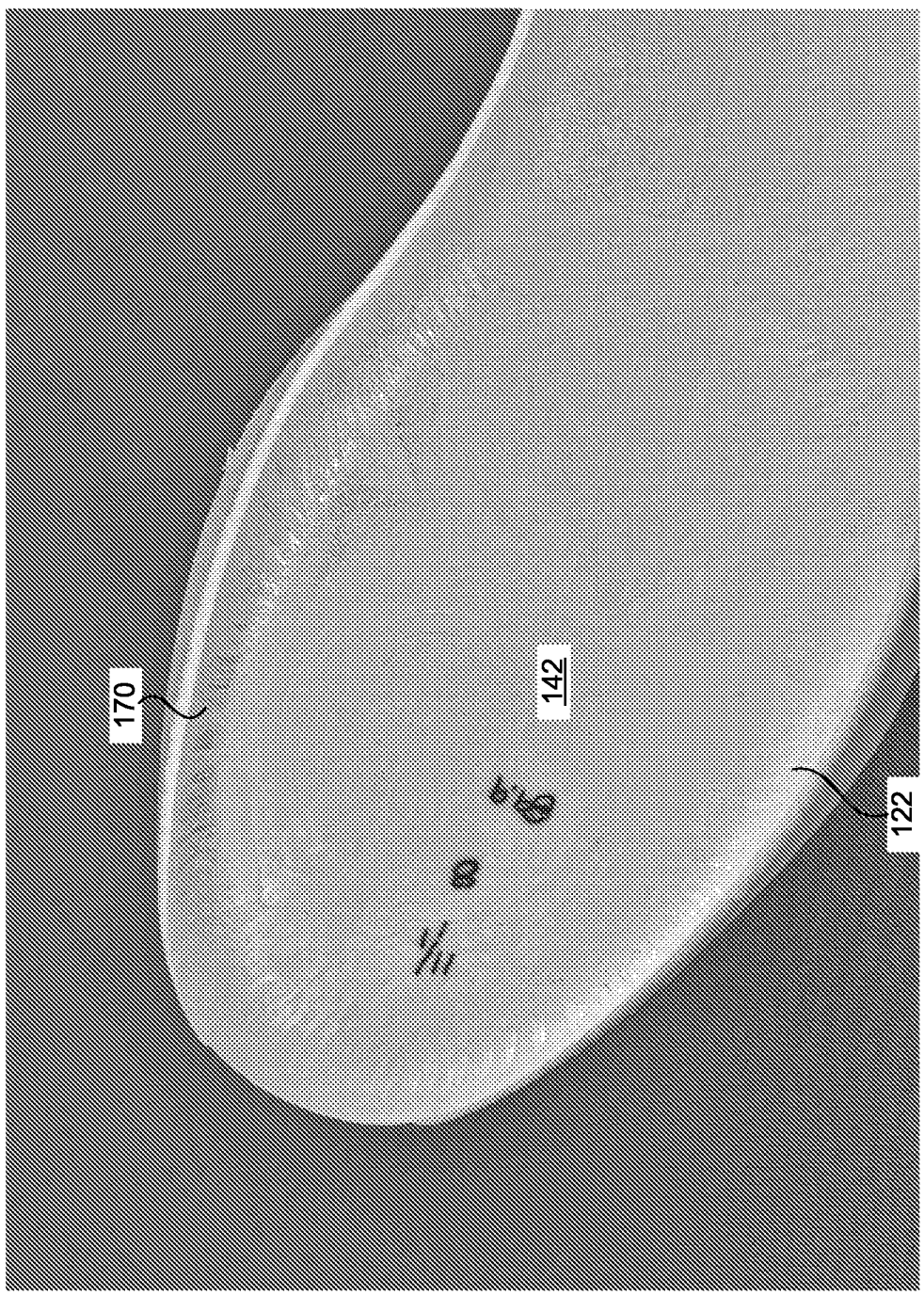
FIG. 10 provides a view similar to FIG. 9, in accordance with aspects described herein.
Figure 11:
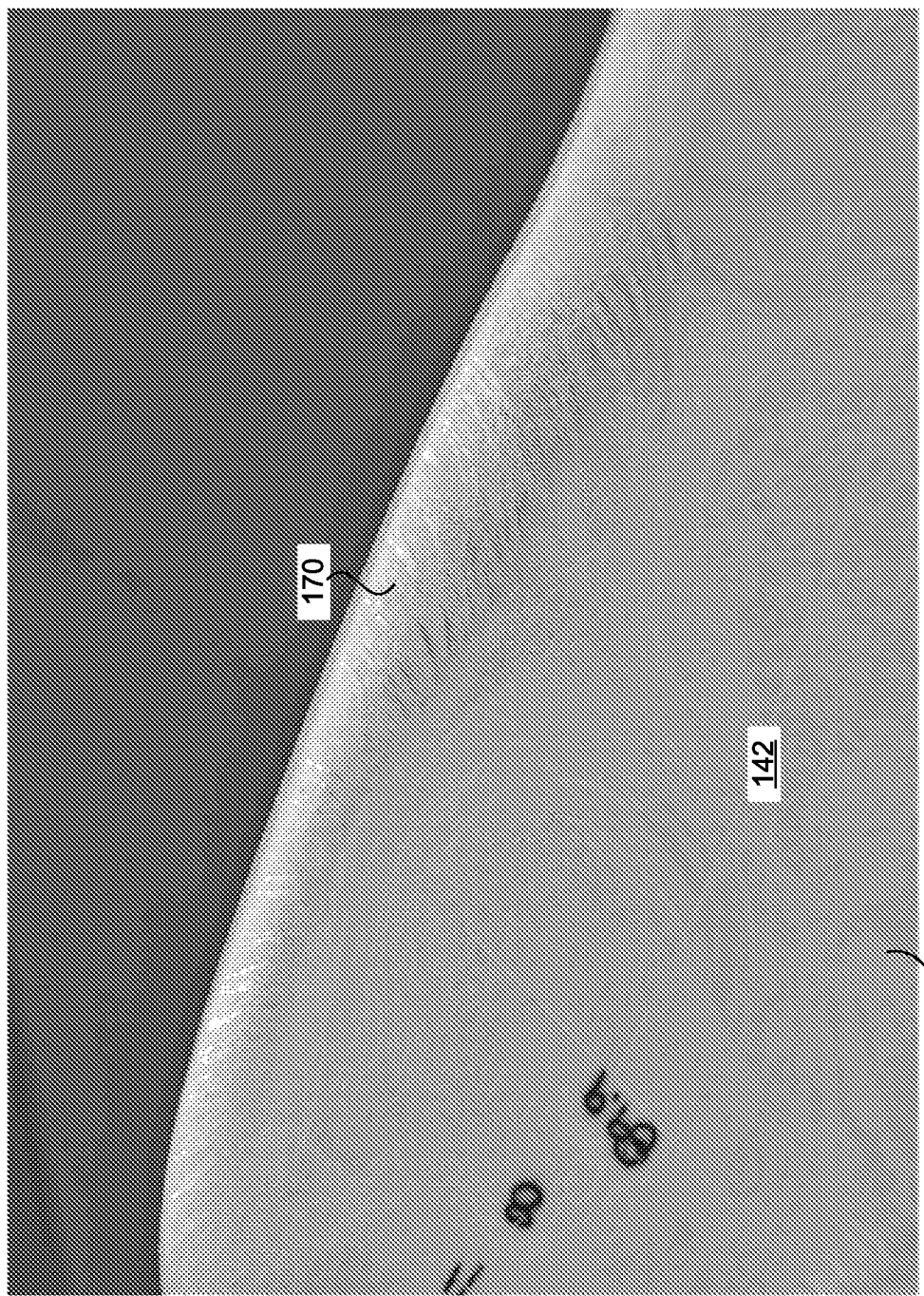
FIG. 11 provides a further enlarged view of a portion of the midsole of FIG. 7, in accordance with aspects described herein.
Figure 12:
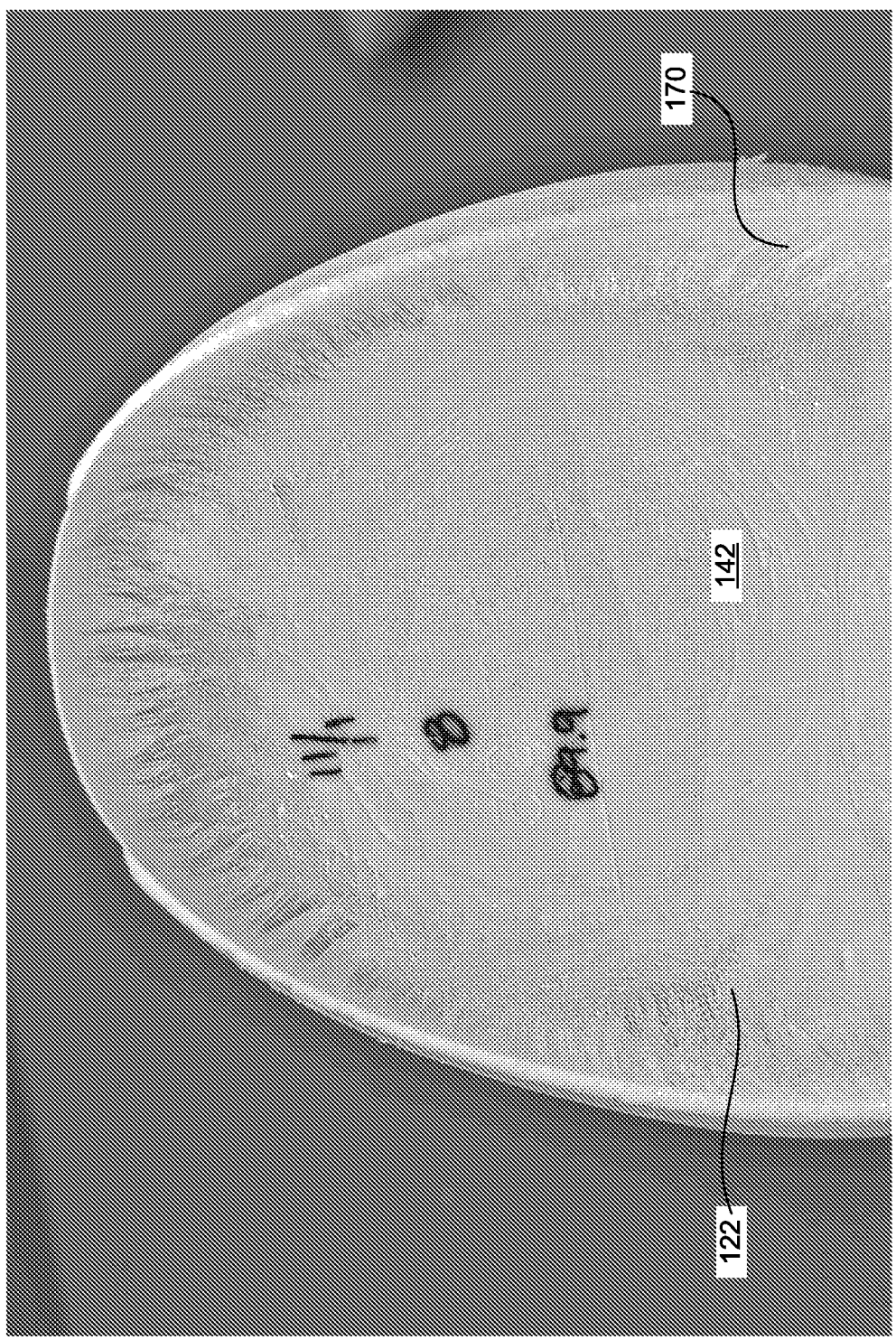
FIG. 12 provides an enlarged view of a portion of the midsole of FIG. 7, in accordance with aspects described herein.
Figure 13:
FIG. 13 provides a view similar to FIG. 12, in accordance with aspects described herein.

The number and positioning of the gates can impact the performance characteristics of the resulting foam article, such as the midsole 122. As best seen in FIG. 3 (and the photograph shown as FIG. 8), the physical foaming, along with the mold design and the process conditions (such as pressure, time and temperature) may be coordinated to produce a series of approximate concentric ridges 174 that generally radiate outwardly from each gate vestige 160 as best seen from the bottom surface 144, in either the multiple gate aspects shown in FIG. 3 or the single gate aspect shown in FIG. 18. In one aspect, the concentric ridges 174 are formed as the melt composition expands into the physical foam radiating outwardly from the respective gate vestige 160. In some aspects, it is believed the concentric ridges 174 can act to distribute compression forces in a more uniform way, in multiple directions, as the midsole 122 is used as a cushioning element in an article of the footwear 100. In some aspects, the concentric ridges 174 radiate outwardly at least 10 mm from the respective gate vestige 160. In some aspects, the concentric ridges 174 radiate outwardly at least 20 mm from the respective gate vestige 160. In some aspects, the concentric ridges 174 radiate outwardly at least 30 mm from the respective gate vestige 160. In some aspects, the concentric ridges 174 radiate further outwardly in the toe area 148 of the midsole 122 than in the mid-foot area 152 and/or the heel area 150 of the midsole 122. In some aspects, the shape formed by the ridges 174 is more ovular than circular. In some aspects, the shorter axis of the ovular shape formed by the ridges 174 is in-line with the gate vestige axis 172 and the longer axis of the ovular shape formed by the ridges 174 is orthogonal to the gate vestige axis 172.

As shown in FIG. 3, an intersection axis 176 can be defined at the apex of curvature of the outer side wall 140 on both the medial side and the lateral side of the midsole 122, between the toe area 148 and the mid-foot area 152, generally at a location known as the ball width. As the midsole 122 is formed, the thermoplastic elastomer composition injected into a mold cavity at the gate vestige locations 160 expands to fill a respective foam sub-volume 164. A foam front, or flow boundary is represented by the line 178. The foam flow boundary 178 schematically represents the front of the foamed thermoplastic elastomer composition as it forms a partition boundary between foam sub-volume 164a and foam sub-volume 164b. It can be seen that the foam flow boundary 178 intersects the intersection axis 176 in two locations. The location of the foam flow boundary 178 is preferably in an area that does not coincide with an area of maximum peak strain when the midsole 122 is used in an article of footwear and when the user is walking and/or running. The location of the foam flow boundary is designed and positioned by positioning and locating the gates (and gate vestiges 160a and 160b), as well as the properties of the foamed thermoplastic elastomer composition and the process conditions.

Aspect Ratio

In injection molding, the parameter known as the aspect ratio (AR) may be calculated for each part, and specifically for each injection gate for the part (such as the midsole 122). For three-dimensional shapes, the aspect ratio is defined as the ratio of the maximum dimension of the shape to the minimum dimension of the shape. For regular shapes, (such as spheres, cubes, rectangles, cylinders, etc.) aspect ratio is defined by length/width, with distances measured from the center of the shape. For a perfect sphere, the AR is 1. For a cube, the AR is half the dimension of a side, divided by the distance from the center of the cube to a corner. For irregular shapes frequently encountered in injection molding, such as for the midsole 122, no single dimension accurately represents the shape. For irregular shapes, the aspect ratio can be defined as the ratio of the maximum distance from the center of mass of the equivalent solid of the shape to the surface of the shape ($L_{max}$) relative to the minimum distance from the same point to the surface ($L_{min}$). For foam volumes with multiple gates, such as the midsole 122 with the sub-volumes 164, the volume allocated to each gate (or individual foam sub-volume 164) should be considered as having its own characteristic aspect ratio based on the fractional volume of the overall cavity of the mold for the midsole 122. The boundaries of each foam sub-volume 164 are determined along with the volumes and centers of mass associated with each gate and foam sub-volume 164. These parameters can be calculated using CAD mold simulation software, as is known to those of skill in the art. From the volume and centers of mass, the aspect ratio is calculated for each foam sub-volume 164.

Figure 6:
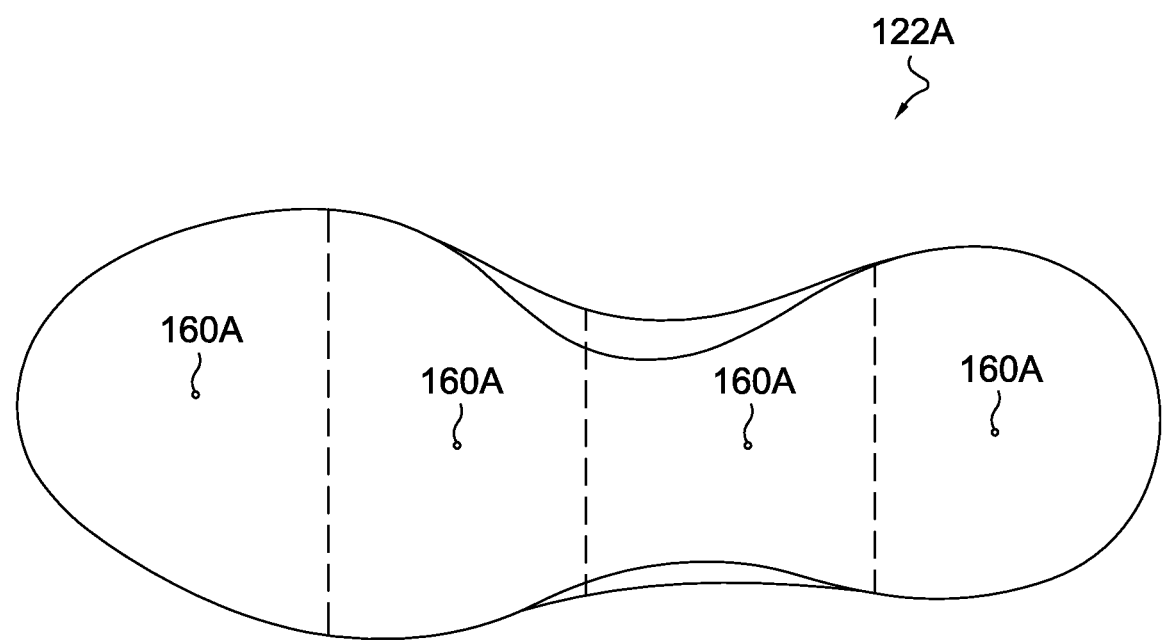
FIG. 6 provides a bottom view of an alternative midsole, shown for comparison of the midsole of FIG. 1, in accordance with aspects described herein.
Figure 7:
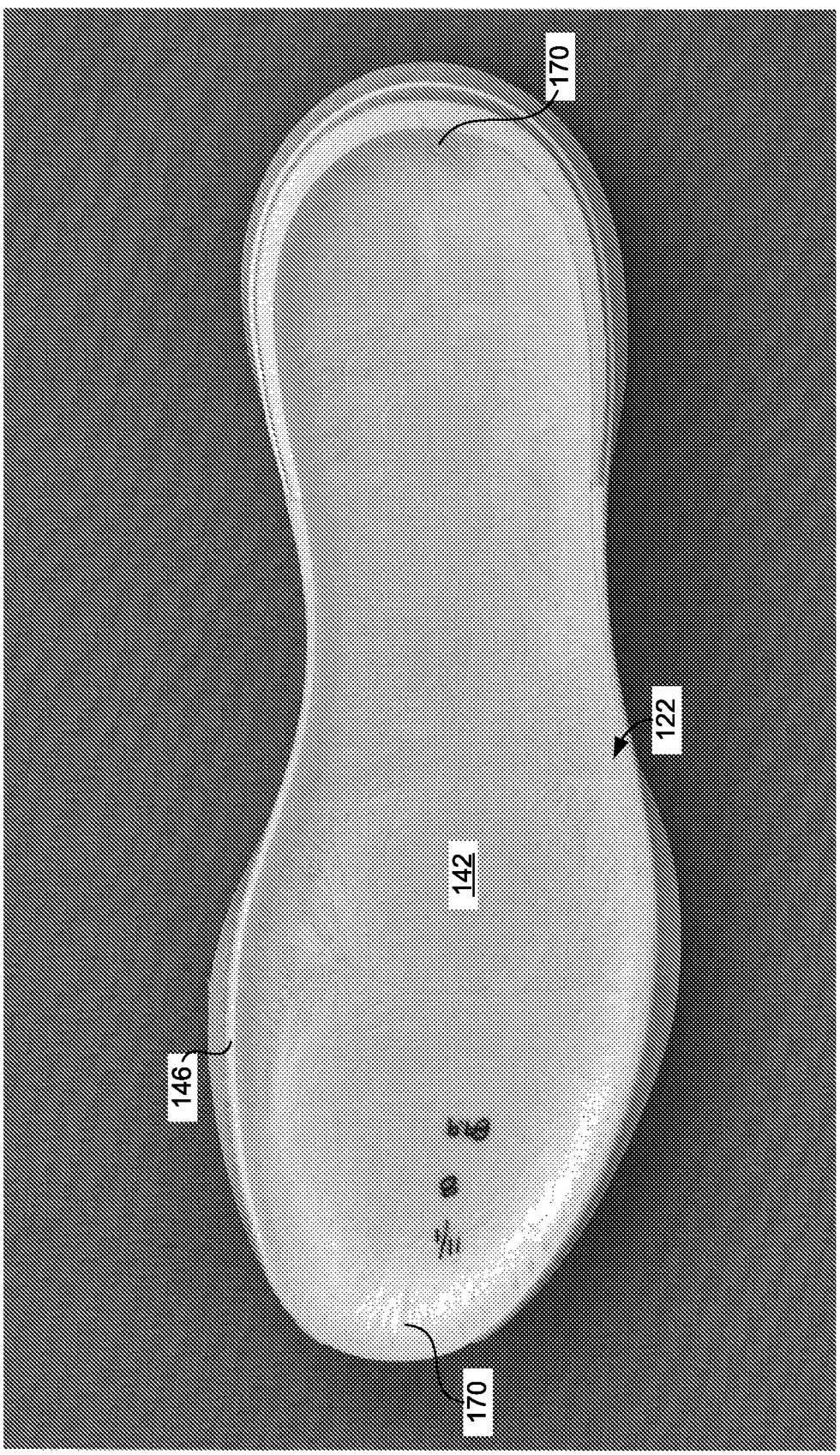
FIG. 7 provides a top image of an aspect of the midsole of FIG. 1, in accordance with aspects described herein.
Figure 14:
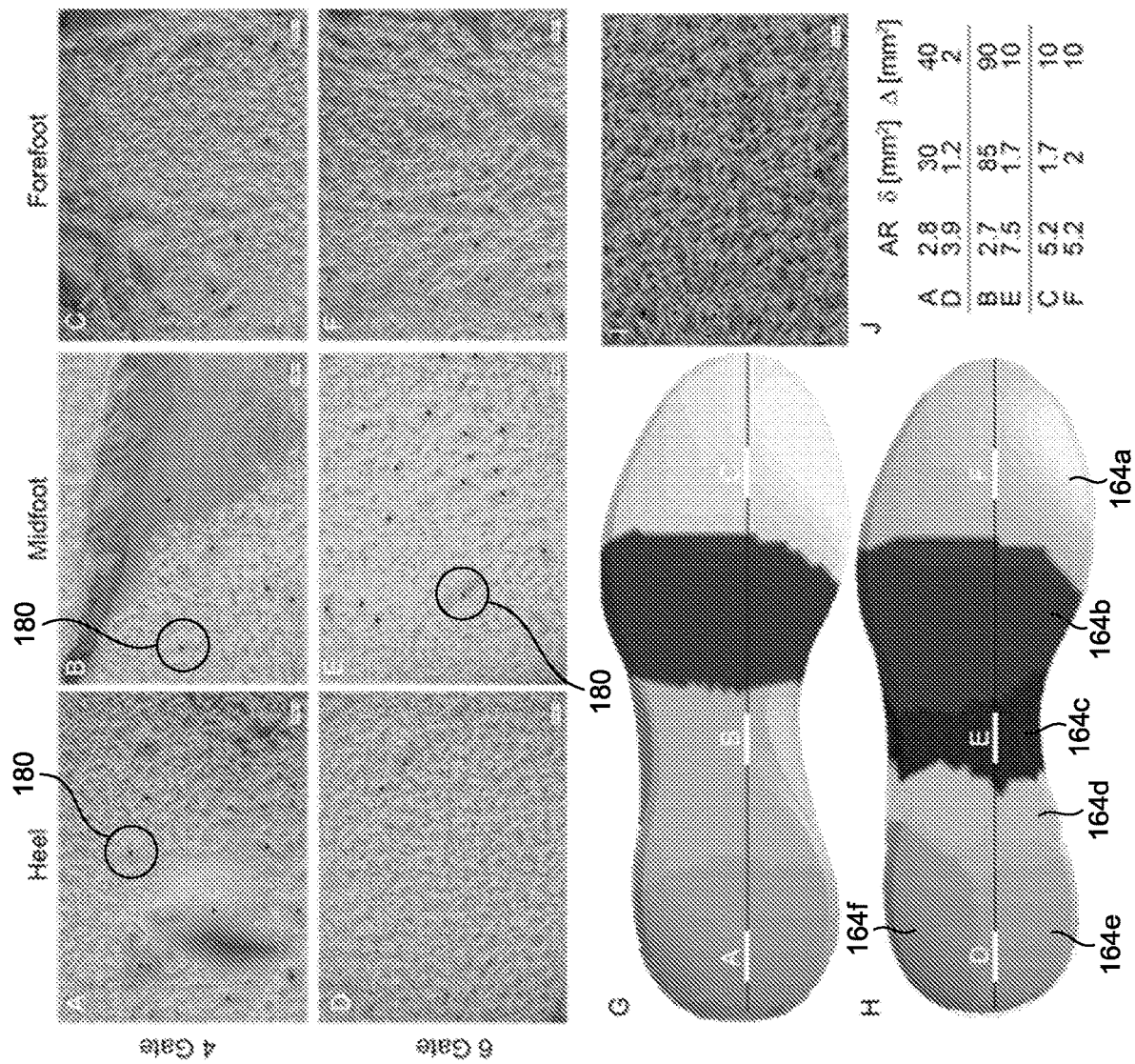
FIG. 14 provides a view of comparison data regarding the midsole of FIG. 1 and the midsole of FIG. 6, in accordance with aspects described herein.

Higher aspect ratio (AR) cavities are believed to create more consistent foam structures compared to low aspect ratio cavities. For example, the midsole 122 of FIGS. 1-5 discussed above, molded with six gates evidenced by six injection gate vestiges 160 may be compared with a the midsole 122A, shown in FIG. 6, molded with four gates evidenced by four injection gate vestiges 160A. FIG. 14, shows a comparison in foam microstructures between the midsole 122 and the midsole 122A having the same overall shape but different gate configurations. The midsole 122 and the midsole 122A are composed of the same material, have equivalent density, and were injected using the same conditions (such as time, pressure and temperature). Images A-F in FIG. 14 highlight local differences in foam structure between the midsole 122 (molded with six gates) and the midsole 122A (molded with four gates). Images A, B and C are from the heel area 150, the mid-foot area 152 and the toe area 148, respectively, of the midsole 122A. Similarly, images D, E and F are from the heel area 150, the mid-foot area 152 and the toe area 148, respectively, of the midsole 122. Image pairs A-D, B-E, and C-F were taken from the same zones on the 4 gate the midsole 122A (also labeled G in FIG. 14) and 6 gate the midsole 122 (also labeled H in FIG. 14), respectively. The area of the midsole 122 and the midsole 122A resulting in images A-F are indicated in FIG. 14 with a corresponding letter in the images labeled G and H. Image I in FIG. 14 shows a representative defect free foam microstructure characteristic of both the midsole 122 and the midsole 122A. A defect in the foam microstructure can be defined as any area with a single dimension greater than 1 mm. Put another way, any area in a micrograph where a 1 mm line can be drawn without crossing a foam strut (or wall) is defined as a defect. The regions corresponding to defects are indicated with black dots in images A-F. A representative defect 180 is shown in FIG. 14, but it should be understood that each black dot in images A-F represents a defect, and that not all defects 180 are labeled in the images for the sake of clarity. The area of each defect is calculated by fitting a polygon consisting of an arbitrary number of edges to each area of interest. The sum of all the defect areas is shown under A in table J of FIG. 14. The table labeled J in FIG. 14 compares the aspect ratio (AR)(calculated as described above), the size of the largest defect 180 (shown under S in table J) and overall defect area (A) between the image pairs in similar areas of the midsole 122 and the midsole 122A. Notably, there are marked differences in the largest defect size S and overall defect area A when the aspect ratio is different. The images corresponding to higher aspect ratio foam sub-volumes 164 have smaller defects 180 and lower overall defect area compared to the lower aspect ratio foam volumes. In areas absent of defects, the foam cells themselves have similar structure (I) regardless of gate configuration.

When comparing the midsole 122 with the midsole 122A, the number of injection gate vestiges 160 (corresponding to the number of injection gates) is chosen such that the AR for any foam sub-volume 164 is greater than a threshold. In one aspect, the AR is greater than 2.7, or greater than 3, or greater than 3.5. To achieve these aspect ratios, the mid-foot area 152 of the midsole 122 has two injection gate vestiges 160c and 160d generally in line with the gate vestige axis 172. Additionally, the heel area 150 has two injection gate vestiges 160e and 160f that are offset from the gate vestige axis 172. In one aspect, the gate vestige 160e and the gate vestige 160f form a line that is orthogonal to the gate vestige axis 172. In some aspects, a gate vestige 160 (and a corresponding injection gate in the mold) is added for the midsole 122 when the aspect ratio is below about 3.5, or below about 3 or below about 2.7. Generally, the goal in design is to add and position new gates (and resulting gate vestiges 160) at locations resulting in an increased AR of the new foam sub-volumes 164. As new gates (and resulting gate vestiges 160) are added, the shot size of the melt composition (thermoplastic elastomer composition and foaming agent) is reduced to account for the smaller sub-volume.

As further described herein, for both open-cell and closed-cell structures, the proportion of cells in the thermoplastic elastomer foam of the midsole 122 having a cell diameter of about 50 micrometers to about 1000 micrometers is preferably not less than 40 percent relative to all the cells, or not less than 50 percent or not less than 60 percent relative to all the cells. If the proportion of cells is less than 40 percent, the cell structure will tend to be nonuniform and/or have a coarse cell structure. As used herein, a "coarse cell structure" refers to a foam structure in which the average cell diameter is greater than 1 millimeter, and/or for greater than 20 percent of the cells, a 1 millimeter line drawn across the largest dimension of the cell, will not cross a cell wall or a strut (i.e., an open cell wall or portion thereof).

The number of open cells and/or closed cells and cell diameter of the cells of the foam can be determined visually, for example by capturing an image of a cut surface with a camera, CT scan or digital microscope and as seen in representative images A-F in FIG. 14, determining the number of cells, number of open cells and/or number of closed cells, and determining an area of a cell, and converting it to the equivalent circle diameter.

Figure 16:
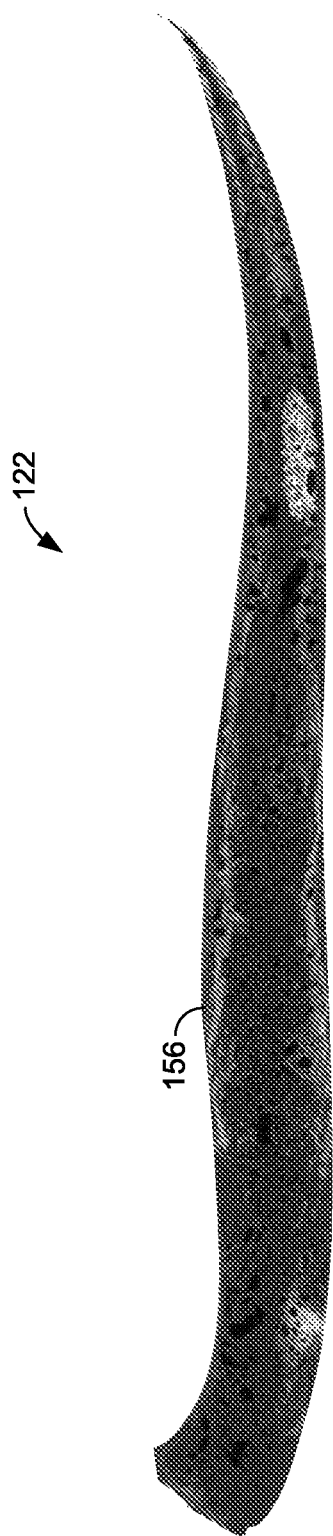
FIG. 16 provides an image view of a cross-section of the midsole of FIG. 1, showing the surface skin.

The bubble or cell size within any foam sub-volume 164 of the midsole 122 has an average cell size gradient with the greater cell sizes in the middle of a respective foam sub-volume 164 and smaller cell sizes as the thermoplastic elastomer foam of the midsole 122 nears the top surface 142 and the bottom surface 144. As best seen in FIG. 16, the thermoplastic elastomer foam, the process conditions, and the design of the midsole 122 create a substantially non-porous, non-foamed (substantially solid) polymeric material surface skin 156 on at least some of the outward facing surfaces of the midsole 122 (such as the top surface 142, the bottom surface 144 and the outer side wall 140). In one aspect, all of the outward facing surfaces of the midsole 122 (such as the top surface 142, the bottom surface 144 and the outer side wall 140) have a surface skin 156. The surface skin 156 is free from any open cells, and allows the midsole 122 to be used in manufacturing without further processing. The surface skin 156 is of the same material as the remainder of the midsole 122 and is integrally formed therewith, but the material is unfoamed, or without a cellular structure (or is a collapsed cell structure) that is substantially solid. In some aspects, the surface skin has a thickness of about 0.5 millimeters to about 0.9 millimeters, or about 0.6 millimeters to about 0.8 millimeters, or from about 0.3 millimeters to about 1 millimeters.

In some aspects, the average cell size of the foam decreases from an average cell size of about one millimeter near the center of any foam sub-volume 164 to an average cell size of less than 0.5 millimeters near the surface skin 156. The cell sizes range from about 1-2 millimeters, or about 0.5-3 millimeters, or about 0.25-3 millimeters.

Foamed Thermoplastic Elastomer Composition

The present disclosure is directed to an article which includes a foam component comprising a foamed thermoplastic elastomer composition. The foam component includes a foamed thermoplastic elastomer composition having a multicellular foam structure, for example, a multicellular open-cell or closed-cell foam structure. The foam component can include the foamed thermoplastic elastomer composition having a multicellular open-cell structure. The article can be a component, such as a cushioning element, for an article of footwear, an article of apparel, or an article of sporting equipment. In one example, the article is a cushioning element for an article of footwear, such as midsole or a midsole component.

It has been found that thermoplastic elastomer compositions (i.e., polymeric compositions comprising one or more thermoplastic elastomer), including thermoplastic polyester compositions (i.e., polymeric compositions comprising one or more thermoplastic polyester elastomer) can be used to form multicellular foams having advantageous properties for use in consumer articles such as cushioning elements. As used herein, and discussed further below, the term polyester can refer to polyester homopolymers and/or copolyester polymers having at least one polyester monomeric segment. When foamed as described herein, these multicellular foams retain thermoplastic properties, making it possible to readily recycle and reuse the thermoplastic elastomer composition of the foam. For example, once foamed, the thermoplastic elastomer composition can be ground, melted to eliminate its foam structure and foamed again, or can be ground, melted to eliminate its foam structure and molded into an article having a non-foamed structure (i.e., a solid article).

The foam components disclosed herein are formed by foaming the thermoplastic elastomer composition into a multicellular foam having an open-cell or a closed-cell foam structure. The thermoplastic elastomer composition can be a thermoplastic polyester composition comprising one or more thermoplastic polyester elastomer. Examples of thermoplastic polyesters include polymers which have one or more carboxylic acid functional group present in the polymeric backbone, on one or more side chains, or both in the polymeric backbone and on one or more side chains. The one or more carboxylic acid functional group of thermoplastic polyester can include a free carboxylic acid, a salt of a carboxylic acid, or an anhydride of a carboxylic acid. The carboxylic acid functional group of thermoplastic polyester can be an acrylic acid functional group or a methacrylic acid functional group.

The thermoplastic elastomer composition can include at least 90 weight percent, or at least 95 weight percent, or at least 99 weight percent, of a polymeric component comprising all of the polymeric materials present in the thermoplastic elastomer composition, based on a total weight of the thermoplastic elastomer composition. In some aspects, the thermoplastic polyester composition includes at least 90 weight percent, or at least 95 weight percent, or at least 99 weight percent of a polymeric component comprising all thermoplastic polyesters present in the thermoplastic polyester composition based on the total weight of thermoplastic polyester composition, e.g., one or more thermoplastic polyester elastomers as disclosed herein, based on the total weight of thermoplastic polyester composition. In some such aspects, the thermoplastic elastomer composition (or thermoplastic polyester composition) is substantially free of a non-polymeric component. The non-polymeric component may include all non-polymeric materials present in the thermoplastic elastomer composition or thermoplastic polyester composition, or may include particular types of non-polymeric materials present in the thermoplastic elastomer composition or the thermoplastic polyester composition. Examples of non-polymeric components can include one or more of nucleating agents, non-polymeric fillers, chemical foaming agents, coloring agents such as pigments and/or dyes, processing aids, and the like. In some examples, the thermoplastic elastomer composition (or thermoplastic polyester composition) is substantially free of nucleating agents, or is substantially free of non-polymeric fillers, or is substantially free of coloring agents, or is substantially free of both non-polymeric nucleating agents and non-polymeric fillers, or is substantially free of non-polymeric nucleating agents, non-polymeric fillers, and coloring agents. Using thermoplastic polyester compositions with low levels of non-polymeric ingredients such as nucleating agents, fillers and coloring agents increases the potential for re-using and recycling these compositions, as these compositions can be used in uses where the presence of one or more of these ingredients is not desired or would require dilution by adding in virgin polymers. Further, the lack of high levels of fillers or coloring agents in the polymeric compositions can reduce the specific gravity of the foams as compared to compositions with high levels of non-polymeric ingredients, and can allow the formation of foams having open-cell foam structures, which can further reduce the specific gravity of the foams.

The article or foam component comprising the thermoplastic elastomer foam can be formed by injection molding and foaming the thermoplastic elastomer polymeric material as described herein to form an article or foam component which can be directly incorporated into an article of footwear, apparel, or sporting equipment without any additional processing, i.e., the dimensions and/or external surfaces of the injection molded foam may not require any modification. When physical foaming agents are used, the injection molded foams formed from the thermoplastic elastomer compositions, including thermoplastic polyester compositions, have been found to be very dimensionally stable in that the foam articles or components shrink very little after being released from the mold and do not require any additional processing in order to stabilize the foam, allowing "one-to-one" injection molding processes to be used, in which the resulting molded foam article or component is essentially the same size as the mold used in the injection molding process. Alternatively, the injection molded foam article or component can be further processed such as, for example, by stabilizing the foam using an annealing process, by compression molding the injection molded foam article or component into a finished foam, and/or by applying a coating or decorative element to the injection molded foam article or component.

Characteristics of Thermoplastic Elastomer Foam Components

A disclosed thermoplastic elastomer foam (i.e., a foam formed by expanding a thermoplastic elastomer composition as disclosed herein), including thermoplastic polyester foams, can exhibit various beneficial properties. For example, the thermoplastic elastomer foam can exhibit a beneficial split tear, for example a high split tear value for a sole component in an article of footwear. In some aspects, the thermoplastic elastomer foam can have a split tear value of greater than about 1.5 kilogram/centimeter (kg/cm), or greater than about 2.0 kg/cm, or greater than about 2.5 kg/cm, when determined using the Split Tear Test Method described herein. In some aspects, the thermoplastic elastomer foam can have a split tear value of 1.0 kg/cm to 4.5 kg/cm, or 1.0 kg/cm to 4.0 kg/cm, or 1.5 kg/cm to 4.0 kg/cm, or 2.0 kg/cm to 3.5 kg/cm, or 2.5 kg/cm to 3.5 kg/cm, when determined using the Split Tear Test method described herein. The thermoplastic elastomer foam can have a split tear value of 0.8 kg/cm to 4.0 kg/cm, or 0.9 kg/cm to 3.0 kg/cm, or 1.0 to 3.0 kg/cm, or of 1.0 kg/cm to 2.5 kg/cm, or 1 kg/cm to 2 kg/cm. In some aspects, the thermoplastic elastomer foam is injection molded, and has a split tear value of 0.7 kg/cm to 2.5 kg/cm, or 0.8 kg/cm to 2.0 kg/cm, or 0.9 to 1.5 kg/cm, or 1.0 kg/cm to 2.5 kg/cm, or of 1.0 kg/cm to 2.2 kg/cm. The thermoplastic elastomer foam can have an open-cell foam structure. The thermoplastic elastomer foam can be the product of physically foaming a thermoplastic elastomer composition as disclosed herein, i.e., a foam formed using a physical foaming agent (i.e., a physical blowing agent). As used herein, a thermoplastic elastomer foam is understood to refer to a foamed material which has thermoplastic and elastomeric properties. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition. In some aspects, the thermoplastic elastomer foam is injection molded (i.e., is not exposed to a separate compression molding step after being formed by injection molding and removed from the injection mold). In other aspects, the thermoplastic elastomer foam is injection molded and subsequently compression molded in a separate compression mold having different dimensions than the mold used in the injection molding step.

The density or specific gravity of a disclosed thermoplastic elastomer foam, including a thermoplastic polyester foam, is also an important physical property to consider when using a foam for an article of apparel, footwear or athletic equipment. As discussed above, the thermoplastic elastomer foam of the present disclosure exhibits a low density or specific gravity, which beneficially reduces the weight of midsoles or other components containing the thermoplastic elastomer foam.

The thermoplastic elastomer foams of the present disclosure, including thermoplastic polyester foams, can have a specific gravity of from 0.02 to 0.22, or 0.03 to 0.12, or 0.04 to 0.10, or 0.11 to 0.12, or 0.10 to 0.12, or 0.15 to 0.20, or 0.15 to 0.30, when determined using the Specific Gravity Test Method described herein. In some aspects, the thermoplastic elastomer foams can have a specific gravity of from 0.15 to 0.22, such as from 0.17 to 0.22 or from 0.18 to 0.21, when determined using the Specific Gravity Test Method described herein. Alternatively or in addition, the thermoplastic elastomer foam can have a specific gravity of from 0.01 to 0.10, or 0.02 to 0.08, or 0.03 to 0.06, or 0.08 to 0.15, or 0.10 to 0.12, when determined using the Specific Gravity Test Method described herein. For example, the specific gravity of the thermoplastic elastomer foam can be from 0.15 to 0.2, or 0.10 to 0.12. The thermoplastic elastomer foam can be injection molded, or can be injection molded and subsequently compression molded. In some aspects, the thermoplastic elastomer foam has a specific gravity of about 0.7 or less, or 0.5 or less, or 0.4 or less, or 0.3 or less, when determined using the Specific Gravity Test Method described herein. In some aspects, the thermoplastic elastomer foam, including the thermoplastic elastomer foam present in midsoles and midsole components, can have a specific gravity of 0.05 to 0.25, or 0.05 to 0.2, or 0.05 to 0.15, or 0.08 to 0.15, or 0.08 to 0.20, or 0.08 to 0.25, or 0.1 to 0.15, when determined using the Specific Gravity Test Method described herein. In some aspects the thermoplastic elastomer foam has a specific gravity of about 0.15 to about 0.3, or about 0.2 to about 0.35, or about 0.15 to about 0.25, when determined using the Specific Gravity Test Method described herein. The thermoplastic elastomer foam article or article component can be formed by injection molding without a subsequent compression molding step. The thermoplastic elastomer foam can have an open-cell foam structure. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition.

The thermoplastic elastomer foams of the present disclosure, including thermoplastic polyester foams, can have a density of from 0.02 grams per cubic centimeter (g/cc) to 0.22 g/cc, or 0.03 g/cc to 0.12 g/cc, or 0.04 g/cc to 0.10 g/cc, or 0.11 g/cc to 0.12 g/cc, or 0.10 g/cc to 0.12 g/cc, or 0.15 g/cc to 0.2 g/cc, or 0.15 g/cc to 0.30 g/cc, when determined using the Density Test Method described herein. In some aspects, the thermoplastic elastomer foams can have a density of from 0.15 g/cc to 0.22 g/cc, such as from 0.17 g/cc to 0.22 g/cc, or from 0.18 g/cc to 0.21 g/cc, when determined using the Density Test Method described herein. Alternatively or in addition, the thermoplastic elastomer foam can have a density of from 0.01 g/cc to 0.10 g/cc, or 0.02 g/cc to 0.08 g/cc, or 0.03 g/cc to 0.06 g/cc, or 0.08 g/cc to 0.15 g/cc, or 0.10 g/cc to 0.12 g/cc, when determined using the Density Test Method described herein. For example, the density of the thermoplastic elastomer foam can be from 0.15 g/cc to 0.2 g/cc, or 0.10 g/cc to 0.12 g/cc. The thermoplastic elastomer foam can be injection molded, or can be injection molded and subsequently compression molded. In some aspects, the thermoplastic elastomer foam has a density of about 0.7 g/cc or less, or 0.5 g/cc or less, or 0.4 g/cc or less, or 0.3 g/cc or less, or 0.2 g/cc or less, when determined using the Density Test Method described herein. In some aspects, the thermoplastic elastomer foam, including the thermoplastic elastomer foam present in midsoles and midsole components, can have a density of 0.05 g/cc to 0.25 g/cc, or 0.05 g/cc to 0.2 g/cc, or 0.05 g/cc to 0.15 g/cc, or 0.08 g/cc to 0.15 g/cc, or 0.08 g/cc to 0.20 g/cc, or 0.08 g/cc to 0.25 g/cc, or 0.10 g/cc to 0.15 g/cc, when determined using the Density Test Method described herein. In some aspects the thermoplastic elastomer foam has a density of about 0.15 g/cc to about 0.30 g/cc, or about 0.20 g/cc to about 0.35 g/cc, or about 0.15 g/cc to about 0.25 g/cc, when determined using the Density Test Method described herein. The thermoplastic elastomer foam article or article component can be formed by injection molding without a subsequent compression molding step. The thermoplastic elastomer foam can have an open-cell foam structure. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition.

The thermoplastic elastomer foam portion of the article or component of an article, including thermoplastic polyester foam portion, can have a stiffness of about 200 kPa to about 1000 kPa, or about 300 to about 900 kPa, or about 400 to about 800 kPa, or about 500 to about 700 kPa, when determined using the Cyclic Compression Test for a Sample with a 45 millimeter diameter cylindrical sample. The thermoplastic elastomer foam portion of the article or component of an article can have a stiffness of about 100 N/mm to about 400 N/mm, or about 150 N/mm to about 350 N/mm, or about 200 N/mm to about 300 N/mm, or about 225 N/mm to about 275 N/mm, when determined using the Cyclic Compression Test for a Foot Form with the foot form sample. The thermoplastic elastomer foam article or article component can be formed by injection molding without a subsequent compression molding step. The thermoplastic elastomer foam can have an open-cell foam structure. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition.

The thermoplastic elastomer foam portion of the article or component of an article, including a thermoplastic polyester portion, can have an Asker C durometer hardness of from about 30 to about 50, or from about 35 to about 45, or from about 30 to about 45, or from about 30 to about 40, when determined using the Durometer Hardness Test described herein. The thermoplastic elastomer foam article or article component can be formed by injection molding without a subsequent compression molding step. The thermoplastic elastomer foam can have an open-cell foam structure. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition.

The energy input of a foam is the integral of the force displacement curve during loading of the foam during the Cyclic Compression test. The energy return of a foam is the integral of the force displacement curve during unloading of the foam during the Cyclic Compression test. The thermoplastic elastomer foam portion of the article or component of an article, including a thermoplastic polyester foam portion, can have an energy return of about 200 millijoules (mJ) to about 1200 mJ, or from about 400 mJ to about 1000 mJ, or from about 600 mJ to about 800 mJ, when determined using the Cyclic Compression Test for a Sample with a 45 millimeter diameter cylindrical sample. The thermoplastic elastomer foam portion of the article or component of an article (e.g., footwear sole for a Men's US Size 10) can have an energy input of about 2000 millijoules (mJ) to about 9000 mJ, or from about 3000 mJ to about 8000 mJ, or from about 4500 mJ to about 6500 mJ, when determined using the Cyclic Compression Test for a Foot Form with the foot form sample. The thermoplastic elastomer foam article or article component can be formed by injection molding without a subsequent compression molding step. The thermoplastic elastomer foam can have an open-cell foam structure. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition.

The energy efficiency (EE), a measure of the percentage of energy of the thermoplastic elastomer foam portion of the article or component, including a thermoplastic polyester foam portion, returns when it is released after being compressed under load, which can provide improved performance for athletic footwear, e.g., for reducing energy loss or dissipation when running. This is especially true for running and other athletic footwear. In some aspects, the thermoplastic elastomer foam portion of the articles and components provided herein have an energy efficiency of at least 50 percent, or at least 60 percent, or at least 70 percent, or at least about 75 percent, or at least about 80 percent, or at least about 85 percent, when determined using the Cyclic Compression Test for a Sample with a 45 millimeter diameter cylindrical sample. The thermoplastic elastomer foam portion of the articles and components provided herein can have an energy efficiency of at about 50 percent to about 97 percent, or about 60 percent to about 95 percent, or about 60 percent to about 90 percent, or about 60 percent to about 85 percent, or about 65 percent to about 85 percent, or about 70 percent to about 85 percent, or about 70 percent to about 90 percent, or about 70 percent to about 95 percent, when determined using the Cyclic Compression Test for a Sample with a 45 millimeter diameter cylindrical sample. The thermoplastic elastomer foam article or article component can be formed by injection molding without a subsequent compression molding step. The thermoplastic elastomer foam can have an open-cell foam structure. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition.

The resulting foams can have a multicellular closed-cell or open-cell foam structure. Cells are the hollow structures formed during the foaming process, in which bubbles are formed in the thermoplastic elastomeric composition by the foaming agents. The cell walls are generally defined by the thermoplastic elastomeric composition. "Closed cells" form an individual volume that is fully enclosed and that is not in fluid communication with an adjoining individual volume. "Closed-cell structures" refer to foam structures in which at least 50 percent or more of the cells are closed cells, or at least 60 percent or more of the cells are closed cells, or at least 80 percent of the cells are closed cells, or at least 90 percent of the cells are closed cells, or at least 95 percent of the cells are closed cells. "Open-cell structures" refer to foam structures in which less than 50 percent, or less than 40 percent, or less than 20 percent, or less than 10 percent, or less than 5 percent or less than 4 percent, or less than 3 percent or less than 1 percent of the cells are closed cells.

The disclosed open-cell and closed-cell thermoplastic elastomer foams may have an average cell size (e.g., maximum width or length) linearly measured from one side of the cell to an opposing side of the cell. For example, in some aspects of this disclosure, open-cell and closed-cell thermoplastic elastomer foams may have an average cell size of from about 50 micrometers to about 1000 micrometers, or from about 80 micrometers to about 800 micrometers, or from about 100 micrometers to about 500 micrometers. These are example cell sizes of one aspect of this disclosure in which foams form portions of a footwear article, and in other aspects the cell sizes may be larger or smaller when foams form other footwear articles. In addition, open-cell and closed-cell thermoplastic elastomer foams may form all or a portion of a non-footwear article, and in those instances, the foams may have a cell diameter including these example cell sizes, smaller than these example cell sizes, larger than these example cell sizes, or any combination thereof.

For both open-cell and closed-cell structures, the proportion of cells in the thermoplastic elastomer foam having a cell diameter of about 50 micrometers to about 1000 micrometers is preferably not less than 40 percent relative to all the cells, or not less than 50 percent or not less than 60 percent relative to all the cells. If the proportion of cells is less than 40 percent, the cell structure will tend to be nonuniform and/or have a coarse cell structure. As used herein, a "coarse cell structure" refers to a foam structure in which the average cell diameter is greater than 1 millimeter, and/or for greater than 20 percent of the cells, a 1 millimeter line drawn across the largest dimension of the cell, will not cross a cell wall or a strut (i.e., an open cell wall or portion thereof).

The number of open cells and/or closed cells and cell diameter of the cells of the foam can be determined visually, for example by capturing an image of a cut surface with a camera or digital microscope, determining the number of cells, number of open cells and/or number of closed cells, and determining an area of a cell, and converting it to the equivalent circle diameter.

Methods of Manufacturing Disclosed Foams

In some examples, the disclosed foamed thermoplastic elastomer compositions can be prepared by various methods as disclosed herein and as known in the art. That is, disclosed articles or components of articles such as midsoles, midsole components, inserts and insert components can be prepared by injection molding a melt composition comprising a thermoplastic elastomer composition as described herein using a physical foaming agent, using a combination of a physical foaming agent and a chemical foaming agent, or using only a chemical foaming agent. A disclosed foam component, e.g., a disclosed foam article or component, can be prepared by the methods disclosed herein below.

Disclosed herein are methods for making a foam article or component, the method comprising: forming a mixture of a molten thermoplastic elastomer composition and a foaming agent; injecting the mixture into a mold cavity; foaming the thermoplastic elastomer composition, thereby forming a foamed thermoplastic elastomer composition; solidifying the foamed thermoplastic elastomer composition, thereby forming a foam article having a multicellular foam structure; and removing the foam article from the mold cavity. In some aspects, forming the mixture of the thermoplastic elastomer composition and the foaming agent comprises forming a single-phase solution of a liquid, gas or supercritical fluid foaming agent and the molten thermoplastic elastomer composition. In some aspects, the mixture is a single-phase solution of supercritical nitrogen or supercritical carbon dioxide and the thermoplastic elastomer composition. In a particular example, the mixture is a single-phase solution of supercritical nitrogen in a thermoplastic polyester composition. In some aspects, the thermoplastic elastomer composition comprises less than 10 weight percent, or less than 5 weight percent, or less than 1 weight percent of non-polymeric ingredients based on a total weight of the thermoplastic elastomer composition. In such aspects, injecting the mixture into a mold cavity can comprise injecting the single-phase solution into a mold cavity, then cooling the single-phase solution in the mold cavity prior to decreasing pressure in the mold cavity to a level at which the supercritical fluid phase transitions to a gas, and the gas drops out of solution in the molten polymer, forming gas bubbles in the molten polymer and foaming the molten polymer. In some aspects, the foaming forms a foam having an open-cell foam structure.

Also disclosed are methods for making a foam article or component, the method comprising: forming a mixture of a molten thermoplastic elastomer composition and a foaming agent; injecting the mixture into a mold cavity; foaming the molten thermoplastic elastomer composition in the mold cavity, thereby forming a thermoplastic elastomer foam; solidifying the thermoplastic elastomer foam in the mold cavity, thereby forming a molded foam article comprising a thermoplastic elastomer composition having a multicellular foam structure; and removing the molded foam article from the mold cavity. In some aspects, the temperature of the mixture at the point that it is foamed in the mold cavity is from about the melting temperature of the thermoplastic elastomer composition to about 50 degrees C. above the tail temperature of the thermoplastic elastomer composition. In some aspects, the melting temperature of the thermoplastic elastomer composition is the melting temperature of a polymeric component of the thermoplastic elastomer composition. In other aspects, the melting temperature of the thermoplastic elastomer composition is the melting temperature of a thermoplastic elastomer present in the thermoplastic elastomer composition. In yet other aspects, the melting temperature of the thermoplastic elastomer present in the thermoplastic elastomer composition is the melting temperature of the thermoplastic elastomer having the highest melting temperature of all polymers present in the polymeric component of the thermoplastic elastomer composition. In yet other aspects, the melting temperature is the melting temperature of a thermoplastic polyester, such as a polyester elastomer, present in the thermoplastic elastomer composition. The foaming can occur when the mixture is at a foaming temperature, wherein the foaming temperature is a temperature from about the melting temperature of the thermoplastic elastomer to about 50 degrees C. above the tail temperature of the thermoplastic elastomer. In some aspects, forming the mixture of the thermoplastic elastomer composition and a foaming agent comprises forming a single-phase solution of a supercritical fluid and the molten thermoplastic elastomer composition. The thermoplastic elastomer composition can comprise less than 10 weight percent, or less than 5 weight percent, or less than 1 weight percent of non-polymeric ingredients based on a total weight of the thermoplastic elastomer composition. If more than one thermoplastic elastomer is present in the thermoplastic elastomer composition, the melting temperature can be the highest melting temperature of the thermoplastic elastomers present in the composition. In such aspects, injecting the mixture into a mold cavity can comprise injecting the single-phase solution into a mold cavity, then cooling the single-phase solution in the mold cavity prior to decreasing pressure in the mold cavity to a level at which the supercritical fluid phase transitions to a gas, and the gas drops out of solution in the thermoplastic elastomer composition, forming gas bubbles in the thermoplastic elastomer composition and foaming the thermoplastic elastomer. The foaming can form a foam having an open-cell foam structure.

Dynamic scanning calorimetry (DSC) is used to determine the melting temperature and the tail temperature of the thermoplastic elastomer composition, or of the polymeric component of the thermoplastic elastomer composition, or of an individual thermoplastic elastomer present in the thermoplastic elastomer composition, and an exemplary method is described herein below. Briefly, 10-30 mg pieces of undried resin pellets are cycled from −90 degrees C. to 225 degrees C. at 20 degrees C./min and cooled to −90 degrees C. at 10 degrees C./min. In some instances, experiments are run using a heat-cool-heat profile with a ramp rate of 10 degrees C. per min, minimum temperature of 0 degrees C. and maximum temperature of 250 degrees C. Analyses should be determined in duplicate. The melting temperature and glass transition temperature values are recorded from the second cycle. The melt "peak" is identified as the local maximum of the second heating cycle. If there is more than one peak in the DSC curve, the peak occurring at hotter temperatures is chosen as the temperature reference. The tail is identified as the intersection of the tangent of the line of the higher temperature side of the melt peak with the extrapolated baseline.

The disclosed foamed thermoplastic elastomer compositions can be prepared using a suitable injector. The injector can have a motor to turn a screw inside the injector. The injector may include a single screw or twin screws, and may include individual elements of various sizes and pitches appropriate for mixing or kneading the specific materials used.

The various components included in the foamed thermoplastic elastomer compositions described herein can be added into the injector through one or more ports. The various components can be added as a melt or as appropriately-sized solid particles, for example chips or pellets, which may be melted as they are mixed in the barrel of the injector. The contents of the injector can be heated to melt the composition. A physical foaming agent such as, for example, a supercritical fluid can be added into the melt while it is present in the barrel of the injector. In one example, thermoplastic polyester foam is prepared by using a physical foaming agent which foams the composition in the mold cavity, and the resulting thermoplastic elastomer foam is thus substantially free of unreacted chemical blowing agents or a decomposition or degradation product of a chemical blowing agent. The thermoplastic elastomer composition can be added to the injector as a melt at a temperature close to the melting temperature of the polymeric component of the composition.

If a chemical foaming agent is used, the processing (melting) temperature used can be sufficiently below the temperature that would trigger the chemical foaming agent. In order to foam the composition, the temperature near the exit of the injector or within the mold cavity can be increased to a temperature close to or at the triggering temperature of the chemical foaming agent, thereby producing a chemically foamed thermoplastic polyester foam as the composition exits the injector (e.g., as the composition is injected into a mold cavity), or within the mold cavity. Additionally or alternatively, the temperature of the runners leading to the mold cavity or the mold cavity or both can be a temperature at or above the triggering temperature of the chemical foaming agent, thereby producing a chemically foamed thermoplastic elastomer foam within the runners and/or the mold cavity.

Alternatively or in addition, a physical foaming agent can be used to foam the thermoplastic elastomer composition to form a physically foamed thermoplastic elastomer foam, or a physically and chemically foamed thermoplastic elastomer foam. For example, a supercritical fluid such as supercritical carbon dioxide or supercritical nitrogen can be mixed with the molten thermoplastic elastomer composition in the barrel of the injector to form a single-phase solution. A pressure drop can be used to cause the supercritical fluid to transition to the gas phase and foam the thermoplastic elastomer composition. In one aspect, a gas counter-pressure can be applied to the mold cavity and to the runners leading to the mold cavity. The counter pressure can be a pressure sufficiently high to keep the supercritical fluid in solution within the runners and the mold cavity. Once a dose of the single-phase solution is in the mold cavity, the counter-pressure within the mold cavity can be decreased to a level at which the supercritical fluid phase transitions to a gas and drops out of solution in the molten thermoplastic elastomer composition, forming gas bubbles in the thermoplastic elastomer composition and foaming the thermoplastic elastomer composition in the mold cavity. In one aspect the thermoplastic elastomer composition comprises less than 10 weight percent, or less than 5 weight percent, or less than 1 weight percent of non-polymeric ingredients based on a total weight of the thermoplastic elastomer composition, and the multicellular foam has an open-cell structure.

The articles, cushioning elements, or components of articles such as midsoles, midsole components, inserts and insert components can be prepared by injection molding a thermoplastic elastomer composition described herein using a physical foaming agent. The injection molding process can use a screw-type injector that allows for maintaining and controlling the pressure in the injector barrel. The injection molding machine can allow metering and delivering a supercritical fluid such as carbon dioxide or nitrogen into the thermoplastic elastomer composition prior to injection. The supercritical fluid can be mixed into the thermoplastic elastomer composition within the injection barrel and then injected into the mold cavity. When the temperature and/or pressure is altered to the point that the solubility of the supercritical fluid in the molten thermoplastic elastomer composition is altered and the supercritical fluid transitions to the gas phase, these physical processes will cause expansion (foaming) of the molten thermoplastic elastomer composition. The injection molding process can include physical foaming of the compositions described herein using an injection molding process which forms a multicellular foam structure, such as, for example the "MUCELL" process (Trexel Inc., Wilmington, Massachusetts, USA).

The thermoplastic elastomer foams described herein can be made using a process that involves impregnating a thermoplastic elastomer composition (e.g., at or above a softening temperature of the composition) with a physical foaming agent at a first concentration or first pressure. As used herein, the term "impregnating" generally means dissolving or suspending a physical foaming agent in a composition. The impregnated composition can then be foamed, or can be cooled (when applicable) and re-softened (when applicable) for foaming at a later time. In some aspects, the impregnated molten thermoplastic elastomer composition forms a single-phase solution comprising a supercritical fluid (e.g., carbon dioxide or nitrogen) dissolved in the molten thermoplastic elastomer composition. In one aspect, the thermoplastic elastomer composition comprises less than 10 weight percent, or less than 5 weight percent, or less than 1 weight percent of non-polymeric ingredients based on a total weight of the thermoplastic elastomer composition.

The impregnated thermoplastic elastomer composition (e.g., the single-phase solution) is foamed by reducing the solubility of the physical foaming agent in the thermoplastic elastomer composition through pressure and/or temperature changes. The pressure and/or temperature change can occur immediately after the impregnated composition exits the injector or the injection barrel, or can occur in the runners leading to the mold cavity, or can occur in the mold cavity. For example, the system can include hot runners or gas counter-pressure or both, which control the temperature and pressure under which the impregnated composition is held, up to and including the point at which the composition enters the mold cavity. In some aspects, the temperature and pressure under which the impregnated composition is held are controlled such that the impregnated composition remains a single-phase solution up to and including the point it enters the mold cavity. Once the single-phase solution has flowed into the mold cavity, the temperature or the pressure or both can be altered to reduce the solubility of the supercritical fluid in the molten thermoplastic elastomer composition, causing the molten thermoplastic elastomer composition to expand into a foam, including a foam having an open-cell foam structure. The reduction in solubility of the physical foaming agent can release additional amounts of gas (e.g., to create a secondary expansion of a partially-foamed thermoplastic elastomer composition), to further expand the composition, forming a foam structure (e.g., a foam having a multicellular structure). Alternatively or additionally, a chemical blowing agent can be activated in the thermoplastic elastomer composition in the mold cavity to create a secondary expansion of a partially-foamed thermoplastic elastomer composition.

Chemical foaming agents may be endothermic or exothermic, which refers to a type of decomposition or degradation they undergo to produce the gas used to produce the foam. The decomposition or degradation may be triggered by thermal energy present in the molding system. Endothermic foaming agents absorb energy and typically release a gas, such as carbon dioxide, upon decomposition. Exothermic foaming agents release energy and generate a gas, such as nitrogen, when decomposed. Regardless of the chemical foaming agent used, thermal variables of the thermoplastic elastomer composition being foamed and thermal variables of the foaming agent to be decomposed or degraded are coupled together such that process parameters are selected so that the thermoplastic elastomer composition can be foamed and molded and the foaming agent can decompose or degrade at an appropriate phase of the foaming and molding process.

Thermoplastic Elastomer Composition

Thermoplastic elastomer compositions disclosed herein include one or more thermoplastic elastomers. The one or more thermoplastic elastomers can be one or more thermoplastic polyester elastomers. In some aspects, the thermoplastic elastomer composition includes at least 90 percent, or at least 95 weight percent, or at least 99 weight percent of a thermoplastic resin component, based on the total weight of the thermoplastic elastomer composition, where thermoplastic resin component includes all the polymers present in the composition. Thermoplastic resin component comprises one or more thermoplastic elastomers. Thermoplastic resin component can comprise at least one thermoplastic polyester elastomer. Thermoplastic resin component can comprise more than one thermoplastic polyester elastomer. Thermoplastic resin component can comprise one or more thermoplastic polyester elastomer, and one or more thermoplastic polyester which is not an elastomer. In some aspects, thermoplastic resin component comprises the one or more thermoplastic polyester, and further comprises one or more thermoplastic polymers each of which is not a polyester. The one or more thermoplastic polymers each of which is not a polyester can each be a thermoplastic elastomer. Alternatively, in other aspects, thermoplastic resin component consists essentially of the one or more thermoplastic elastomer. Optionally, thermoplastic resin component can consist essentially of one or more thermoplastic polyester elastomer. In some aspects, the thermoplastic elastomer composition comprises less than 10 weight percent, or less than 5 weight percent, or less than 1 weight percent of non-polymeric ingredients based on the total weight of the thermoplastic elastomer composition. In some aspects, the thermoplastic elastomer composition is substantially free of non-polymeric nucleating agents, or is substantially free of non-polymeric fillers, or is substantially free of coloring agents, or is substantially free of non-polymeric processing aids, or is substantially free of both non-polymeric nucleating agents and non-polymeric fillers, or is substantially free of non-polymeric nucleating agents, non-polymeric fillers, coloring agents, and non-polymeric processing aids. In some such aspects, the thermoplastic elastomer composition comprises less than 10 weight percent, or less than 5 weight percent, or less than 1 weight percent of solid coloring agents, based on the total weight of the thermoplastic elastomer composition. In one aspect, the thermoplastic elastomer composition consists essentially of one or more thermoplastic elastomers. In another aspect, the thermoplastic elastomer composition consists essentially of one or more thermoplastic polyester elastomers. It should be understood that a thermoplastic polyester elastomer can refer to a thermoplastic polyester homopolymer elastomer, a thermoplastic copolyester elastomer, or both. In aspects, the thermoplastic copolyester elastomer can include copolyesters having two or more types of polyester monomeric segments, or copolyesters comprising polyester monomeric segments and one or more non-polyester monomeric segments.

In some aspects, the resin component of the thermoplastic elastomer composition, which is comprised of all the polymeric materials present in thermoplastic polyester composition, consists essentially of the one or more thermoplastic elastomers, or consists essentially of the one or more thermoplastic polyesters. Thermoplastic polyesters can include chain units derived from one or more olefins and chain units derived from one or more ethylenically-unsaturated acid groups, in aspects.

The thermoplastic elastomer compositions can have a melt flow index of from about 5 to about 40, or about 10 to about 20, or about 20 to about 30 as determined at 210 degrees C. using a 2.16 kilogram weight. Alternatively or additionally, the thermoplastic elastomer compositions can have a melt flow index of from about 5 to about 40, or about 10 about 20, or about 20 to about 30 as determined at 220 degrees C. using a 2.16 kilogram weight. Alternatively or additionally, the thermoplastic elastomer compositions can have a melt flow index of from about 5 to about 40, or about 10 to about 20, or about 20 to about 30 as determined at 230 degrees C. using a 2.16 kilogram weight.

The thermoplastic elastomer, including thermoplastic polyester, can have a weight average molecular weight of about 50,000 Daltons to about 1,000,000 Daltons; or about 50,000 Daltons to about 500,000 Daltons; or about 75,000 Daltons to about 300,000 Daltons; or about 100,000 Daltons to about 250,000 Daltons; or about 100,000 Daltons to about 500,000 Daltons.

The thermoplastic elastomers, including thermoplastic copolyesters, can be terpolymers. In some aspects, thermoplastic copolyesters can be terpolymers of moieties derived from ethylene, acrylic acid, and methyl acrylate or butyl acrylate. In some aspects, a ratio of a total parts by weight of the acrylic acid in thermoplastic copolyesters to a total weight of thermoplastic copolyesters is about 0.05 to about 0.6, or about 0.1 to about 0.6, or about 0.1 to about 0.5, or about 0.15 to about 0.5, or about 0.2 to about 0.5.

The thermoplastic elastomers can be terpolymers comprising a plurality of first segments, a plurality of second segments, and a plurality of third segments. In some aspects, the thermoplastic elastomer is a thermoplastic copolyester comprising: (a) a plurality of first segments, each first segment derived from a dihydroxy-terminated polydiol; (b) a plurality of second segments, each second segment derived from a diol; and (c) a plurality of third segments, each third segment derived from an aromatic dicarboxylic acid. In various aspects, thermoplastic copolyester is a block copolymer. In some aspects, thermoplastic copolyester is a segmented copolymer. In further aspects, thermoplastic copolyester is a random copolymer. In still further aspects, thermoplastic copolyester is a condensation copolymer.

The thermoplastic elastomer, including thermoplastic copolyester, can have a ratio of first segments to third segments from about 1:1 to about 1:5 based on the weight of each of the first segments and the third segments; or about 1:1 to about 1:4 based on the weight of each of the first segments and the third segments; or about 1:1 to about 1:2 based on the weight of each of the first segments and the third segments; or about 1:1 to about 1:3 based on the weight of each of the first segments and the third segments.

The thermoplastic elastomer, including thermoplastic copolyester, can have a ratio of second segments to third segments from about 1:1 to about 1:2 based on the weight of each of the first segments and the third segments; or about 1:1 to about 1:1.52 based on the weight of each of the first segments and the third segment.

The thermoplastic elastomer, including thermoplastic copolyester, can have first segments derived from a poly (alkylene oxide)diol having a number-average molecular weight of about 250 Daltons to about 6000 Daltons; or about 400 Daltons to about 6,000 Daltons; or about 350 Daltons to about 5,000 Daltons; or about 500 Daltons to about 3,000 Daltons; or about 2,000 Daltons to about 3,000 Daltons.

The thermoplastic elastomer, including thermoplastic copolyester, can have first segments derived from a poly (alkylene oxide)diol such as poly(ethylene ether)diol; poly (propylene ether)diol; poly(tetramethylene ether)diol; poly (pentamethylene ether)diol; poly(hexamethylene ether)diol; poly(heptamethylene ether)diol; poly(octamethylene ether) diol; poly(nonamethylene ether)diol; poly(decamethylene ether)diol; or mixtures thereof. In a still further aspect, thermoplastic copolyester can have first segments derived from a poly(alkylene oxide)diol such as poly(ethylene ether) diol; poly(propylene ether)diol; poly(tetramethylene ether) diol; poly(pentamethylene ether)diol; poly(hexamethylene ether)diol. In a yet further aspect, thermoplastic copolyester can have first segments derived from a poly(tetramethylene ether)diol.

The thermoplastic elastomer, including thermoplastic copolyester, can have second segments derived from a diol having a molecular weight of less than about 250. The diol from which the second segments are derived can be a C2-C8 diol. In a still further aspect, the second segments can be derived from ethanediol; propanediol; butanediol; pentanediol; 2-methyl propanediol; 2,2-dimethyl propanediol; hexanediol; 1,2-dihydroxy cyclohexane; 1,3-dihydroxy cyclohexane; 1,4-dihydroxy cyclohexane; and mixtures thereof. In a yet further aspect, the second segments can be derived from 1,2-ethanediol, 1,3-propanediol, 1,4-butanediol, 1,6-hexanediol, and mixtures thereof. In an even further aspect, the second segments can be derived from 1,2-ethanediol. In a still further aspect, the second segments can be derived from 1,4-butanediol.

The thermoplastic elastomer, including the copolyester, can have third segments derived from an aromatic C5-C16 dicarboxylic acid. The aromatic C5-C16 dicarboxylic acid can have a molecular weight less than about 300 Daltons; about 120 Daltons to about 200 Daltons; or a value or values of molecular weight within any of the foregoing ranges or a molecular weight range encompassing any sub-range of the foregoing ranges. In some instances, the aromatic C5-C16 dicarboxylic acid is terephthalic acid, phthalic acid, isophthalic acid, or a derivative thereof. In a still further aspect, the aromatic C5-C16 dicarboxylic acid is a diester derivative of the terephthalic acid, phthalic acid, or isophthalic acid. In a yet further aspect, the aromatic C5-C16 dicarboxylic acid is terephthalic acid or the dimethyl ester derivative thereof.

Thermoplastic copolyester can comprise: (a) a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a Formula 1:

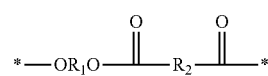

(Formula 1)

wherein $R_1$ is a group remaining after removal of terminal hydroxyl groups from the poly(alkylene oxide)diol of the first segment, wherein the poly(alkylene oxide)diol of the first segment is a poly(alkylene oxide)diol having a number-average molecular weight of about 400 to about 6000; and wherein $R_2$ is a group remaining after removal of carboxyl groups from the aromatic dicarboxylic acid of the third segment; and (b) a plurality of second copolyester units, each second copolyester unit of the plurality comprising the second segment derived from a diol and the third segment derived from an aromatic dicarboxylic acid, wherein the second copolyester unit has a structure represented by a Formula 2:

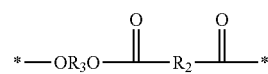

(Formula 2)

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

Thermoplastic copolyester can comprise a plurality of first copolyester units having a structure represented by a Formula 3:

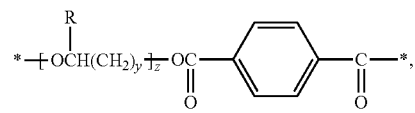

(Formula 3)

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons. In some aspects, in the foregoing formula, y can be an integer having a value of 1, 2, 3, 4, 5, 6, 7, 8, 9, 10; or y can be any set or range of the foregoing integer values. In some aspects, in the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any set or range of the foregoing integer values. In some aspects, R is hydrogen. In a still further aspect, R is methyl. In some instances, R is hydrogen and y is an integer having a value of 1, 2, or 3. Alternatively, in other instances, R is methyl and y is an integer having a value of 1.

Thermoplastic copolyester can comprise a plurality of first copolyester units having a structure represented by a Formula 4:

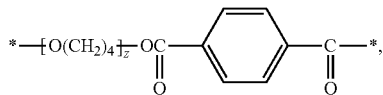

(Formula 4)

wherein z is an integer having a value from 2 to 60; and wherein a weight average molecular weight of each of the plurality of first copolyester units is from about 300 Daltons to about 7,000 Daltons. In some aspects, in the foregoing formula, y can be an integer having a value of 1, 2, 3, 4, 5, 6, 7, 8, 9, 10; or y can be any set or range of the foregoing integer values. In some aspects, in the foregoing formula, z is an integer having a value from 5 to 60; or an integer having a value from 5 to 50; or an integer having a value from 5 to 40; or an integer having a value from 4 to 30; or an integer having a value from 4 to 20; or an integer having a value from 2 to 10.

Thermoplastic copolyester can comprise a plurality of first copolyester units having a weight average molecular weight from about 400 Daltons to about 6,000 Daltons; or about 400 Daltons to about 5,000 Daltons; or about 400 Daltons to about 4,000 Daltons; or about 400 Daltons to about 3,000 Daltons; or about 500 Daltons to about 6,000 Daltons; or about 500 Daltons to about 5,000 Daltons; or about 500 Daltons to about 4,000 Daltons; or about 500 Daltons to about 3,000 Daltons; or about 600 Daltons to about 6,000 Daltons; or about 600 Daltons to about 5,000 Daltons; or about 600 Daltons to about 4,000 Daltons; or about 600 Daltons to about 3,000 Daltons; or about 2,000 Daltons to about 3,000 Daltons.

Thermoplastic copolyester can comprise a plurality of second copolyester units, each second copolyester unit of the plurality having a structure represented by a Formula 5:

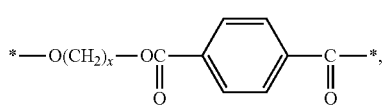

(Formula 5)

wherein x is an integer having a value from 1 to 20; wherein the foam article has a multicellular closed-cell or open-cell foam structure. In some aspects, in the foregoing formula, x is an integer having a value from 2 to 18; 2 to 17; 2 to 16; 2 to 15; 2 to 14; 2 to 13; 2 to 12; 2 to 11; 2 to 10; 2 to 9; 2 to 8; 2 to 7; 2 to 6; 2 to 5; 2 to 4; or x can be any integer value or set of integer values within the foregoing ranges or values, or any range of integer values encompassing a sub-range of the foregoing integer value ranges. In a further aspect, x is an integer having a value of 2, 3, or 4.

Thermoplastic copolyester can comprise a plurality of second copolyester units, each second copolyester unit of the plurality having a structure represented by a Formula 6:

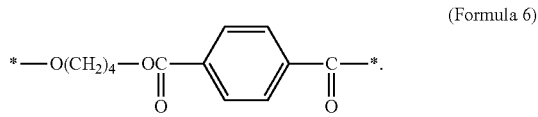

(Formula 6)

Thermoplastic copolyester can comprise a weight percent range of the plurality of first copolyester units based on total weight of thermoplastic copolyester such that the weight percent range is about 30 weight percent to about 80 weight percent; or about 40 weight percent to about 80 weight percent; or about 50 weight percent to about 80 weight percent; or about 30 weight percent to about 70 weight percent; or about 40 weight percent to about 70 weight percent; or about 50 weight percent to about 70 weight percent; or about 40 weight percent to about 65 weight percent; or about 45 weight percent to about 65 weight percent; or about 50 weight percent to about 65 weight; or about 55 weight percent to about 65 weight percent; or about 40 weight percent to about 60 weight percent; or about 45 weight percent to about 60 weight percent; or about 50 weight percent to about 60 weight percent; or about 55 weight percent to about 60 weight percent.

In some aspects, the thermoplastic elastomer, including thermoplastic copolyester, can comprise phase separated domains. For example, a plurality of first segments derived from a dihydroxy-terminated polydiol can phase-separate into domains comprising primarily the first segments. Moreover, a plurality of second segments derived from a diol can phase-separate into domains comprising primarily the second segments. In other aspects, thermoplastic copolyester can comprise phase-separated domains comprising primarily of a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a Formula 1:

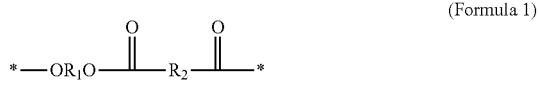

(Formula 1)

wherein $R_1$ is a group remaining after removal of terminal hydroxyl groups from the poly(alkylene oxide)diol of the first segment, wherein the poly(alkylene oxide)diol of the first segment is a poly(alkylene oxide)diol having a number-average molecular weight of about 400 to about 6000; and wherein $R_2$ is a group remaining after removal of carboxyl groups from the aromatic dicarboxylic acid of the third segment; and other phase-separated domains comprising primarily of a plurality of second copolyester units, each second copolyester unit of the plurality comprising the second segment derived from a diol and the third segment derived from an aromatic dicarboxylic acid, wherein the second copolyester unit has a structure represented by a Formula 2:

(Formula 2)

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

In other aspects, thermoplastic copolyester can comprise phase-separated domains comprising primarily of a plurality of first copolyester units, each first copolyester unit of the plurality having a structure represented by a Formula 3:

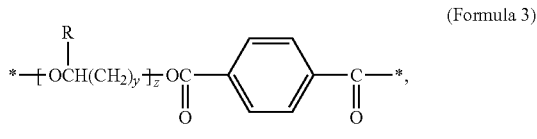

(Formula 3)

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons. In some aspects, in the foregoing formula, y can be an integer having a value of 1, 2, 3, 4, 5, 6, 7, 8, 9, 10; or y can be any set or range of the foregoing integer values. In some aspects, in the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any set or range of the foregoing integer values. In some aspects, R is hydrogen. In a still further aspect, R is methyl. In some instances, R is hydrogen and y is an integer having a value of 1, 2, or 3. Alternatively, in other instances, R is methyl and y is an integer having a value of 1.

In other aspects, thermoplastic copolyester can comprise phase-separated domains comprising primarily of a plurality of first copolyester units, each first copolyester unit of the plurality having a structure represented by a Formula 4:

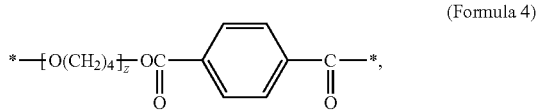

(Formula 4)

wherein z is an integer having a value from 2 to 60; and wherein a weight average molecular weight of each of the plurality of first copolyester units is from about 300 Daltons to about 7,000 Daltons. In some aspects, in the foregoing formula, y can be an integer having a value of 1, 2, 3, 4, 5, 6, 7, 8, 9, 10; or y can be any set or range of the foregoing integer values. In some aspects, in the foregoing formula, z is an integer having a value from 5 to 60; or an integer having a value from 5 to 50; or an integer having a value from 5 to 40; or an integer having a value from 4 to 30; or an integer having a value from 4 to 20; or an integer having a value from 2 to 10.

Thermoplastic copolyester can comprise phase-separated domains comprising primarily of a plurality of first copolyester units having a weight average molecular weight from about 400 Daltons to about 6,000 Daltons; or about 400 Daltons to about 5,000 Daltons; or about 400 Daltons to about 4,000 Daltons; or about 400 Daltons to about 3,000 Daltons; or about 500 Daltons to about 6,000 Daltons; or about 500 Daltons to about 5,000 Daltons; or about 500 Daltons to about 4,000 Daltons; or about 500 Daltons to about 3,000 Daltons; or about 600 Daltons to about 6,000 Daltons; or about 600 Daltons to about 5,000 Daltons; or about 600 Daltons to about 4,000 Daltons; or about 600 Daltons to about 3,000 Daltons; or about 2,000 Daltons to about 3,000 Daltons In other aspects, thermoplastic copolyester can comprise phase-separated domains comprising a plurality of second copolyester units, each second copolyester unit of the plurality having a structure represented by a Formula 5:

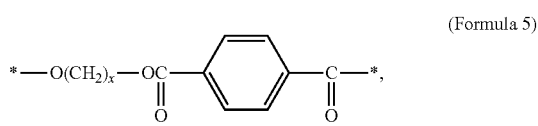

(Formula 5)

wherein x is an integer having a value from 1 to 20; wherein the foam article has a multicellular closed-cell or open-cell foam structure. In some aspects, in the foregoing formula, x is an integer having a value from 2 to 18; or 2 to 17; or 2 to 16; or 2 to 15; or 2 to 14; or 2 to 13; or 2 to 12; or 2 to 11; or 2 to 10; or 2 to 9; or 2 to 8; or 2 to 7; or 2 to 6; or 2 to 5; or 2 to 4.

In other aspects, thermoplastic copolyester can comprise phase-separated domains comprising a plurality of second copolyester units, each second copolyester unit of the plurality having a structure represented by a Formula 6:

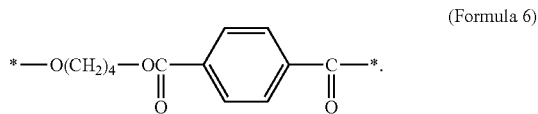

(Formula 6)

Thermoplastic copolyester can comprise phase-separated domains comprising a weight percent range of the plurality of first copolyester units based on total weight of thermoplastic copolyester such that the weight percent range is about 30 weight percent to about 80 weight percent; or about 40 weight percent to about 80 weight percent; or about 50 weight percent to about 80 weight percent; or about 30 weight percent to about 70 weight percent; or about 40 weight percent to about 70 weight percent; or about 50 weight percent to about 70 weight percent; or about 40 weight percent to about 65 weight percent; or about 45 weight percent to about 65 weight percent; or about 50 weight percent to about 65 weight percent; or about 55 weight percent to about 65 weight percent; or about 40 weight percent to about 60 weight percent; or about 45 weight percent to about 60 weight percent; or about 50 weight percent to about 60 weight percent; or about 55 weight percent to about 60 weight percent.

In various aspects, the thermoplastic elastomer composition can include one or more thermoplastic polyester homopolymer, where the thermoplastic polyester homopolymer comprises any of the polyester monomeric segments or units disclosed herein or modifications thereof. In the same or alternative aspects, the thermoplastic elastomer composition can include one or more thermoplastic polyester homopolymer, where the thermoplastic polyester homopolymer comprises any polyester homopolymer exhibiting any or all of the properties and parameters discussed herein with respect to thermoplastic elastomers and/or the thermoplastic elastomer composition.

The disclosed thermoplastic elastomer composition, the polymeric component of the composition or an individual thermoplastic elastomer in neat form can be characterized by one or more properties. In some aspects, the thermoplastic elastomer composition or the polymeric component, or the polymer has a maximum load of about 10 newtons to about 100 newtons, or from about 15 newtons to about 50 newtons, or from about 20 newtons to about 40 newtons, when determined using the Cyclic Tensile Test method described herein.

The tensile strength of the thermoplastic elastomer composition or of the polymeric component of the thermoplastic elastomer composition or of a thermoplastic elastomer in neat form is another important physical characteristic. The thermoplastic elastomer composition or polymeric component or elastomer can have a tensile strength of from 5 kilograms per square centimeter to 25 kilograms per square centimeter, or of from 10 kilograms per square centimeter to 23 kilograms per square centimeter, or of from 15 kilograms per square centimeter to 22 kilograms per square centimeter, when determined using the Cyclic Tensile Test method described herein.

The thermoplastic elastomer composition or polymeric component of the thermoplastic elastomer composition or a thermoplastic elastomer in neat form can have a tensile modulus of about 2 megapascals to about 20 megapascals or from about 5 megapascals to about 15 megapascals when determined using the Cyclic Tensile Test method described herein.

Exemplary, but non-limiting, thermoplastic elastomers, including thermoplastic polyesters, that can be used in the disclosed methods, foams, and articles include "HYTREL" 3078, "HYTREL" 4068, and "HYTREL" 4556 (DuPont, Wilmington, Delaware, USA); "PELPRENE" P30B, P40B, and P40H (Toyobo U.S.A. Inc., New York, New York, USA); "TRIEL" 5300, "TRIEL" 5400, and blends thereof (Samyang Corporation, Korea); "KEYFLEX" BT1028D, BT1033D, BT1035D, BT1040D, BT1045D, and BT1047D (LG Chem, Korea); and "KOPEL" KP3340, KP3346, KP3347 (Kolon Plastics, Inc., Korea).

The disclosed thermoplastic elastomer compositions can further include one or more ionomers, such as any of the "SURLYN" polymers (DuPont, Wilmington, Delaware, USA). Foams as described herein can be made by a process/method including receiving a composition described herein, and physically foaming the composition to form a thermoplastic elastomer foam having a density of about 0.7 gram per cubic centimeter or less, or 0.5 gram per cubic centimeter or less, or 0.4 gram per cubic centimeter or less, or 0.3 gram per cubic centimeter or less.

The disclosed thermoplastic elastomer compositions can further include one or more thermoplastic polyurethanes, such as "FORTIMO" (Mitsui Chemicals, Inc., Tokyo, Japan); "TEXIN" (Covestro LLC, Pittsburgh, Pennsylvania, USA); and "BOUNCELL-X" (Lubrizol Advanced Materials, Inc., Brecksville, Ohio, USA).

The disclosed thermoplastic elastomer compositions can further include one or more olefinic polymers. Olefinic polymers can include ethylene-based copolymers, propylene-based copolymers, and butene-based copolymers. In some aspects, the olefinic polymer is an ethylene-based copolymer such as a styrene-ethylene/butylene-styrene (SEBS) copolymer; an ethylene-propylene diene monomer (EPDM) copolymer; an ethylene-vinyl acetate (EVA) copolymer; an ethylene alkyl acrylate (EAA) copolymer; an ethylene alkyl methacrylate (EAMA) copolymer; any copolymer thereof, and any blend thereof. In some aspects, a ratio V of a total parts by weight of the olefinic polymers present in the composition to a total parts by weight of thermoplastic polyesters in the composition is about 0.0 to about 0.6, or about 0.0 to about 0.4, or about 0.01 to about 0.4, or about 0.01 to about 0.6, or about 0.1 to about 0.4.

The disclosed thermoplastic elastomer compositions can further include an ethylene-vinyl acetate (EVA) copolymer. The ethylene-vinyl acetate (EVA) copolymer can have a range of vinyl acetate contents, for example about 50 percent to about 90 percent, or about 50 percent to about 80 percent, or about 5 percent to about 50 percent, or about 10 percent to about 45 percent, or about 10 percent to about 30 percent, or about 30 percent to about 45 percent, or about 20 percent to about 35 percent, based on the weight of the copolymer.

Thermoplastic Elastomer Composition Characterization

Component Sampling Procedure

This procedure can be used to obtain a sample of a foam composition or material when the composition or material is incorporated into a component such as a sole structure or midsole or outsole of an article of footwear. A sample of the component which includes the composition or material is obtained as formed into the component, or cut from the article of footwear using a blade. This process is performed by separating the component from an associated footwear upper, if present, and removing any materials from the article's top surface (e.g., corresponding to the top surface). For example, the article's top surface can be skinned, abraded, scraped, or otherwise cleaned to remove any upper adhesives, yarns, fibers, foams, and the like that could potentially interfere with the test results.

The resulting component sample includes the composition or material. As such, any test using a Component Sampling Procedure can simulate how the composition or material will perform as part of an article of footwear. As specified by the test method, the component may be tested as a full component (e.g., full midsole component), or it can be extracted as a sample having a certain geometry. A sample of a component is taken at a location along the component that provides a substantially constant thickness for the component (within plus or minus 10 percent of the average thickness), such as in a forefoot region, mid-foot region, or a heel region of the article. Unless otherwise specified, the desired harvested geometry is a cylindrical puck with a 45-millimeter diameter and a cylinder height of at least about 10 millimeters, preferably from about 20 to 25 millimeters.

Density Test

The density is measured for samples taken using the Component Sampling Procedure, using a digital balance or a Densicom Tester (Qualitest, Plantation, Florida, USA). For each sample a sample volume is determined in cubic centimeters, and then each sample is weighed (g). The density of the sample is the mass divided by the sample volume, given in grams/cubic centimeters.

Specific Gravity Test

This test is appropriate for testing closed-cell foams, and samples of open-cell foams having a substantially uniform closed skin. The specific gravity (SG) is measured for samples taken using the Component Sampling Procedure, using a digital balance or a Densicom Tester (Qualitest, Plantation, Florida, USA). Each sample is weighed (g) and then is submerged in a distilled water bath (at 22 degrees C. plus or minus 2 degrees C.). To avoid errors, air bubbles on the surface of the samples are removed, e.g., by wiping isopropyl alcohol on the sample before immersing the sample in water, or using a brush after the sample is immersed. The weight of the sample in the distilled water is recorded. The specific gravity is calculated with the following formula:

$$S.G. = \frac{\text{Weight of the sample in air (g)}}{\text{Weight of the sample in air (g)} - \text{Weight of the sample in water (g)}}$$

Force/Displacement Test (Cyclic Compression Test for a Foot Form)

Force/displacement behavior for the foams and the foamed articles may be measured using a full midsole sample, a full outsole sample, a split midsole and/or a split midsole, tested using a foot form for impact to accurately simulate full gate loading. For these tests, a US men's size 10 midsole is tested, and a men's size 9 foot form used for impact, with a load of 2000N being applied to the midsole with the foot form at a loading rate of 5 Hz with a cyclic compression testing device such an Instron Electropuls E10000 (Instron, Norwood, Massachusetts, USA). Each sample is compressed to the peak load at 5 Hz for 100 cycles. Energy input (J), energy return (J), energy efficiency (energy return/energy input), energy efficiency percentage (100*(energy return/energy input)) and maximum displacement (mm) are measured from the force vs. displacement curves generated. Stiffness of a particular foam sample is the maximum load divided by the displacement at the maximum load, giving a value in N/mm. The reported value for each metric is the average of the metrics from the $60^{th}$, $70^{th}$, $80^{th}$, and $90^{th}$ cycles.

Cyclic Compression Test for a Sample

Force/displacement behavior for the foams and the foamed articles may also, or alternatively, be measured using samples harvested from a larger component (e.g., cylindrical pucks harvested from a footwear midsole), and a method for obtaining a sample is described in the "Component Sampling Procedure" portion of this disclosure. In one testing methodology, when testing a sample (e.g., a cylindrical puck harvested from a larger component), the sample is tested along the length axis of the part using compression platens that are at least 2× the diameter (e.g., of the cylindrical puck). Furthermore, the sample is compressed to its peak load (e.g., 50% strain) at 5 Hz for 500 cycles. Stiffness, efficiency, and energy return are measured from the force vs. displacement curves for cycles 200, 300, 400, and 500, and the reported value for each metric is the average of each metric between cycles 200, 300, 400, and 500. Stiffness, efficiency, and energy return are defined in the following ways, with example property ranges (possibly dependent on sample geometries) provided in parentheses. Stiffness is the stress at the maximum strain divided by the maximum strain (e.g., 200-1000 kPa). Efficiency is the integral of the unloading force-displacement curve divided by the integral of the loading force-displacement curve (e.g., 0.50-0.97). Energy return is the integral of the unloading curve (e.g., 200-1200 mJ).

Cyclic Tensile Test

The cyclic tensile testing is carried out on solid samples prepared using the Component Sampling Procedure, having a dog-bone shape as described in ASTM D638 with a 2 mm thickness. In the test, the specimen is placed under a pre-load of 5 N. Strain is controlled to extend the sample to an extension 6 percent at a strain rate of 5 Hz. The stiffness is the load at 6 percent strain divided by the extension at 6 percent strain, giving a value in N/mm. The maximum load (N) observed over the test cycle of 500 cycles is also recorded.

Durometer Hardness Test—Shore A

The test used to obtain the hardness values for the foam articles is as follows. A flat foam sample is prepared using the Component Sampling Procedure, where the sample has a minimum of 6 mm thick for Shore A durometer testing. If necessary, samples are stacked to make up the minimum thickness. Samples are large enough to allow all measurements to be performed at a minimum of 12 mm from the edge of the sample and at least 12 mm from any other measurement. Regions tested are flat and parallel with an area at least 6 mm in diameter. A minimum of five hardness measurements are taken and tested using a 1 kilogram head weight.

Split Tear Test

The split tear test can determine the internal tear strength for a foam material. A sample may be provided using the Component Sampling Procedure. The sample is die cut into a rectangular shape having a width of 1.54 centimeters and a length of 15.24 centimeters (1 inch by 6 inches), and having a thickness of 10 millimeters, plus or minus 1 millimeter. On one end, a cut is made into the sample that bisects the thickness, the cut extending the full width of the sample, and 3 centimeters from the end of the sample. Starting from the end of the cut, 5 marks are placed along the length of the sample spaced 2 centimeters apart. The cut ends of the sample are placed in the clamps of a tensile tester. Each section of the sample is held in a clamp in such a manner that the original adjacent cut edges form a straight line joining the centers of the clamps. The crosshead speed is set to 50 millimeters per minute. The tear strength is measured throughout the separation of the crossheads. If necessary, a sharp knife may be used to keep separating the foam in the center of the sample, discarding the readings caused by cutting of the knife. The lowest split tear strength values are recorded for each of the five marked segments of the sample (between each of the 2-centimeter markings). An average split tear strength value is recorded for each sample. If a segment of a sample has an air bubble measuring more than 2 millimeters, the tear strength for the segment is discarded, and the air bubble recorded as a test defect. If more than one segment of a sample has an air bubble measuring more than 2 millimeters, the entire sample is discarded.

Energy Intensity

Energy intensity is a measure of the energy used in forming a particular foam article in kilowatt hours (kW-h). To obtain the energy intensity, the energy required (in kW-H) to produce a run, or batch, of articles, such as cushioning elements (such as pairs of the midsole 122) is first calculated, determined or measured (from pellet to finished component). For example, for a physical foaming process the measured energy may include the energy required for all energy consuming steps, such as: preheating the molds and hot runners (if utilized), melting the pellets, generating gas counter-pressure, injecting the molten plastic, introducing the supercritical fluid, cooling the molds and/or work-pieces and ejecting the work-pieces from the mold. The overall energy required to produce the run of cushioning element pairs is then divided by the number of cushioning element pairs produced in the run.

Zero Shear Viscosity

The zero shear viscosity is determined using a flow curve obtained on a rotational rheometer. Zero shear viscosity is determined as the apparent viscosity of the polymer melt measured at a shear rate of $1\times10^{-2}$ 1/s when the polymer is heated to 10° C. above its melting temperature. Apparent viscosity is measured under continuous flow using a cone and plate rotational fixture. The temperature of the rotational fixture is maintained at the polymer melt temperature. The gap and geometry of the cone are selected such that the measured torque is well within the measuring limits of a rheometer.

Melt Flow Index Test

The melt flow index is determined using a sample prepared using Component Sampling Procedure, according to the test method detailed in ASTM D1238-13 Standard Test Method for Melt Flow Rates of Thermoplastics by Extrusion Plastometer, using Procedure A described therein. Briefly, the melt flow index measures the rate of extrusion of thermoplastics through an orifice at a prescribed temperature and load. In the test method, approximately 7 grams of the sample is loaded into the barrel of the melt flow apparatus, which has been heated to a specified temperature of 210 degrees C., 220 degrees C., or 230 degrees C. A weight of 2.16 kilograms is applied to a plunger and the molten sample is forced through the die. A timed extrudate is collected and weighed. Melt flow rate values are calculated in g/10 min, and are reported with the specified temperature (i.e., 210, 220 or 230 degrees C.) and the weight applied to the plunger (i.e., 2.15 kilograms).

Representative Data

In the tables below, the foam of the midsole 122 is compared against other representative foams (Foams A, B and C). The first table represents data with a midsole, outsole and strobel as an assembly. The second table represents data from the respective midsoles only. The density is calculated as described above under the density test. The energy intensity (EI) is determined as described above under the energy intensity section. Energy Efficiency (EE)(the average EE is labeled "Avg. Efficiency" in the chart below), energy input, energy returned (ER), average maximum displacement, and average stiffness are determined using the Force/Displacement Test (Cyclic Compression Test) described above with a 2000N maximum load, a men's size 10 midsole using the described foot form for 100 cycles. EE/EI represents the average efficiency divided by the energy intensity. An additional parameter is the energy efficiency divided by the product of the energy intensity and the density, EE/(EI*ρ). ER/EI represents the energy return divided by the energy intensity. The last parameter is the energy return divided by the product of the energy intensity and the density, EE/(EI*ρ). The data illustrates the midsole 122 with a foam having a low density and improved energy efficiency compared to the energy intensity. Not only is less energy required per pair, as compared to other foamed midsoles, but the energy return and energy efficiency per energy intensity and density is improved. The foam of the midsole 122 thus provides good energy return with a low density (lighter weight) midsole, while requiring less energy per pair to manufacture.

In Table 1, the Specimen descriptions indicate the type of outsole in the assembly. This could be: a full outsole (Full OS), substantially covering the entire bottom of the midsole 122; no outsole at all (No OS); a split midsole (Partial OS), with a portion covering the fore foot area and a portion covering the heel area; or a full outsole with lateral slits spaced along the length of the outsole (Slit OS).

TABLE 1

Representative Data-Midsole, Outsole and Strobel

| Material | Specimen | Foam Density (ρ)[g/cc] | Avg Efficiency | Energy Input (area under loading portion of load-disp curve [mJ] | Energy Returned (ER)[mJ] | Avg Max Displacement [mm] | Avg Stiffness [N/mm] | Foam Energy Intensity (EI) [kW – h] | EE/ EI | EE/ EI * ρ | ER/ EI | ER/ EI * ρ |
|---|---|---|---|---|---|---|---|---|---|---|---|---|
| Article Foam (Foam of Midsole 122) | Full OS-Left | 0.18 | 0.71 | 5927 | 4226 | 10.97 | 182 | 0.40 | 1.78 | 9.90 | 10566 | 58699 |
| | Full OS-Right | 0.18 | 0.72 | 5981 | 4284 | 10.27 | 195 | 0.40 | 1.79 | 9.95 | 10711 | 59505 |
| | No OS-Left | 0.18 | 0.72 | 6107 | 4380 | 10.77 | 186 | 0.40 | 1.79 | 9.96 | 10949 | 60827 |
| | No OS-Right | 0.18 | 0.74 | 5874 | 4327 | 9.99 | 200 | 0.40 | 1.84 | 10.23 | 10818 | 60102 |
| | Partial OS-Left | 0.18 | 0.73 | 5853 | 4251 | 10.46 | 191 | 0.40 | 1.82 | 10.09 | 10627 | 59037 |
| | Partial OS-Right | 0.18 | 0.74 | 5719 | 4223 | 9.22 | 217 | 0.40 | 1.85 | 10.25 | 10557 | 58647 |
| | Slit OS-Left | 0.18 | 0.65 | 6278 | 4065 | 11.53 | 173 | 0.40 | 1.62 | 8.99 | 10162 | 56457 |
| | Slit OS-Right | 0.18 | 0.67 | 5953 | 4001 | 10.36 | 193 | 0.40 | 1.68 | 9.34 | 10003 | 55575 |
| Polymeric Foam Composition A | Full OS-Left | 0.2 | 0.76 | 7047 | 5332 | 10.08 | 198 | 2.90 | 0.26 | 1.30 | 1839 | 9193 |
| | Full OS-Right | 0.2 | 0.76 | 7310 | 5549 | 10.12 | 197 | 2.90 | 0.26 | 1.31 | 1913 | 9567 |
| | No OS-Left | 0.2 | 0.75 | 7475 | 5641 | 10.63 | 188 | 2.90 | 0.26 | 1.30 | 1945 | 9727 |
| | No OS-Right | 0.2 | 0.75 | 7454 | 5596 | 10.25 | 195 | 2.90 | 0.26 | 1.29 | 1930 | 9648 |
| | Partial OS-Left | 0.2 | 0.75 | 6771 | 5092 | 9.81 | 204 | 2.90 | 0.26 | 1.30 | 1756 | 8780 |
| | Partial OS-Right | 0.2 | 0.76 | 7134 | 5411 | 9.58 | 208 | 2.90 | 0.26 | 1.31 | 1866 | 9328 |
| | Slit OS-Left-cut | 0.2 | 0.76 | 7159 | 5426 | 9.98 | 200 | 2.90 | 0.26 | 1.31 | 1871 | 9355 |
| | Slit OS-Right | 0.2 | 0.76 | 7405 | 5643 | 10.06 | 199 | 2.90 | 0.26 | 1.31 | 1946 | 9729 |
| Polymeric Foam Composition B | Full OS-Left | 0.22 | 0.72 | 5634.27 | 3920 | 8.18 | 244.12 | 0.50 | 1.43 | 6.52 | 7841 | 35640 |
| | Full OS-Right | 0.22 | 0.68 | 5933.43 | 3916 | 8.20 | 243.46 | 0.50 | 1.36 | 6.19 | 7833 | 35603 |
| | No OS-Left | 0.22 | 0.70 | 5509.87 | 3724 | 7.67 | 260.33 | 0.50 | 1.39 | 6.33 | 7447 | 33852 |
| | No OS-Right | 0.22 | 0.69 | 5782.49 | 3889 | 8.27 | 241.45 | 0.50 | 1.39 | 6.30 | 7777 | 35350 |
| | Partial OS-Left | 0.22 | 0.70 | 5548.18 | 3787 | 7.90 | 252.66 | 0.50 | 1.41 | 6.40 | 7575 | 34430 |
| | Partial OS-Right | 0.22 | 0.66 | 5893.88 | 3793 | 8.03 | 248.64 | 0.50 | 1.33 | 6.03 | 7586 | 34481 |
| | Slit OS-Left-cut | 0.22 | 0.70 | 5664.52 | 3822 | 7.83 | 255.11 | 0.50 | 1.39 | 6.32 | 7643 | 34742 |
| | Slit OS-Right | 0.22 | 0.67 | 5816.88 | 3761 | 7.96 | 250.81 | 0.50 | 1.33 | 6.06 | 7522 | 34190 |

TABLE 2

Representative Data-Midsole Only

| Material | Foam Density (g/cc) | Avg Efficiency | Energy Input (area under loading portion of load-disp curve) [mJ] | Energy Returned (ER)[mJ] | Avg Max Displacement [mm] | Avg Stiffness [N/mm] | Foam Energy Intensity (EI) [kW – h] | EE/EI | EE/EI * ρ | ER/EI | ER/EI * ρ |
|---|---|---|---|---|---|---|---|---|---|---|---|
| Article Foam (Foam of Midsole 122) | 0.18 | 0.77 | 5624 | 4304 | 10.58 | 189 | 0.40 | 1.93 | 10.69 | 10760 | 59778 |
| | 0.18 | 0.76 | 5744 | 4393 | 10.92 | 183 | 0.40 | 1.90 | 10.56 | 10983 | 61014 |
| | 0.18 | 0.78 | 5438 | 4246 | 10.29 | 194 | 0.40 | 1.95 | 10.83 | 10615 | 58972 |
| | 0.18 | 0.77 | 5720 | 4419 | 10.49 | 191 | 0.40 | 1.93 | 10.69 | 11048 | 61375 |
| | 0.18 | 0.75 | 5782 | 4321 | 11.17 | 179 | 0.40 | 1.88 | 10.42 | 10803 | 60014 |
| | 0.18 | 0.77 | 5734 | 4400 | 10.65 | 188 | 0.40 | 1.93 | 10.69 | 11000 | 61111 |
| | 0.18 | 0.77 | 5582 | 4289 | 10.21 | 196 | 0.40 | 1.93 | 10.69 | 10723 | 59569 |
| | 0.18 | 0.78 | 5641 | 4382 | 9.82 | 203 | 0.40 | 1.95 | 10.83 | 10955 | 60861 |
| | 0.18 | 0.77 | 5755 | 4442 | 10.15 | 197 | 0.40 | 1.93 | 10.69 | 11105 | 61694 |
| | 0.18 | 0.79 | 5576 | 4378 | 9.68 | 206 | 0.40 | 1.98 | 10.97 | 10945 | 60806 |
| | 0.18 | 0.76 | 5627 | 4271 | 10.51 | 190 | 0.40 | 1.90 | 10.56 | 10678 | 59319 |
| | 0.18 | 0.78 | 5703 | 4465 | 9.98 | 200 | 0.40 | 1.95 | 10.83 | 11163 | 62014 |
| | 0.18 | 0.78 | 5680 | 4453 | 10.00 | 200 | 0.40 | 1.95 | 10.83 | 11133 | 61847 |
| | 0.18 | 0.79 | 5696 | 4494 | 10.07 | 199 | 0.40 | 1.98 | 10.97 | 11235 | 62417 |
| Polymeric Foam Composition A | 0.2 | 0.78 | 6964 | 5404 | 9.75 | 205 | 2.90 | 0.27 | 1.34 | 1863 | 9317 |
| | 0.2 | 0.77 | 6983 | 5375 | 9.70 | 206 | 2.90 | 0.27 | 1.33 | 1853 | 9267 |
| | 0.2 | 0.76 | 7151 | 5428 | 10.66 | 187 | 2.90 | 0.26 | 1.31 | 1872 | 9359 |
| | 0.2 | 0.77 | 7080 | 5437 | 9.99 | 200 | 2.90 | 0.27 | 1.33 | 1875 | 9374 |
| | 0.2 | 0.76 | 7230 | 5498 | 10.62 | 188 | 2.90 | 0.26 | 1.31 | 1896 | 9479 |
| | 0.2 | 0.77 | 7156 | 5507 | 10.14 | 197 | 2.90 | 0.27 | 1.33 | 1899 | 9495 |
| | 0.2 | 0.76 | 7255 | 5532 | 10.22 | 196 | 2.90 | 0.26 | 1.31 | 1908 | 9538 |
| | 0.2 | 0.77 | 7042 | 5438 | 9.87 | 203 | 2.90 | 0.27 | 1.33 | 1875 | 9376 |
| | 0.2 | 0.78 | 7438 | 5807 | 9.89 | 202 | 2.90 | 0.27 | 1.34 | 2002 | 10012 |
| | 0.2 | 0.77 | 7766 | 6015 | 10.35 | 193 | 2.90 | 0.27 | 1.33 | 2074 | 10371 |
| | 0.2 | 0.77 | 7624 | 5875 | 10.16 | 197 | 2.90 | 0.27 | 1.33 | 2026 | 10129 |
| | 0.2 | 0.77 | 7739 | 5987 | 10.10 | 198 | 2.90 | 0.27 | 1.33 | 2064 | 10322 |
| | 0.2 | 0.77 | 7645 | 5922 | 10.00 | 200 | 2.90 | 0.27 | 1.33 | 2042 | 10210 |
| | 0.2 | 0.77 | 7653 | 5861 | 10.15 | 197 | 2.90 | 0.27 | 1.33 | 2021 | 10105 |
| | 0.2 | 0.77 | 7766 | 6015 | 10.08 | 198 | 2.90 | 0.27 | 1.33 | 2074 | 10371 |
| | 0.2 | 0.77 | 7721 | 5981 | 10.07 | 198 | 2.90 | 0.27 | 1.33 | 2062 | 10312 |
| Polymeric Foam Composition B | 0.22 | 0.69 | 7033 | 4878 | 10.11 | 197 | 0.50 | 1.38 | 6.27 | 9756 | 44345 |
| | 0.22 | 0.69 | 7227 | 4983 | 10.69 | 187 | 0.50 | 1.38 | 6.27 | 9966 | 45300 |
| | 0.22 | 0.69 | 7340 | 5074 | 10.89 | 183 | 0.50 | 1.38 | 6.27 | 10148 | 46127 |
| | 0.22 | 0.69 | 7627 | 5255 | 11.03 | 181 | 0.50 | 1.38 | 6.27 | 10510 | 47773 |
| | 0.22 | 0.69 | 7643 | 5283 | 10.14 | 196 | 0.50 | 1.38 | 6.27 | 10566 | 48027 |
| | 0.22 | 0.69 | 7281 | 5055 | 9.83 | 203 | 0.50 | 1.38 | 6.27 | 10110 | 45955 |
| | 0.22 | 0.69 | 7842 | 5429 | 10.35 | 192 | 0.50 | 1.38 | 6.27 | 10858 | 49355 |

TABLE 3

Representative Data-Summary

| Material | Foam Density (ρ)[g/cc] | Efficiency | Energy Return (ER)[mJ] | Foam Energy Intensity (EI) [kW – h] | EE/EI | EE/EI * ρ | ER/EI | ER/(EI * ρ) |
|---|---|---|---|---|---|---|---|---|
| Midsole Only | | | | | | | | |
| Article Foam (Foam of Midsole 122) | 0.18 | 0.77 | 4380 | 0.4 | 1.93 | 10.69 | 10950 | 60833 |
| Polymeric Foam Composition B | 0.22 | 0.69 | 3950 | 0.5 | 1.38 | 6.27 | 7900 | 35909 |
| Polymeric Foam Composition A | 0.20 | 0.77 | 5690 | 2.9 | 0.27 | 1.33 | 1962 | 9810 |
| Midsole + Strobel + Outsole | | | | | | | | |
| Article Foam (Foam of Midsole 122) | 0.18 | 0.72 | 4240 | 0.4 | 1.80 | 10.00 | 10600 | 58889 |
| Polymeric Foam Composition B | 0.22 | 0.69 | 3826 | 0.5 | 1.38 | 6.27 | 7652 | 34782 |
| ReactPolymeric Foam Composition A | 0.20 | 0.77 | 5470 | 2.9 | 0.27 | 1.33 | 1886 | 9431 |

Recyclate

Figure 20:
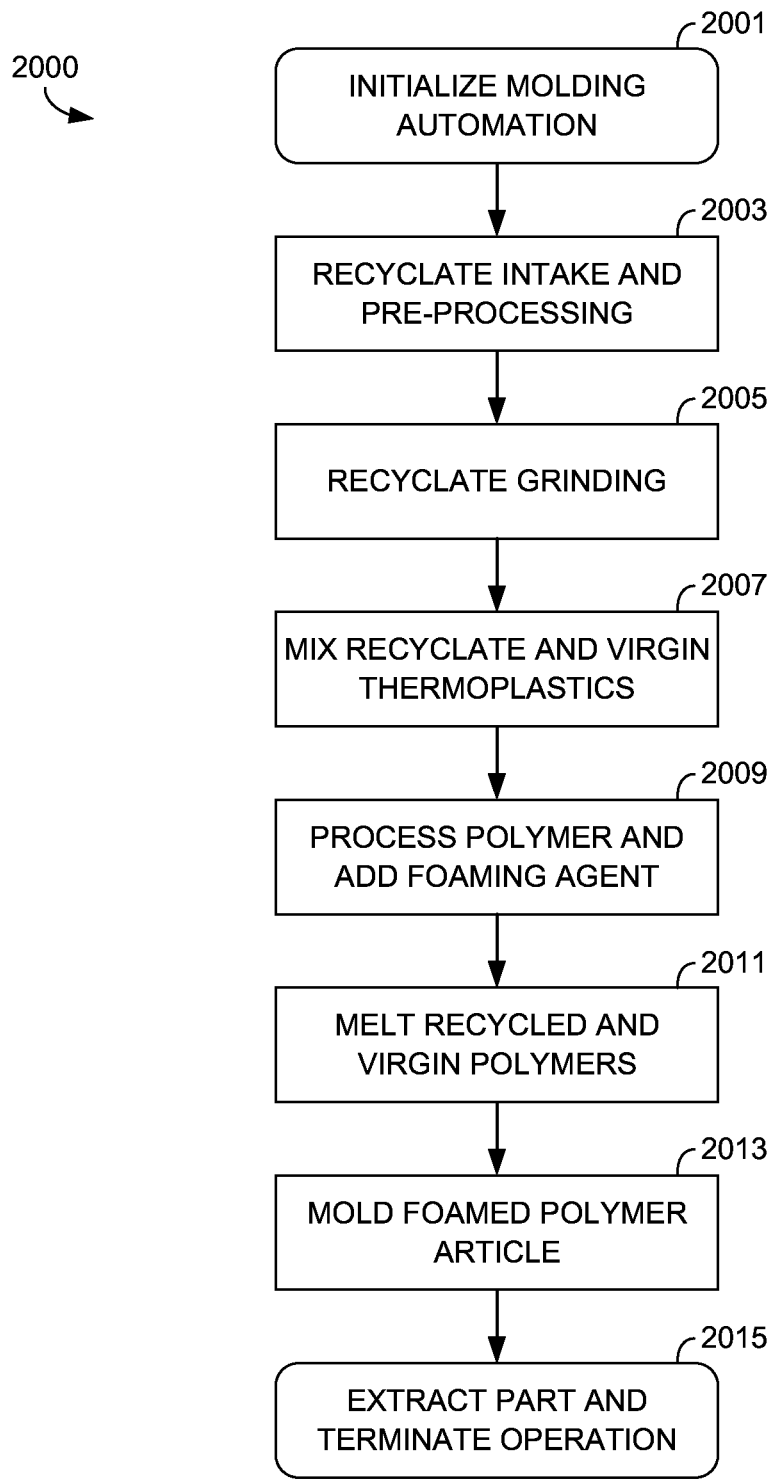
FIG. 20 depicts a flowchart illustrating a representative workflow process for manufacturing a foamed polymer article, such as a segment of an article of footwear, from virgin and recycled thermoplastic polyester elastomer compositions, which may correspond to memory-stored instructions executed by a manufacturing system controller, control-logic circuitry, programmable electronic control unit, or other integrated circuit (IC) device or a network of IC devices in accord with aspects of the disclosed concepts

With reference next to the flowchart of FIG. 20, an improved method or control strategy for manufacturing a foamed polymer article, such as the midsole 122 of FIG. 1, is generally described at 2000 in accordance with aspects of the present disclosure. Some or all of the operations illustrated in FIG. 20 and described in further detail below may be representative of an algorithm that corresponds to processor-executable instructions that may be stored, for example, in main or auxiliary or remote memory, and executed, for example, by a local or remote controller, processing unit, control logic circuit, or other module or device or network of devices, to perform any or all of the above or below described functions associated with the disclosed concepts. One or more of the illustrated operations may be performed manually or assisted manually by an onsite technician. It should be recognized that the order of execution of the illustrated operation blocks may be changed, additional blocks may be added, and some of the blocks described may be modified, combined, or eliminated.

Method 2000 of FIG. 20 is initialized at block 2001, e.g., responsive to input of an activation command signal received from a human machine interface (HMI) of a central control terminal. Initial stages of the manufacturing process may comprise supplying, accessing, and/or utilizing (collectively "receiving") the various materials, tools, and machines needed to manufacture foamed polymer articles. At process block 2003, for example, a batch of recycled plastic material is accessed from an available store of polymer recyclate. As used herein, the term "recycled plastic" may encompass used or excess or scrapped plastic that is put into a recycling stream, including wholesale recycling of entire products, disassembly of products and recycling only selected parts thereof, recycling of manufacturing byproduct, all of which may require sorting and cleaning of any collected materials. For at least some embodiments, scrap and waste thermoplastic polyester elastomer (TPE-E) composition may be recovered (e.g., reclaimed from foamed or unfoamed virgin TPE-E material and/or virgin TPE-E compositions), and then incorporated into foamed articles produced with at least some virgin TPE-E and/or virgin TPE-E compositions. The recycled TPE-E composition may be derived from one or more reactants, such as a poly(alkylene oxide)diol material and/or an aromatic dicarboxylic acid material. The recycled thermoplastic polyester elastomer composition may have a weight average molecular weight ranging from about 50,000 Daltons to about 200,000 Daltons.

Once the batch of recycled plastic is received and any attendant sorting, cleaning, and other pre-processing is complete at process block 2003, the method 2000 shreds, chops, cuts, and/or grinds (collectively "grind") the batch of recycled plastic at process block 2005. By way of non-limiting example, a dedicated recycling station may be responsible for grinding recycled TPE-E into granular or pelletized form; ground recycled material may be produced in real-time or stored in inventory and reused when desired. Alternatively, "grinding" may comprise feeding a hot compound of recyclate into an extruder fitted with a perforated die; a cutter immediately in front of the die slices extruded strings of compound into granulized pellets. Cut pellets are then cooled as they are transported to a sieve grader to separate out irregularly sized pellets. A "regrind" thermoplastic polymer composition may originate from re-extruded material, such as unfoamed, mold-runner derived TPE-E composition waste that is put through an extruder, pelletized, and turned back into resin. Regrind may also originate from injected foam material, such as virgin TPE-E composition resin that is injected and foamed during normal processing, scrapped, then shredded and re-introduced as regrind. The ground recyclate material may have an irregular shape with a major length size of about 1-10 mm, and the virgin polymer material has a pellet size of about 1-10 mm.

At process block 2007, the ground recycled material is mixed with a composition of virgin polymer material. As used herein, the terms "mixing" and "blending" may be used interchangeably and synonymously to mean to combine or intermingle, where the resultant mixed batch may or may not be homogenous throughout the mixture. A recycled material may be contrasted with a virgin material in that a raw "virgin" material has neither been injected into a mold assembly nor expanded through activation of an intermixed foaming agent and formed into an end product. The virgin polymer composition may be the same or similar general polymer composition as the recyclate or, alternatively, may be a distinguishable polymer composition from the recyclate. To properly calibrate the operating parameters of the injection molding system and control the functional properties of the resultant foamed polymer article, a metered amount of the ground recyclate material is mixed with a predetermined amount of virgin polymer material to form a mixed batch of virgin and recycled material. In at least some implementations, the metered amount is limited to about 20% by mass or less of a total mass of the mixed batch. It may be desirable, depending on an intended application, that about 10 to about 50 parts of recycled TPE-E composition per about 80 to about 100 parts virgin TPE-E composition be incorporated into newly foamed TPE-E articles by the methods described herein.

With continuing reference to FIG. 20, method 2000 continues to process block 2009 with instructions to treat the recycled material, either before, during, or after admixture with the virgin material. Processing the recyclate may include the addition of blowing/foaming agents, fillers, pigments, and/or processing aids. In at least some implementations, a foaming agent is incorporated as a separate ingredient into the mixture of recycled and virgin polymer material for invoking the expansion of the mixture during molding. The foaming agent may comprise a suitable stimulant that, alone or in combination with other substances, is capable of producing a cellular structure in a plastic. Foaming agents may include fluids that expand when pressure is released.

It may be desirable, for at least some applications, to add a physical foaming agent to the mixture of recycled and virgin material during the melting of the mixture or after the mixture has melted. When injection molding a midsole, it may be desirable to inject a physical foaming agent into the polymer melt composition. The physical foaming agent may be composed of one or more supercritical fluids (SCF), such as supercritical nitrogen or carbon dioxide, which is/are dissolved into the polymer melt composition under pressure to form a single-phase solution (SPS). As a further option, the method 2000 may be characterized by a lack of a chemical foaming agent for the forming of the foamed polymer article. SCF concentration may be dictated by, among other things, a desired solubility and a desired density. For some embodiments, a chemical blowing agent may be utilized in addition to, or as a substitute for, the physical foaming agent.

Numerous other additives may be incorporated into the recyclate batch prior to introduction into the final mold for forming the foamed polymer article, including fillers, activators, homogenizing agents, pigments, fire retardants, lubricants, and other suitable additives. Non-limiting examples of filler materials include talcum powder, mica silicate, bearing sulfate, magnesium hydroxide, magnesium carbonate, magnesium silicate, calcium carbonate, and other commercially available fillers. The polymer compositions can also contain rubber fillers, such as ethylene propylene rubber (EPR), styrene isoprene styrene (SIS) copolymer rubber, styrene butadiene rubber, as well as other polyolefin resins, in addition to ethylene-vinyl acetate (EVA) or TPE-based materials. In other examples, polyethylene wax may be used as a processing agent, stearic acid may be used as a lubricant, dicumyl peroxide may be used as a polymerization initiator, zinc oxide may be used as an activator for the foaming agent, while titanium dioxide may be used as a white pigment or carbon black may be used as a black pigment.

Process block 2011 of FIG. 20 includes memory-stored, processor-executable instructions to melt the ground recyclate material and the virgin polymer material into a polymer melt composition. It should be appreciated that the ground recyclate and virgin polymer materials may be separately melted and then flowed into a mixed polymer melt composition. Otherwise, the mixed batch of recyclate and virgin polymer materials produced at process block 2007 may be heated into the polymer melt composition. For at least some embodiments, the mixture of ground recyclate and virgin polymer materials has a set point temperature ranging from about 190° C. to about 215° C. Moreover, the mixed batch of the ground recyclate material and the virgin polymer material may have an average peak crystallization temperature ranging from about 135° C. to about 165° C.

Once the polymer composition is complete and ready for molding, the processed recycled and virgin material is pressurized and injected—colloquially "shot"—into the internal cavity or cavities of a mold assembly to form the foamed polymer article, as indicated at process block 2013. After the SCF is injected into the polymer melt composition, where the SCF dissolves in the melt to form a molten SPS, the molten SPS is flowed into the internal mold cavities. The SCF is employed as a physical blowing agent to expand the melted TPE-E composition and thereby fill the mold cavities. The pressure within the mold cavities is reduced or eliminated to release the SCF from the SPS, and the expanded melt is allowed to cool and solidify. To provide a "closed loop" molding system with circular sustainability that eliminates most if not all manufacturing scrap and waste, the mass of recycled thermoplastic resin within the internal mold cavities may be greater than or equal to a mass of the mixed thermoplastic resin within any filling portions fluidly coupled to the cavities.

To ensure the integrity and desired performance characteristics of the resultant foamed polymer article, one or more operating parameters of the injection molding system may be modulated to accommodate the percent mass of recyclate being incorporated into the polymer mixes. For instance, the injection molding system may be set to a molding melt temperature of between about 210° C. and about 215° C. with a batch melt temperature of approximately 190° C. and a crystallization temperature of approximately 147° C. In addition to the selective control of mold temperatures, gas counter-pressure release rates and hold times may be recalibrated to a TPE-E polymer melt composition with approximately 20% by mass recycled TPE-E composition, e.g., to regulate cooling rates within the mold cavities (e.g., higher pressure drop provides faster cooling rate with less cooling time). System operating parameters may be selectively modified to ensure that the polymer melt composition stays within a pre-calculated melt temp-crystallization temp sweet spot for a selected timeframe within the processing cycle.

The foamed polymer article is ejected from the internal mold cavity at process block 2015. For at least some embodiments, the formed foamed polymer article has a cell size average, e.g., by volume of a longest cell dimension, of less than about 0.68 mm or, in some embodiments, about 0.18 mm to about 0.58 mm. For at least some implementations, the foamed polymer article may exhibit some and/or all of the following characteristics: (1) an energy efficiency of about 55% to about 95% or, in some preferred configurations, a target efficiency of 70% to 85%; (2) an energy return of about 1000 millijoules (mJ) to about 7000 mJ or, in some preferred configurations, a target return of 4500 mJ to 5500 mJ (e.g., assuming a standard midsole geometry); and/or (3) a density of about 0.15 grams/cubic centimeter (g/cc) to about 0.25 g/cc or, in some preferred configurations, a target density of 0.18 g/cc to 0.20 g/cc.

As yet a further option, a formed foamed polymer article may exhibit a ratio of energy efficiency to energy intensity (EE/EI) that is greater than about 1.125 or, for some embodiments, greater than about 1.35 or, for some desired embodiments, greater than about 1.5 or, optionally, between about 1.6 and 2.1. Likewise, a formed foamed polymer article may exhibit a ratio of energy efficiency to the product of energy intensity and density (EE/(EI*$\rho$)) that is greater than about 5.25 or, for some embodiments, greater than about 6.3 or, for some desired embodiments, greater than about 7.0 or, optionally, between about 8.8 and 11.2. Moreover, a formed foamed polymer article may exhibit a ratio of energy return to energy intensity (ER/EI) that is greater than about 6,375 or, for some embodiments, greater than about 7,650 or, for some desired embodiments, greater than about 8,500 or, optionally, between about 9,900 and 11,300. A formed foamed polymer article may exhibit a ratio of energy return to the product of energy intensity and density (ER/(EI*$\rho$)) that is greater than about 33,750 or, for some embodiments, greater than about 40,500 or, for some desired embodiments, greater than about 45,000 or, optionally, between about 55,400 and 62,500.

For at least some embodiments, a foamed polymer sole component fabricated from both recyclate and virgin thermoplastic materials may have an energy return measurement that is within a predefined tolerance of an energy return measurement of a comparable shoe sole component formed solely from virgin thermoplastic materials. This predefined tolerance may be about 75% to about 99% of the energy return measurement of the comparable shoe sole component. The foamed sole component and the comparable shoe sole component may share a comparable shape, size, and/or method of molding. At this juncture, the method 2000 may terminate or may loop back to block 2001 and run in a repeatable or continuous loop.

It is envisioned that disclosed manufacturing systems and processes may utilize any logically relevant source of recycled plastic material in order to conserve natural resources, minimize use of raw materials, and divert waste from landfills with the aspiration of reaching a "circular economy". In this regard, aspects of this disclosure are directed to "closed-loop" manufacturing processes that limit usable recyclate sources to manufacturing byproducts (e.g., gate or runner trimmings) and reground defective articles (e.g., visually or mechanically flawed foamed polymer footwear sole elements). Implementing such "closed-loop" manufacturing processes may desirably optimize material use efficiencies by achieving, for example, a zero-waste or near-zero-waste of polymer materials in the manufacture of foamed polymer articles.

As an extension of, a modification to, or a standalone process from the method 2000 of FIG. 20, a method of producing foamed polymer articles may be composed of a series of controlled manufacturing steps, including executing one or more production runs to form one or more types of foamed polymer articles. A "production run" may be typified by a predefined number of articles (e.g., 220-260 articles/hr) of a designated design/model (e.g., NIKE® REACT FLYKNIT™) having a preset shape, size and material composition (e.g., single-piece TPE-E midsole for women's size 7 running shoe) produced substantially contiguously by a particular production line. Individual runs may exhibit different quantifiable production variables, including: an average article mass $m_{AA}$ of the foamed polymer articles (e.g., average total mass of all articles per run or average individual article mass or all articles per run), and an average article defect rate $\dot{D}_A$ (e.g., ratio of total defective articles to total articles produced per run). Because the process may produce multiple envelopes of products, e.g., distinguishable from each other in quantity and geometry, the tooling for each geometry may consume a distinct volume of raw materials and generate a distinct volume of manufacturing byproduct.

As will be explained in further detail below, a production line may generate a baseline average byproduct value (e.g., unfoamed byproduct generated upstream of tooling and/or foamed byproduct generated downstream of tooling). For a particular production run, an average byproduct mass amount may be calculated as the sum of: (1) an amount of byproduct generated for each geometry produced in a run divided by the quantity of each geometry in the run; and (2) a remnant upstream byproduct mass per run. By way of non-limiting example, a run size for a production run may include 100 total articles, including twenty of a first geometry, twenty of a second geometry, and sixty of a third geometry. In this instance, byproduct mass may be calculated as: (total byproduct mass for first geometry)/20+(total byproduct mass fir second geometry)/20+(total byproduct mass for third geometry)/60+upstream and/or downstream byproduct mass.

For at least some implementations, a production run may be limited to a single run for fabricating a preset number of a singular article design having a predefined shape and size. Alternatively, a mass production run may include multiple batch runs of different types of polymer articles, with each type having a respective shape and size. These batch production runs may be performed simultaneously or sequentially, with each run producing the same number of articles or a distinct number of articles. When carrying out multiple batch runs as part of a larger mass production run, the average article mass $m_{AA}$ for the mass run may be calculated as the arithmetic sum of the individual average article masses for all of the discrete runs, namely: $m_{AA-1}+m_{AA-2}+\ldots+m_{AA-n}$. Likewise, the average article defect rate $\dot{D}_A$ for the mass run may be calculated as the arithmetic mean of the individual average article defect rates for all of the discrete batch runs, namely: $(\dot{D}_{A-1}+\dot{D}_{A-2}+\ldots+\dot{D}_{A-n})/n$.

After completing a single production run or a group of discretized batch runs of foamed polymer articles, the method may include reclaiming and recycling one or more batches of manufacturing byproduct incidental to the run or runs. Recyclate byproduct material may be recovered from sections of the molding system upstream from the mold tool (e.g., from hot-runner or cold runner plates), downstream from the mold tool (e.g., mold flash and trimmings), and/or from within the mold tool itself (e.g., inlet and outlet gates to the mold-ring cavities). In this example, the manufacturing byproduct may have an average byproduct mass $m_{AB}$ (e.g., average total byproduct mass per run or average byproduct mass per article per run). When carrying out multiple batch runs, the average byproduct mass for the entire mass production run may be calculated as the arithmetic sum of the individual average byproduct masses, namely: $m_{AB-1}+m_{AB-2}+\ldots+m_{AB-n}$. Alternatively, the average byproduct mass may be calculated as the arithmetic sum of: (1) a first byproduct mass incidental to a first batch run divided by a first number of first polymer articles in that run; (2) a second byproduct mass incidental to a second batch run divided by a second number of second polymer articles in that run; ... and (n) an $n^{th}$ byproduct mass incidental to an $n^{th}$ batch run divided by an $n^{th}$ number of polymer articles in that run.

Prior to, contemporaneous with, or after retrieving the batch of manufacturing byproducts, the method may also include reclaiming and recycling one or more lots of defective articles incidental to the production run(s). In accord with the abovementioned footwear example, recycled defect material may be recovered from pre-consumer footwear and, if desired, from post-consumer footwear. For pre-consumer products, a defective foamed article may be identified through any commercially available technique for identifying manufacturing defects. For instance, the injection molding system may incorporate a system-automated visual inspection station and a system-automated mechanical testing station downstream from the tooling assembly of FIG. 17 or 19. The visual inspection station may utilize a high-definition digital camera and a machine-learning algorithm to search for and flag any of a multitude of predefined visual defects (e.g., dimensional flaws, superficial blemishes, contour defects, etc.). Moreover, the mechanical testing station may be in the nature of an impact-testing machine with a linear force transducer operatively coupled to a motor-driven, last-shaped plunger. The plunger and transducer collectively measure each foam article's stiffness, energy efficiency, energy return, etc., and flag the article as defective if any of these measurements fall outside of corresponding manufacturing tolerance ranges.

Continuing the discussion of pre-consumer defective products, there will be an associated average defect mass $m_{AD}$ (per run) in the manufacturing system. This average defect mass $m_{AD}$ may be calculated as the arithmetic product of the article defect rate $\dot{D}_A$ and the average article mass $m_{AA}$, or $m_{AD} \dot{D}_A*m_{AA}$. For implementations that execute multiple batch runs as part of a larger mass production run, the average defect mass $m_{AD}$ may be the arithmetic mean of the individual average defect masses incidental to the various production runs, namely: $(m_{AD-1}+m_{AD-2}+\ldots+m_{AD-n})/n$. To achieve a "closed-loop" manufacturing process, the system may be restricted as follows:

$$(m_{AB}+m_{AD})/m_{AA} \leq 0.2$$

During a closed-loop manufacturing process, foam polymer waste—the manufacturing byproducts and defective articles—may be added directly into the injection barrel for subsequent injection into the mold tool cavity. The foam polymer waste may be crushed or shredded, mixed with virgin pellets, and fed together into the same injection barrel. In this instance, a power-screw type "crammer" feeder may be used to force the waste material back into the tooling assembly. Prior to re-feeding the material, the foam polymer waste may be shredded at least once or, in at least some applications, two or more times to ensure that the discretized waste elements are generally uniform in shape and size. If it determined that the foam polymer waste cannot be added directly to the injection barrel, the foam waste may need to be processed, melted down, and re-pelletized. In this case, the waste material would be shredded a single time or multiple times, fed into a separate extrusion line where it is melted and extruded, and thereafter pelletized to form pellets akin in geometry and density to virgin pellets. These "new" waste material pellets may then be combined with virgin pellets in the injection barrel.

An injection molding system's operating parameters will potentially change depending on the type and volume of recyclate being used to form the foamed polymer articles. For instance, the melt temperatures will likely be modified to successfully process recycled material: when foamed, the recyclate material's crystallization temperature may increase (i.e., crystallization temperature gets closer to the melt temperature). As such, the melt composition may need to be processed at higher temperatures compared to processing temperatures that would typically be used for pure virgin material. For at least some footwear midsole embodiments, the production variables per run may be based on the following parameters: about 0.2 kg/pair, about two pair (four midsoles)/minute, eight hour shift, about 10% to about 15% runner waste relative to midsole weight per pair.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state memory, a CD-ROM, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

The present invention has been described in relation to particular examples, which are intended in all respects to be illustrative rather than restrictive. From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

Some aspects of this disclosure have been described with respect to the examples provided in the FIGURES. Additional aspects of the disclosure will now be described that may be related subject matter included in one or more claims or clauses of this application at the time of filing, or one or more related applications, but the claims or clauses are not limited to only the subject matter described in the below portions of this description. These additional aspects may include features illustrated by the FIGURES, features not illustrated by the FIGURES, and any combination thereof. When describing these additional aspects, reference may be made to elements depicted by the FIGURES for illustrative purposes.

As used herein and in connection with the claims listed hereinafter, the terminology "any of clauses" or similar variations of said terminology is intended to be interpreted such that features of claims/clauses may be combined in any combination. For example, an exemplary clause 4 may indicate the method/apparatus of any of clauses 1 through 3, which is intended to be interpreted such that features of clause 1 and clause 4 may be combined, elements of clause 2 and clause 4 may be combined, elements of clause 3 and 4 may be combined, elements of clauses 1, 2, and 4 may be combined, elements of clauses 2, 3, and 4 may be combined, elements of clauses 1, 2, 3, and 4 may be combined, and/or other variations.

The following clauses are aspects contemplated herein.

Clause 1. A thermoplastic elastomeric composition comprising: a thermoplastic elastomeric foam comprising, a plurality of first segments, each first segment derived from a dihydroxy-terminated polydiol; a plurality of second segments, each second segment derived from a diol; and a plurality of third segments, each third segment derived from an aromatic dicarboxylic acid.

Clause 2. The thermoplastic elastomeric composition of clause 1, wherein the thermoplastic elastomeric foam is a block copolymer; a segmented copolymer; a random copolymer; or a condensation copolymer.

Clause 3. The thermoplastic elastomeric composition of clauses 1 or 2, wherein the thermoplastic elastomeric foam has a weight average molecular weight of about 50,000 Daltons to about 1,000,000 Daltons.

Clause 4. The thermoplastic elastomeric composition of clause 3, wherein the thermoplastic elastomeric foam has a weight average molecular weight of about 50,000 Daltons to about 500,000 Daltons; about 75,000 Daltons to about 300,000 Daltons; or about 100,000 Daltons to about 200,000 Daltons.

Clause 5. The thermoplastic elastomeric composition of any one of clauses 1-4, wherein the thermoplastic elastomeric foam has a ratio of first segments to third segments from about 1:1 to about 1:5 based on the weight of each of the first segments and the third segments.

Clause 6. The thermoplastic elastomeric composition of clause 5, wherein the thermoplastic elastomeric foam has a ratio of first segments to third segments from about 1:1 to about 1:3 or about 1:1 to about 1:2 based on the weight of each of the first segments and the third segments.

Clause 7. The thermoplastic elastomeric composition of any one of clauses 1-6, wherein the thermoplastic elastomeric foam has a ratio of second segments to third segments from about 1:1 to about 1:3 based on the weight of each of the first segments and the third segments.

Clause 8. The thermoplastic elastomeric composition clause 7, wherein the thermoplastic elastomeric foam has a ratio of second segments to third segments from about 1:1 to about 1:2 or about 1:1 to about 1:1.52 based on the weight of each of the first segments and the third segments.

Clause 9. The thermoplastic elastomeric composition of any one of clauses 1-8, wherein the first segments derived from a dihydroxy-terminated polydiol comprise segments derived from a poly(alkylene oxide)diol having a number-average molecular weight of about 250 Daltons to about 6000 Daltons.

Clause 10. The thermoplastic elastomeric composition of clause 9, wherein the number-average molecular weight is about 400 Daltons to about 6,000 Daltons; about 350 Daltons to about 5,000 Daltons; or about 500 Daltons to about 3,000 Daltons.

Clause 11. The thermoplastic elastomeric composition of any one of clauses 9-10, wherein the poly(alkylene oxide) diol is poly(ethylene ether)diol; poly(propylene ether)diol; poly(tetramethylene ether)diol; poly(pentamethylene ether) diol; poly(hexamethylene ether)diol; poly(heptamethylene ether)diol; poly(octamethylene ether)diol; poly(nonamethylene ether)diol; poly(decamethylene ether)diol; or mixtures thereof.

Clause 12. The thermoplastic elastomeric composition of clause 11, wherein the poly(alkylene oxide)diol is poly (ethylene ether)diol; poly(propylene ether)diol; poly(tetramethylene ether)diol; poly(pentamethylene ether)diol; or poly (hexamethylene ether)diol.

Clause 13. The thermoplastic elastomeric composition of clause 11, wherein the poly(alkylene oxide)diol is poly (tetramethylene ether)diol.

Clause 14. The thermoplastic elastomeric composition of any one of clauses 1-13, wherein the second segments derived from a diol comprise a diol having a molecular weight of less than about 250.

Clause 15. The thermoplastic elastomeric composition of clause 14, wherein the diol is a C2-C8 diol.

Clause 16. The thermoplastic elastomeric composition of clause 15, wherein the second segments derived from a diol comprise a diol selected from ethanediol; propanediol; butanediol; pentanediol; 2-methyl propanediol; 2,2-dimethyl propanediol; hexanediol; 1,2-dihydroxy cyclohexane; 1,3-dihydroxy cyclohexane; 1,4-dihydroxy cyclohexane; and mixtures thereof.

Clause 17. The thermoplastic elastomeric composition of clause 16, wherein the diol is selected from 1,2-ethanediol, 1,3-propanediol, 1,4-butanediol, 1,6-hexanediol, and mixtures thereof.

Clause 18. The thermoplastic elastomeric composition of any one of clauses 1-17, wherein the third segments derived from an aromatic dicarboxylic acid comprise an aromatic C5-C16 dicarboxylic acid.

Clause 19. The thermoplastic elastomeric composition of clause 18, wherein the aromatic C5-C16 dicarboxylic acid has a molecular weight less than about 300 Daltons or about 120 Daltons to about 200 Daltons.

Clause 20. The thermoplastic elastomeric composition of clause 18, wherein the aromatic C5-C16 dicarboxylic acid is terephthalic acid, phthalic acid, isophthalic acid, or a derivative thereof.

Clause 21. The thermoplastic elastomeric composition of clause 20, wherein the aromatic C5-C16 dicarboxylic acid is terephthalic acid or the dimethyl ester derivative thereof.

Clause 22. The thermoplastic elastomeric composition of any one of clauses 1-21, wherein the thermoplastic elastomeric foam comprises, a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a formula 1:

wherein $R_1$ is a group remaining after removal of terminal hydroxyl groups from the poly(alkylene oxide)diol of the first segment, wherein the poly(alkylene oxide)diol of the first segment is a poly(alkylene oxide)diol having a number-average molecular weight of about 400 to about 6000;
and wherein $R_2$ is a group remaining after removal of carboxyl groups from the aromatic dicarboxylic acid of the third segment; and a plurality of second copolyester units, each second copolyester unit of the plurality comprising the second segment derived from a diol and the third segment derived from an aromatic dicarboxylic acid, wherein the second copolyester unit has a structure represented by a formula 2:

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

Clause 23. The thermoplastic elastomeric composition of clause 22, wherein the first copolyester unit has a structure represented by a formula 3:

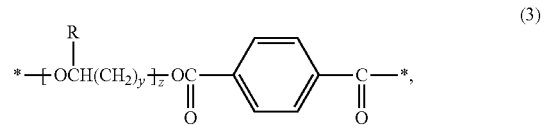

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons.

Clause 24. The thermoplastic elastomeric composition of clause 23, wherein y is an integer having a value of 1, 2, 3, 4, or 5.

Clause 25. The thermoplastic elastomeric composition of clause 23 or 24, wherein R is hydrogen; wherein R is methyl; wherein R is hydrogen and y is an integer having a value of 1, 2, or 3; or wherein R is methyl and y is an integer having a value of 1.

Clause 26. The thermoplastic elastomeric composition of clause 22, wherein the first copolyester unit has a structure represented by a formula 4:

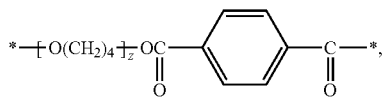

(4)

wherein z is an integer having a value from 2 to 60; and wherein a weight average molecular weight of each of the plurality of first copolyester units is from about 300 Daltons to about 7,000 Daltons.

Clause 27. The thermoplastic elastomeric composition of any one of clauses 23-26, wherein z is an integer having a value from 5 to 60; from 5 to 50; from 5 to 40; from 4 to 30; from 4 to 20; or from 2 to 10.

Clause 28. The thermoplastic elastomeric composition of any one of clauses 23-27, wherein the weight average molecular weight of each of the plurality of first copolyester units is from about 400 Daltons to about 6,000 Daltons; from about 400 Daltons to about 5,000 Daltons; from about 400 Daltons to about 4,000 Daltons; from about 400 Daltons to about 3,000 Daltons; from about 500 Daltons to about 6,000 Daltons; from about 500 Daltons to about 5,000 Daltons; from about 500 Daltons to about 4,000 Daltons; from about 500 Daltons to about 3,000 Daltons; from about 600 Daltons to about 6,000 Daltons; from about 600 Daltons to about 5,000 Daltons; from about 600 Daltons to about 4,000 Daltons; from about 600 Daltons to about 3,000 Daltons.

Clause 29. The thermoplastic elastomeric composition of any one of clauses 22-28, wherein the second copolyester unit has a structure represented by a formula 5:

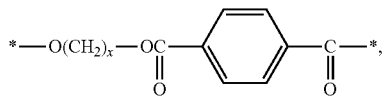

(5)

wherein x is an integer having a value from 1 to 20.

Clause 30. The thermoplastic elastomeric composition of clause 29, wherein x is an integer having a value from 2 to 18; a value from 2 to 17; a value from 2 to 16; a value from 2 to 15; a value from 2 to 14; a value from 2 to 13; a value from 2 to 12; a value from 2 to 11; a value from 2 to 10; a value from 2 to 9; a value from 2 to 8; a value from 2 to 7; a value from 2 to 6; or a value of 2, 3, or 4.

Clause 31. The thermoplastic elastomeric composition of clause 29, wherein the second copolyester unit has a structure represented by a formula 6:

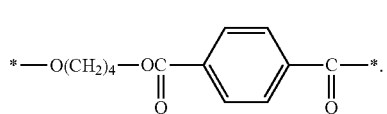

(6)

Clause 32. The thermoplastic elastomeric composition of any one of clauses 22-31, wherein the thermoplastic elastomeric foam comprises a weight percent of the plurality of first copolyester units based on total weight of the thermoplastic elastomeric foam of about 30 weight percent to about 80 weight; about 40 weight percent to about 80 weight percent; about 50 weight percent to about 80 weight percent; about 30 weight percent to about 70 weight percent; about 40 weight percent to about 70 weight percent; or about 50 weight percent to about 70 weight percent.

Clause 33. The thermoplastic elastomeric composition of any one of clauses 22-32, wherein the thermoplastic elastomeric foam comprises a weight percent of the plurality of second copolyester units based on total weight of the thermoplastic elastomeric foam of about 40 weight percent to about 65 weight percent; about 45 weight percent to about 65 weight percent; about 50 weight percent to about 65 weight percent; about 55 weight percent to about 65 weight percent; about 40 weight percent to about 60 weight percent; about 45 weight percent to about 60 weight percent; about 50 weight percent to about 60 weight percent; or about 55 weight percent to about 60 weight percent.

Clause 34. The thermoplastic elastomeric composition of any one of clauses 1-33, wherein the thermoplastic elastomeric composition further comprises an additive.

Clause 35. The thermoplastic elastomeric composition of clause 34, wherein the additive is present in an amount from about 0.1 weight percent to about 10 weight percent based on the total weight of the foamed polymeric material.

Clause 36. The thermoplastic elastomeric composition of clauses 34 or 35, wherein the additive is a wax, an antioxidant, a UV-absorbing agent, a coloring agent, or combinations thereof.

Clause 37. The thermoplastic elastomeric composition of any one of clauses 1-36, wherein the thermoplastic elastomeric composition further comprises a filler.

Clause 38. The thermoplastic elastomeric composition of clause 37, wherein the filler is present in an amount from about 0.05 weight percent to about 20 weight percent or from about 0.1 weight percent to about 10 weight percent based on the total weight of the foamed polymeric material.

Clause 39. The thermoplastic elastomeric composition of any one of clause 37 or 38, wherein the filler is a particulate filler; or wherein the filler is a carbonaceous filler.

Clause 40. The thermoplastic elastomeric composition of clause 39, wherein the carbonaceous filler is carbon black, activated carbon, graphite, carbon fibers, carbon fibrils, carbon nanoparticles, or combinations thereof; and wherein the carbonaceous filler is optionally chemically-modified.

Clause 41. The thermoplastic elastomeric composition of clause 37, wherein the filler is an inorganic filler.

Clause 42. The thermoplastic elastomeric composition of clause 41, wherein the inorganic filler is an oxide, a hydroxide, a salt, a silicate, a metal, or combinations thereof; or wherein the inorganic filler comprises glass spheres, glass fibers, glass hollow spheres, glass flakes, MgO, $SiO_2$, $Sb_2O_3$, $Al_2O_3$, ZnO, talc, mica, kaolin, wollastonite, or combinations thereof.

Clause 43. The thermoplastic elastomeric composition of any one of clauses 37-41, wherein the filler is present in an amount for from about 0.1 weight percent to less than about 15 weight percent.

Clause 44. The thermoplastic elastomeric composition of clause 43, wherein the filler is present in an amount for from about 0.1 weight percent to about 10 weight percent.

Clause 45. The thermoplastic elastomeric composition of clause 43, wherein the filler is present in an amount for from about 0.1 weight percent to about 7.5 weight percent.

Clause 46. The thermoplastic elastomeric composition of clause 43, wherein the filler is present in an amount for from about 0.1 weight percent to about 5 weight percent.

Clause 47. The thermoplastic elastomeric composition of clause 43, wherein the filler is present in an amount for from about 0.1 weight percent to about 4 weight percent.

Clause 48. The thermoplastic elastomeric composition of any one of clauses 1-47, wherein the thermoplastic elastomeric composition consists essentially of one or more thermoplastic copolyester.

Clause 49. The thermoplastic elastomeric composition of any one of clauses 1-48, further comprising at least one ionomer.

Clause 50. The thermoplastic elastomeric composition of any one of clauses 1-48, further comprising at least one thermoplastic polyurethane.

Clause 51. The thermoplastic elastomeric composition of any one of clauses 1-50, wherein the thermoplastic elastomeric composition is substantially free of a thermoplastic polyamide polymer, include polyamide copolymers such as polyether block amide copolymers.

Clause 52. The thermoplastic elastomeric composition of any one of clauses 1-50, wherein the thermoplastic elastomeric composition is substantially free of a thermoplastic polyolefin polymers, including polyethylene and polypropylene and/or polyolefin copolymers such as ethylene-vinyl acetate copolymers.

Clause 53. The thermoplastic elastomeric composition of any one of clauses 1-52, wherein thermoplastic copolyester has a zero shear viscosity when determined using a flow curve obtained on a rotational rheometer as described herein of about 10 to about 10,000 pascal-second; about 100 to about 7,000 pascal-second; or about 1,000 to about 5,000 pascal-second.

Clause 54. A foam article, comprising: a foamed component, the component comprises a foam volume, the foam volume comprises a plurality of foam sub-volumes, with one injection gate vestige for each of the plurality of foam sub-volumes, wherein each foam sub-volume of the plurality of foam sub-volumes has a corresponding aspect ratio and wherein the aspect ratio of each foam sub-volume of the plurality of foam sub-volumes is greater than 2.7.

Clause 55. The foam article of clause 54, wherein the aspect ratio of each foam sub-volume is greater than 3.0.

Clause 56. The foam article of clause 54, wherein the aspect ratio of each foam sub-volume is greater than 3.5.

Clause 57. The foam article of clause 54, wherein the component comprises a thermoplastic elastomeric foam having a multicellular structure.

Clause 58. The foam article of clause 57, wherein the thermoplastic elastomeric foam is the product of foaming a thermoplastic elastomeric composition using a physical foaming agent.

Clause 59. The foam article of clause 54, wherein the article is a midsole that has at least six foam sub-volumes.

Clause 60. The foam article of clause 59, wherein the midsole comprises a gate vestige axis extending between a first gate vestige of the plurality of gate vestiges and a second gate vestige of the plurality of gate vestiges, and wherein at least a third gate vestige is offset from the gate vestige axis.

Clause 61. The foam article of clause 60, further comprising at least a fourth gate vestige that is offset from the gate vestige axis.

Clause 62. The foam article of clause 61, wherein a line extending between the third gate vestige and the fourth gate vestige is orthogonal to the gate vestige axis.

Clause 63. The foam article of clause 61, wherein the midsole comprises a toe area, a mid-foot area and a heel area, and wherein the third gate vestige and the fourth gate vestige are in the heel area.

Clause 64. The foam article of clause 58, wherein the thermoplastic elastomeric foam comprises at least one thermoplastic polyester, comprises less than 5 weight percent of a non-polymeric component including a filler, or a nucleating agent, or a pigment, or a chemical foaming agent, or a crosslinking agent, or any combination thereof.

Clause 65. The foam article of clause 57, wherein the multicellular foam structure is an open-cell structure.

Clause 66. The foam article of clause 57, wherein the multicellular foam structure is a closed-cell structure.

Clause 67. The foam article according to any one of clauses 54-66, wherein the foam component comprises a thermoplastic elastomeric composition according to any one of clauses 1-53, a thermoplastic elastomeric composition comprising a thermoplastic polyester homopolymer, a thermoplastic elastomeric composition comprising a thermoplastic copolyester having two different types of polyester monomeric segments, or a combination thereof.

Clause 68. A foam article, comprising: a foamed component, the component comprising a foam volume, the foam volume comprises a plurality of foam sub-volumes each having one gate vestige of a plurality of gate vestiges, the component further comprising a gate vestige axis extending between a first gate vestige of the plurality of gate vestiges and a second gate vestige of the plurality of gate vestiges, wherein at least a third gate vestige of the plurality of gate vestiges is offset from the gate vestige axis.

Clause 69. The foam article of clause 68, wherein the component comprises a thermoplastic elastomeric foam having a multicellular structure.

Clause 70. The foam article of clause 69, wherein the thermoplastic elastomeric foam is the product of foaming a thermoplastic elastomeric composition using a physical foaming agent.

Clause 71. The foam article of clause 70, wherein the thermoplastic elastomeric composition comprises at least one thermoplastic copolyester, comprises less than 5 weight percent of a non-polymeric component including a filler, or a nucleating agent, or a pigment, or a chemical foaming agent, or a crosslinking agent, or any combination thereof.

Clause 72. The foam article of clause 69, wherein the multicellular foam structure is an open-cell structure.

Clause 73. The foam article of clause 69, wherein the multicellular foam structure is a closed-cell structure.

Clause 74. The foam article of clause 68, wherein the article is a cushioning element in the form of a midsole for an article of footwear.

Clause 75. The foam article of clause 74, wherein the midsole has a longitudinal axis, and wherein the gate vestige axis aligns with the longitudinal axis.

Clause 76. The foam article of clause 75, further comprising at least a fourth gate vestige that is offset from the gate vestige axis.

Clause 77. The foam article of clause 76, wherein a line extending between the third gate vestige and the fourth gate vestige is orthogonal to the gate vestige axis.

Clause 78. The foam article of clause 77, wherein the midsole comprises a toe area, a mid-foot area and a heel area, and wherein the third gate vestige and the fourth gate vestige are in the heel area.

Clause 79. The foam article according to any one of clauses 68-78, wherein the foam component comprises a thermoplastic elastomeric composition according to any one of clauses 1-53, a thermoplastic elastomeric composition comprising a thermoplastic polyester homopolymer, a thermoplastic elastomeric composition comprising a thermoplastic copolyester having two different types of polyester monomeric segments, or a combination thereof.

Clause 80. A foam article, comprising: a foam component, the component comprising a foam volume, the article foam volume comprises a plurality of foam sub-volumes, the component further comprising one injection gate vestige at an outward-facing surface of each foam sub-volume, wherein a plurality of ridges on the outward-facing surface extend concentrically outwardly from an injection gate vestige of at least one of the plurality of foam sub-volumes.

Clause 81. The foam article of clause 80, wherein the component comprises a thermoplastic elastomeric foam having a multicellular structure.

Clause 82. The foam article of clause 81, wherein the thermoplastic elastomeric foam is the product of foaming a thermoplastic elastomeric composition using a physical foaming agent.

Clause 83. The foam article of clause 82, wherein the thermoplastic elastomeric composition comprises at least one thermoplastic polyester, comprises less than 5 weight percent of a non-polymeric component including a filler, or a nucleating agent, or a pigment, or a chemical foaming agent, or a crosslinking agent, or any combination thereof.

Clause 84. The foam article of clause 83, wherein the multicellular foam structure is an open-cell structure.

Clause 85. The foam article of clause 82, wherein the multicellular foam structure is a closed-cell structure.

Clause 86. The foam article of clause 80, wherein the foam article is a cushioning element in the form of a midsole for an article of footwear.

Clause 87. The foam article of clause 82, wherein at least some of the plurality of ridges on the outward-facing surface extend concentrically outwardly from an injection gate vestige to form a series of concentric circles.

Clause 88. The foam article of clause 87, wherein a first plurality of ridges forming a series of concentric circles extend from a first injection gate vestige, and a second plurality of ridges forming a series of concentric circles extend from a second injection gate vestige.

Clause 89. The foam article of clause 88, wherein the series of concentric circles extend farther concentrically from the first injection gate vestige than the second injection gate vestige.

Clause 90. The foam article of clause 87, wherein the series of concentric circles extend at least 10 millimeters from a respective injection gate vestige.

Clause 91. The foam article of clause 87, wherein the series of concentric circles extend at least 20 millimeters from a respective injection gate vestige.

Clause 92. The foam article of clause 87, wherein the series of concentric circles extend at least 30 millimeters from a respective injection gate vestige.

Clause 93. The foam article according to any one of clauses 80-92, wherein the foam component comprises a thermoplastic elastomeric composition according to any one of clauses 1-53, a thermoplastic elastomeric composition comprising a thermoplastic polyester homopolymer, a thermoplastic elastomeric composition comprising a thermoplastic copolyester having two different types of polyester monomeric segments, or a combination thereof.

Clause 94. A foam article, comprising: a foam component, the component comprising a foam volume comprising a foam core and a surface skin surrounding the foam core, the skin having a profile defined by an outer side wall, the skin having a top surface and a bottom surface, and an outer perimeter edge at the intersection of the outer side wall and the top surface, the top surface having a plurality of striation bands extending outwardly from an inner portion of the component to the outer perimeter.

Clause 95. The foam article of clause 94, wherein the component comprises a thermoplastic elastomeric foam having a multicellular structure.

Clause 96. The foam article of clause 95, wherein the thermoplastic elastomeric foam is the product of foaming a thermoplastic elastomeric composition using a physical foaming agent.

Clause 97. The foam article of clause 96, wherein the thermoplastic elastomeric composition comprises at least one thermoplastic polyester, comprises less than 5 weight percent of a non-polymeric component including a filler, or a nucleating agent, or a pigment, or a chemical foaming agent, or a crosslinking agent, or any combination thereof.

Clause 98. The foam article of clause 97, wherein the multicellular foam structure is an open-cell structure.

Clause 99. The foam article of clause 97, wherein the multicellular foam structure is a closed-cell structure.

Clause 100. The foam article of clause 94, wherein the foam article is a cushioning element in the form of a midsole for an article of footwear.

Clause 101. The foam article of clause 100, wherein foam volume comprises a plurality of foam sub-volumes, and wherein at least some of the plurality of striation bands extend in at least two of the plurality of foam sub-volumes.

Clause 102. The foam article of clause 100, wherein each of the plurality of foam sub-volumes has a corresponding injection gate vestige, and wherein at least some of the plurality of striation bands extend radially toward at least one injection gate vestige.

Clause 103. The foam article of clause 100, wherein at least some of the plurality of striation bands extend away from the top surface to define a textured top surface area.

Clause 104. The foam article of clause 100, wherein the striation bands extend inwardly at least 5 millimeters from the outer perimeter surface.

Clause 105. The foam article of clause 100, wherein the striation bands extend inwardly at least 10 millimeters from the outer perimeter surface.

Clause 106. The foam article of clause 100, wherein the striation bands extend inwardly at least 15 millimeters from the outer perimeter surface.

Clause 107. The foam article of clause 100, wherein the striation bands extend inwardly at least 20 millimeters from the outer perimeter surface.

Clause 108. The foam article according to any one of clauses 94-107, wherein the foam component comprises a thermoplastic elastomeric composition according to any one of clauses 1-53, a thermoplastic elastomeric composition comprising a thermoplastic polyester homopolymer, a thermoplastic elastomeric composition comprising a thermoplastic copolyester having two different types of polyester monomeric segments, or a combination thereof.

Clause 109. A foam article, comprising: a foamed component, the component comprising a foam volume comprising a foam core and an integrally formed surface skin surrounding the foam core, the skin defining an outer side wall, a top surface and a bottom surface, and an outer perimeter edge at the intersection of the outer side wall and the top surface, wherein the surface skin on at least one of the outer side wall, top surface and bottom surface has a thickness of between 0.3 millimeters and 1.0 millimeters.

Clause 110. The foam article of clause 109, wherein the skin on each of the outer side wall, the top surface and the bottom surface has a thickness of between 0.3 millimeters and 1.0 millimeters.

Clause 111. The foam article of clause 110, wherein the density of the foamed component is between 0.16 and 0.20 grams per cubic centimeter.

Clause 112. The foam article of clause 111, wherein the component comprises an open cell foam encased by the surface skin.

Clause 113. The foam article of clause 110, wherein the density of the foamed component is between 0.17 and 0.19 grams per cubic centimeter.

Clause 114. The foam article of clause 109, wherein the skin on each of the outer side wall, the top surface and the bottom surface has a thickness of between 0.6 millimeters and 0.8 millimeters.

Clause 115. The foam article of clause 110, wherein the energy efficiency of the foamed component is between 70 percent and 80 percent.

Clause 116. The foam article of clause 111, wherein the foam article is a cushioning element in the form of a midsole for an article of footwear.

Clause 117. The foam article of clause 116, further comprising an outsole and a strobel coupled to the midsole.

Clause 118. The foam article of clause 117, wherein the energy efficiency of the combined midsole, outsole and strobel is between 65 percent and 75 percent.

Clause 119. The foam article according to any one of clauses 109-118, wherein the foam component comprises a thermoplastic elastomeric composition according to any one of clauses 1-53, a thermoplastic elastomeric composition comprising a thermoplastic polyester homopolymer, a thermoplastic elastomeric composition comprising a thermoplastic copolyester having two different types of polyester monomeric segments, or a combination thereof.

Clause 120. A foam article, comprising: a foamed component having a ratio of energy efficiency to energy intensity (EE/EI) greater than 1.5.

Clause 121. The foam article of clause 120, wherein the foamed component has an EE/EI greater than 1.7.

Clause 122. The foam article of clause 121, wherein the foamed component is a midsole.

Clause 123. The foam article of clause 120, further comprising an outsole and a strobel coupled to the midsole.

Clause 124. The foam article according to any one of clauses 120-123, wherein the foamed component comprises: a thermoplastic elastomeric composition according to any one of clauses 1-53, a thermoplastic elastomeric composition comprising a thermoplastic polyester homopolymer, a thermoplastic elastomeric composition comprising a thermoplastic copolyester having two different types of polyester monomeric segments, or a combination thereof.

Clause 125. A foam article, comprising: a foamed component having a ratio of energy efficiency to the product of energy intensity and density (EE/EI*$\rho$) value greater than 7.

Clause 126. The foam article of clause 125, wherein the foamed component has an EE/EI*$\rho$ value greater than 9.

Clause 127. The foam article of clause 125, wherein the foamed component is a midsole.

Clause 128. The foam article of clause 127, further comprising an outsole and a strobel coupled to the midsole.

Clause 129. The foam article according to any one of clauses 125-128, wherein the foamed component comprises a thermoplastic elastomeric composition according to any one of clauses 1-53, a thermoplastic elastomeric composition comprising a thermoplastic polyester homopolymer, a thermoplastic elastomeric composition comprising a thermoplastic copolyester having two different types of polyester monomeric segments, or a combination thereof.

Clause 130. A midsole for an article of footwear, comprising: a foam component, the component comprising a profile defined by an outer side wall, the component having a top surface and a bottom surface, the component having a toe area, mid-foot area and heel area, wherein the outer side wall in the toe area has opposed curves each having a curve apex, and wherein a line intersecting the opposing curve apexes represents an intersection axis; and the component further comprising a first injection gate vestige on a first side of the intersection axis and a second injection gate vestige on a second side of the intersection axis, wherein foam from the first injection gate vestige and foam from the second injection gate vestige form a flow boundary; and wherein the flow boundary intersects the intersection axis at two locations.

Clause 131. The midsole for an article of footwear of clause 130, wherein the flow boundary is nearer the second injection gate vestige than the first injection gate vestige.

Clause 132. The midsole for an article of footwear of clause 131, wherein the article of footwear has a toe end, and wherein the first injection gate vestige is nearer the toe end than the second injection gate vestige.

Clause 133. The midsole for an article of footwear according to any one of clauses 130-132, wherein the midsole for an article of footwear comprises a thermoplastic elastomeric composition according to any one of clauses 1-53, a thermoplastic elastomeric composition comprising a thermoplastic polyester homopolymer, a thermoplastic elastomeric composition comprising a thermoplastic copolyester having two different types of polyester monomeric segments, or a combination thereof.

Clause 134. A foam article, comprising: a foamed component having a ratio of energy return to energy intensity (ER/EI) greater than 9,500.

Clause 135. The foam article of clause 134, wherein the foamed component has an ER/EI greater than 10,000.

Clause 136. The foam article of clause 134, wherein the foamed component is a midsole.

Clause 137. The foam article of clause 136, further comprising an outsole and a strobel coupled to the midsole.

Clause 138. A foam article, comprising: a foam component having a ratio of energy return to the product of energy intensity and density (ER/(EI*$\rho$)) value greater than 45,000.

Clause 139. The foam article of clause 138, wherein the foam component has an EE/(EI*$\rho$) value greater than 50,000.

Clause 140. The foam article of clause 138, wherein the foam component is a midsole.

Clause 141. The foam article of clause 140, further comprising an outsole and a strobel coupled to the midsole.

Clause 142. The foam article according to any one of clauses 138-140, wherein the foam component comprises a thermoplastic elastomeric composition according to any one of clauses 1-53, a thermoplastic elastomeric composition comprising a thermoplastic polyester homopolymer, a thermoplastic elastomeric composition comprising a thermoplastic copolyester having two different types of polyester monomeric segments, or a combination thereof.

Clause 143. A method for making a foam article, the method comprising: forming a mixture of molten thermoplastic elastomer composition and a foaming agent; injecting the mixture into a mold cavity; causing a foaming of said mixture to form a foam article having a microcellular foam structure; and removing the foam article from the mold cavity.

Clause 144. The method of clause 143, wherein the injection step comprises injecting the mixture through a plurality of injection gates.

Clause 144.1. The method of clause 143, wherein the injection step comprises injecting the mixture through a single injection gate.

Clause 145. The method of clause 144, wherein the foam article has an article volume comprising a plurality of sub-volumes, the method further comprising determining an aspect ratio for each of the plurality of sub-volumes, the method further comprising designing the mold cavity such that the aspect ratio for each of the plurality of sub-volumes is greater than 2.7.

Clause 146. The method of clause 145, further comprising designing the mold cavity such that the aspect ratio for each of the plurality of sub-volumes is greater than 3.0.

Clause 147. The method of clause 146, further comprising designing the mold cavity such that the aspect ratio for each of the plurality of sub-volumes is greater than 2.7.

Clause 148. A foam article, made by a process comprising the steps of any of clauses 143-146.

Clause 149. The foam article according to clause 148, wherein the thermoplastic elastomer composition comprises: a thermoplastic elastomeric composition according to any one of clauses 1-53, a thermoplastic elastomeric composition comprising a thermoplastic polyester homopolymer, a thermoplastic elastomeric composition comprising a thermoplastic copolyester having two different types of polyester monomeric segments, or a combination thereof.

Clause 150. A midsole, made by a process comprising the steps of any of clauses 143-149.

Clause 151. The midsole according to clause 150, wherein the thermoplastic elastomer composition comprises: a thermoplastic elastomeric composition according to any one of clauses 1-53, a thermoplastic elastomeric composition comprising a thermoplastic polyester homopolymer, a thermoplastic elastomeric composition comprising a thermoplastic copolyester having two different types of polyester monomeric segments, or a combination thereof.

Clause 152. A method for making a foam article, the method comprising: forming a mixture of molten thermoplastic elastomer composition and a foaming agent; injecting the mixture into a mold cavity through a plurality of injection gates; foaming the molten polymeric material thereby forming a foam article having a microcellular foam structure; and removing the foam article from the mold cavity.

Clause 153. The method of clause 152, further comprising forming a gate vestige for each of the plurality of injection gates during the foaming step.

Clause 154. The method of clause 153, further comprising designing the mold with an axis formed by a first gate vestige of the plurality of gate vestiges and a second gate vestige of the plurality of gate vestiges, and at least a third gate vestige of the plurality of gate vestiges offset from the gate vestige axis.

Clause 155. The method of clause 154, further comprising designing the mold with at least a fourth gate vestige of the plurality of vestiges offset from the gate vestige axis.

Clause 156. The method of clause 155, further comprising designing the mold with the third gate vestige and the fourth gate vestige orthogonal to the gate vestige axis.

Clause 157. A foam article, made by a process comprising the steps of any of clauses 152-156.

Clause 158. The foam article according to clause 157, wherein the thermoplastic elastomer composition comprises: a thermoplastic elastomeric composition according to any one of clauses 1-53, a thermoplastic elastomeric composition comprising a thermoplastic polyester homopolymer, a thermoplastic elastomeric composition comprising a thermoplastic copolyester having two different types of polyester monomeric segments, or a combination thereof.

Clause 159. A midsole, made by a process comprising the steps of any of clauses 152-157.

Clause 160. The midsole according to clause 159, wherein the thermoplastic elastomer composition comprises: a thermoplastic elastomeric composition according to any one of clauses 1-53, a thermoplastic elastomeric composition comprising a thermoplastic polyester homopolymer, a thermoplastic elastomeric composition comprising a thermoplastic copolyester having two different types of polyester monomeric segments, or a combination thereof.

Clause 161. A method for making a foam article, the method comprising: forming a mixture of molten thermoplastic elastomer composition and a foaming agent; injecting the mixture into a mold cavity through a plurality of injection gates; foaming the molten polymeric material thereby forming a foam article having an interior microcellular foam structure with a closed surface skin with a thickness of between 0.3 millimeters and 1.0 millimeters; and removing the foam article from the mold cavity.

Clause 162. A foam article, made by a process comprising the steps of clause 161.

Clause 163. The foam article according to clause 162, wherein the thermoplastic elastomer composition comprises: a thermoplastic elastomeric composition according to any one of clauses 1-53, a thermoplastic elastomeric composition comprising a thermoplastic polyester homopolymer, a thermoplastic elastomeric composition comprising a thermoplastic copolyester having two different types of polyester monomeric segments, or a combination thereof.

Clause 164. A midsole, made by a process comprising the steps of clause 161.

Clause 165. The midsole according to clause 164, wherein the thermoplastic elastomer composition comprises: a thermoplastic elastomeric composition according to any one of clauses 1-53, a thermoplastic elastomeric composition comprising a thermoplastic polyester homopolymer, a thermoplastic elastomeric composition comprising a thermoplastic copolyester having two different types of polyester monomeric segments, or a combination thereof.

Clause 166. An article of footwear comprising a foam article according to any one of clauses 54-129, 134-142, 157-158, 162-163.

Clause 167. A method of manufacturing a foamed polymer article, the method comprising: grinding recycled thermoplastic polyester elastomer composition into a ground recyclate material; mixing a metered amount of the ground recyclate material and a virgin polymer material of virgin thermoplastic polyester elastomer composition into a mixed batch, the metered amount being about 20% by mass or less of a total mass of the mixed batch; melting the ground recyclate material and the virgin polymer material into a polymer melt composition; adding a physical foaming agent to the polymer melt composition; injecting the polymer melt composition with the physical foaming agent into an internal cavity of a mold tool; activating the physical foaming agent such that the physical foaming agent causes the polymer melt composition to expand and fill the internal cavity of the mold tool to form the foamed polymer article; and removing the formed foamed polymer article from the mold tool.

Clause 167. The method of clause 166, wherein the recycled thermoplastic polyester elastomer composition includes scrap material recovered from an extruded batch of un-foamed thermoplastic polyester elastomer composition or scrap material recovered from an injection molded batch of foamed thermoplastic polyester elastomer composition, or both.

Clause 168. The method of clauses 166 or 167, wherein the recycled thermoplastic polyester elastomer composition is derived from one or more reactants comprising a poly(alkylene oxide)diol material or an aromatic dicarboxylic acid material, or both.

Clause 169. The method of any one of clauses 166 to 168, wherein the physical foaming agent is added by injecting the physical foaming agent into the polymer melt composition while the polymer melt composition is contained in an injection barrel of an injection molding system.

Clause 170. The method of any one of clauses 166 to 169, wherein the physical foaming agent includes a super critical fluid comprising a supercritical nitrogen or a supercritical carbon dioxide, or both.

Clause 171. The method of any one of clauses 166 to 170, wherein the mixed batch of the ground recyclate material and the virgin polymer material has a set point temperature ranging from about 150° C. to about 265° C.

Clause 172. The method of any one of clauses 166 to 171, wherein the mixed batch of the ground recyclate material and the virgin polymer material has an average peak crystallization temperature ranging from about 90° C. to about 190° C.

Clause 173. The method of any one of clauses 166 to 172, wherein the formed foamed polymer article has a cell size average of about 0.1 mm to about 2.0 mm.

Clause 174. The method of any one of clauses 166 to 173, wherein the formed foamed polymer article has: a ratio of energy efficiency to energy intensity that is greater than about 1.3; a ratio of energy efficiency to the product of energy intensity and density that is greater than about 5.9; a ratio of energy return to energy intensity that is greater than about 7,225; and/or a ratio of energy return to the product of energy intensity and density that is greater than about 38,250.

Clause 175. The method of any one of clauses 166 to 174, wherein the recycled thermoplastic polyester elastomer has a weight average molecular weight ranging from about 50,000 Daltons to about 200,000 Daltons.

Clause 176. The method of any one of clauses 166 to 175, wherein adding the physical foaming agent to the polymer melt composition includes dissolving a supercritical fluid into the polymer melt composition under pressure to form a single-phase solution (SPS).

Clause 177. The method of clause 176, wherein activating the physical foaming agent includes releasing the pressure to expand the supercritical fluid.

Clause 178. The method of any one of clauses 166 to 177, further comprising receiving a recyclate batch of the recycled thermoplastic polyester elastomer composition.

Clause 179. The method of clause 178, wherein receiving the recyclate batch includes obtaining, from a sprue, a runner, and/or a gate of an injection molding system, scrap segments of a prior-foamed polymer article formed from a prior mixed batch of the ground recyclate material and the virgin polymer material.

Clause 180. The method of any one of clauses 166 to 179, wherein the ground recyclate material has an irregular shape with a major length that is about 1 mm to about 10 mm, and the virgin polymer material has a pellet size of about 1 mm to about 10 mm.

Clause 181. The method of any one of clauses 166 to 180, wherein melting the ground recyclate material and the virgin polymer material includes melting the mixed batch into the polymer melt composition.

Clause 182. A method of manufacturing a foamed polymer article, the method comprising: grinding a recyclate batch of recycled thermoplastic polyester elastomer composition into a ground recyclate material; combining a metered amount of the ground recyclate material and a virgin polymer material of virgin thermoplastic polyester elastomer composition into a mixed batch; melting the ground recyclate material and the virgin polymer material into a polymer melt composition; adding a physical foaming agent to the polymer melt composition; injecting the polymer melt composition with the physical foaming agent into an internal cavity of a mold tool; activating the physical foaming agent such that the physical foaming agent causes the polymer melt composition to expand and fill the internal cavity of the mold tool to form the foamed polymer article; and removing the formed foamed polymer article from the mold tool, wherein the formed foamed polymer article has: a ratio of energy efficiency to energy intensity that is greater than about 1.3; a ratio of energy efficiency to the product of energy intensity and density that is greater than about 5.9; a ratio of energy return to energy intensity that is greater than about 7,225; and/or a ratio of energy return to the product of energy intensity and density that is greater than about 38,250.

Clause 183. A method of producing a foamed polymer article, the method comprising: injecting a mixed thermoplastic resin into a mold, the mixed thermoplastic resin comprising a mixture of a virgin thermoplastic composition resin and a recycled thermoplastic composition resin; and foaming the mixed thermoplastic composition resin within an internal mold cavity of a molding system to form the foamed polymer article, wherein a mass of the recycled thermoplastic composition resin within the mixed thermoplastic composition resin is at least about 20% by mass of a total mass of the mixed thermoplastic composition resin.

Clause 184. A method of manufacturing a foamed polymer article, the method comprising: adding a physical foaming agent to a polymer melt composition, the polymer melt composition including a blend of a recyclate polymer material and a virgin polymer material of virgin thermoplastic polyester elastomer composition, the recyclate polymer material being about 20% by mass or less of a total mass of the polymer melt composition; injecting the polymer melt composition with the physical foaming agent into an internal cavity of a mold tool; activating the physical foaming agent such that the physical foaming agent causes the polymer melt composition to expand and fill the internal cavity of the mold tool to form the foamed polymer article; and removing the formed foamed polymer article from the mold tool.

Clause 185. A method of producing a foamed sole component of a shoe, the method comprising: injecting a mixed thermoplastic composition resin into a mold, the mixed thermoplastic composition resin comprising a mixture of a virgin thermoplastic composition resin and a recycled thermoplastic composition resin, and the mold comprising a sole cavity portion fluidly coupled to a filling portion; and foaming the mixed thermoplastic composition resin within the sole cavity portion to form the foamed sole component of the shoe, wherein a mass of the recycled thermoplastic composition resin within the sole cavity portion is greater than or equal to a mass of the mixed thermoplastic composition resin within the filling portion.

Clause 186. The method of clause 185, further comprising: regrinding, prior to injecting the mixed thermoplastic composition resin into the mold, a prior-foamed shot of the mixed thermoplastic composition resin retrieved from the filling portion to form the recycled thermoplastic composition resin; and mixing the recycled thermoplastic composition resin with the virgin thermoplastic composition resin to form the mixed thermoplastic composition resin.

Clause 187. The method of clauses 185 or 186, wherein the foamed sole component has an energy return measurement that is within a predefined tolerance of an energy return measurement of a comparable shoe sole component formed solely from the virgin thermoplastic composition resin.

Clause 188. The method of clause 187, wherein the predefined tolerance is about 75% to about 99% of the energy return measurement of the comparable shoe sole component, the foamed sole component and the comparable shoe sole component sharing a comparable shape, size, and/or method of molding.

Clause 189. The method of any one of clauses 186 to 188, wherein a percent by mass of the recycled thermoplastic composition resin within the mixed thermoplastic composition resin is between about 1% and about 20%.

Clause 190. The method of any one of clauses 185 to 189, wherein foaming the mixed thermoplastic composition resin comprises: dissolving a supercritical fluid into the mixed thermoplastic resin under pressure to form an SPS; and venting, after dissolving the supercritical fluid, the pressure to release the supercritical fluid from the SPS.

Clause 191. The method of any one of clauses 185 to 190, wherein the filling portion of the mold comprises at least one cold runner.

Clause 192. The method of clause 191, wherein the mold further comprises at least one hot runner.

Clause 193. The method of any one of clauses 185 to 192, wherein the filling portion includes one or more channels that direct a flow of the mixed thermoplastic composition resin from a nozzle or hot runner of an injection molding apparatus to the sole cavity portion of the mold.

Clause 194. The method of any one of clauses 185 to 193, wherein the mass of the recycled thermoplastic composition resin within the sole cavity portion is approximately equal to the mass of the mixed thermoplastic composition resin within the filling portion.

Clause 195. The method of any one of clauses 185 to 194, wherein the virgin thermoplastic composition resin comprises a thermoplastic polyester elastomer composition.

Clause 196. An article of footwear comprising: an upper configured to receive a foot of a user; and a sole structure attached to the upper and configured to support thereon the foot of the user, the sole structure defining a ground-engaging portion of the footwear, the sole structure including a foamed sole component, wherein the foamed sole component includes a recyclate material of recycled thermoplastic polyester elastomer composition and a virgin material of virgin thermoplastic polyester elastomer composition, the recyclate material being about 20% by mass or less of a total mass of the foamed sole component.

Clause 197. The article of footwear of clause 196, wherein the recycled thermoplastic polyester elastomer composition includes scrap material recovered from an extruded batch of un-foamed thermoplastic polyester elastomer composition or scrap material recovered from an injection molded batch of foamed thermoplastic polyester elastomer composition, or both.

Clause 198. The article of footwear of clauses 196 or 197, wherein the recycled thermoplastic polyester elastomer composition is derived from one or more reactants comprising a poly(alkylene oxide)diol material or an aromatic dicarboxylic acid material, or both.

Clause 199. The article of footwear of any one of clauses 196 to 198, wherein the foamed sole component has a cell size average of about 0.18 mm to about 0.58 mm.

Clause 200. The article of footwear of any one of clauses 196 to 199, wherein the foamed sole component has: a ratio of energy efficiency to energy intensity that is greater than about 1.3; a ratio of energy efficiency to the product of energy intensity and density that is greater than about 5.9; a ratio of energy return to energy intensity that is greater than about 7,225; and/or a ratio of energy return to the product of energy intensity and density that is greater than about 38,250.

Clause 201. The article of footwear of any one of clauses 196 to 200, wherein the recycled thermoplastic polyester elastomer has a weight average molecular weight ranging from about 50,000 Daltons to about 200,000 Daltons.

Clause 202. The article of footwear of any one of clauses 196 to 201, wherein the recycled thermoplastic polyester elastomer is a block copolymer, a segmented copolymer, a random copolymer, and/or condensation copolymer having a weight average molecular weight of about 50,000 Daltons to about 200,000 Daltons.

Clause 203. An article of footwear comprising: an upper configured to receive a foot of a user; and a sole structure attached to the upper and configured to support thereon the foot of the user, the sole structure defining a ground-engaging portion of the footwear, the sole structure including a foamed sole component, wherein the foamed sole component has a melting temperature of at least about 190° C. and an average peak crystallization temperature of at least about 135° C.

Clause 204. A method of producing foamed polymer articles, comprising: forming a run of the foamed polymer articles having an average article mass $m_{AA}$ of the foamed polymer articles per run and an article defect rate $\dot{D}_A$ per run; retrieving a batch of a manufacturing byproduct incidental to the run of the foamed polymer articles, the manufacturing byproduct having an average byproduct mass $m_{AB}$ per run; and retrieving a lot of defective articles incidental to the run of the foamed polymer articles, the defective articles having an average defect mass $m_{AD}$ per run, wherein the average defect mass $m_{AD}$ is the mathematical product of the article defect rate $\dot{D}_A$ and the average article mass $m_{AA}$, and wherein $(m_{AB}+m_{AD})/m_{AA} \leq 0.2$.

Clause 205. The method of clause 204, wherein forming the run of the foamed polymer articles includes molding a first run of a first number of first polymer articles having a first shape and size, and molding a second run of a second number of second polymer articles having a second shape and size distinct in shape and/or size from the first polymer articles.

Clause 206. The method of clause 205, wherein the average article mass $m_{AA}$ includes a first average article mass $m_{AA-1}$ per run for the first run of the first polymer articles and a second average article mass $m_{AA-2}$ per run for the second run of the second polymer articles.

Clause 207. The method of clauses 205 or 206, wherein the article defect rate $\dot{D}_A$ per run includes a first article defect rate $\dot{D}_{A-1}$ per run for the first run of the first polymer articles and a second article defect rate $\dot{D}_{A-2}$ per run for the second run of the second polymer articles.

Clause 208. The method of any one of clauses 205 to 207, wherein the average byproduct mass $m_{AB}$ includes a first average byproduct mass $m_{AB-1}$ incidental to the first run and a second average byproduct mass $m_{AB-2}$ incidental to the second run.

Clause 209. The method of any one of clauses 205 to 208, wherein the average byproduct mass $m_{AB}$ is a mathematical sum of: (1) a first byproduct mass $m_{B-1}$ incidental to the first run divided by the first number of the first polymer articles; and (2) a second byproduct mass $m_{B-2}$ incidental to the second run divided by the second number of the second polymer articles.

Clause 210. The method of any one of clauses 205 to 209, wherein the average defect mass $m_{AD}$ includes a first average defect mass $m_{AD-1}$ incidental to the first run and a second average defect mass $m_{AD-1}$ incidental to the second run.

Clause 211. The method of any one of clauses 205 to 210, wherein forming the run of the foamed polymer articles includes injection molding the foamed polymer articles using a tooling assembly, and wherein the average byproduct mass $m_{AB}$ per run includes a first average byproduct mass $m_{AB'}$ of the manufacturing byproduct upstream from the tooling assembly and a second average byproduct mass $m_{AB''}$ of the manufacturing byproduct downstream from the tooling assembly.

Clause 212. The method of any one of clauses 205 to 211, further comprising forming a second run of the foamed polymer articles utilizing at least a portion of the batch of manufacturing byproduct and/or at least a portion of the lot of defective articles.

What is claimed is:

1. A foam article for a component of footwear, the foam article comprising:
    an outer surface comprising a plurality of injection gate vestiges; and
    a foam article volume comprising a plurality of sub-volumes, each sub-volume being associated with one of the plurality of injection gate vestiges;
    wherein an aspect ratio for each of the plurality of sub-volumes is greater than 2.7.

2. The foam article of claim 1, wherein a first gate vestige and a second gate vestige of the plurality of injection gate vestiges define a gate vestige axis, and at least a third gate vestige of the plurality of injection gate vestiges is offset from the gate vestige axis.

3. The foam article of claim 2, wherein the plurality of injection gate vestiges further comprises a fourth gate vestige that is offset from the gate vestige axis.

4. The foam article of claim 3, wherein the third gate vestige and the fourth gate vestige are orthogonal to the gate vestige axis.

5. The foam article of claim 1, wherein the foam article volume comprises an interior microcellular foam structure and the outer surface comprises a closed surface skin with a thickness of between 0.3 millimeters and 1.0 millimeters.

6. The foam article of claim 1, wherein the foam article is formed by:
    forming a mixture of molten thermoplastic elastomer composition and a foaming agent;
    injecting the mixture into a mold cavity through a plurality of injection gates;
    causing a foaming of said mixture to form the foam article with a microcellular foam structure; and
    removing the foam article from the mold cavity.

7. The foam article of claim 6, wherein each of the plurality of injection gate vestiges is associated with one of each of the plurality of injection gates, and the plurality of gate vestiges is formed during the caused foaming.

8. The foam article of claim 7, wherein each of the sub-volumes is substantially formed from the mixture injected through its corresponding injection gate.

9. A method for making a foam article for a component of footwear, the method comprising:
    forming a mixture of molten thermoplastic elastomer composition and a foaming agent;
    injecting the mixture into a mold cavity of a mold comprising a plurality of injection gates;
    causing a foaming of said mixture to form a foam article having a microcellular foam structure; and
    removing the foam article from the mold cavity;
    wherein:
        the foam article comprises a volume having a plurality of sub-volumes, with each sub-volume being associated with one of the plurality of injection gates; and
        each sub-volume has an aspect ratio of greater than 2.7.

10. The method of claim 9, wherein the injection step comprises injecting the mixture through the plurality of injection gates.

11. The method of claim 10, wherein each of the sub-volumes is substantially formed from the mixture injected through its corresponding injection gate.

12. The method of claim 9, further comprising forming a gate vestige for each of the plurality of injection gates during the caused foaming.

13. The method of claim 8, wherein the causing the foaming the molten polymeric material further comprises forming a foam article with an interior microcellular foam structure with a closed surface skin with a thickness of between 0.3 millimeters and 1.0 millimeters.

14. A method for making a foam article for a component of footwear, the method comprising:
    forming a mixture of molten thermoplastic elastomer composition and a foaming agent;
    injecting the mixture into a mold cavity of a mold, the mold comprising a plurality of injection gates, including a first injection gate and second injection gate defining an injection gate axis, and at least a third injection gate offset from the injection gate axis;
    causing a foaming of said mixture to form a foam article having a microcellular foam structure; and
    removing the foam article from the mold cavity.

15. The method of claim 14, wherein the injection step comprises injecting the mixture through the plurality of injection gates.

16. The method of claim 15 further comprising forming a gate vestige for each of the plurality of injection gates during the caused foaming.

17. The method of claim 14, wherein the mold further comprises at least a fourth injection gate offset from the injection gate axis.

18. The method of claim 17, wherein the third injection gate and the fourth injection gate are orthogonal to the injection gate axis.

19. The method of claim 14, wherein the causing the foaming the molten polymeric material further comprises forming a foam article with an interior microcellular foam structure with a closed surface skin with a thickness of between 0.3 millimeters and 1.0 millimeters.

20. The method of claim 15, wherein the foam article comprises a volume having a plurality of sub-volumes, with each sub-volume being associated with one of the plurality of injection gates;

wherein each sub-volume has an aspect ratio of greater than 2.7.

* * * * *

UNITED STATES PATENT AND TRADEMARK OFFICE
CERTIFICATE OF CORRECTION

| | |
|---|---|
| PATENT NO. | : 12,031,007 B2 |
| APPLICATION NO. | : 18/203289 |
| DATED | : July 9, 2024 |
| INVENTOR(S) | : Paul Irving Archer et al. |

It is certified that error appears in the above-identified patent and that said Letters Patent is hereby corrected as shown below:

On the Title Page

Page 3, Column 2, Line 15, Other Publications, NPL:
In the line reading "1 Notice of Allowance received for U.S. Appl. No. 17/195,067," should read --Notice of Allowance received for U.S. Appl. No. 17/195,067,--.

In the Specification

Column 7, Line 67:
In the line reading "the attached drawing FIGURES, wherein:" should read --the attached drawing figures, wherein:--.

Column 10, Line 66:
In the line reading "by an ankle opening 112 located near atop portion of the" should read --by an ankle opening 112 located near a top portion of the--.

Column 15, Line 45:
In the line reading "defect areas is shown under A in table J of FIG. 14. The table" should read --defect areas is shown under Δ in table J of FIG. 14. The table--.

Column 15, Line 48:
In the line reading "(shown under S in table J) and overall defect area (A)" should read --(shown under δ in table J) and overall defect area (Δ)--.

Column 15, Line 51:
In the line reading "in the largest defect size S and overall defect area A when the" should read --in the largest defect size δ and overall defect area Δ when the--.

Column 37, Line 8 (Approx.):
In the line reading "Weight of the sample in air (g) -" should read --Weight of sample in air (g) - --.

Signed and Sealed this
Twenty-fifth Day of February, 2025

Coke Morgan Stewart
*Acting Director of the United States Patent and Trademark Office*

Column 37, Line 9 (Approx.):
In the line reading "Weight of the sample in water (g)" should read --Weight of sample in water (g)--.

Column 47, Line 20:
In the line reading "and an average article defect rate $D_A$ (e.g., ratio of total" should read --and an average article defect rate $\dot{D}_A$ (e.g., ratio of total--.

Column 48, Line 49:
In the line reading "$m_{AA}$, or $m_{AD}$ $\dot{D}_A{}^{*m}{}_{AA}$. For implementations that execute" should read --$m_{AA}$, or $m_{AD} = \dot{D}_A * {}_{mAA}$. For implementations that execute--.

Column 50, Lines 21-22:
In the lines reading "respect to the examples provided in the FIGURES. Additional aspects of the disclosure will now be described that" should read --respect to the examples provided in the figures. Additional aspects of the disclosure will now be described that--.

Column 50, Line 28:
In the line reading "include features illustrated by the FIGURES, features not" should read --include features illustrated by the figures, features not--.

Column 50, Line 29:
In the line reading "illustrated by the FIGURES, and any combination thereof." should read --illustrated by the figures, and any combination thereof.--.

Column 51, Line 31:
In the line reading "made to elements depicted by the FIGURES for illustrative" should read --made to elements depicted by the figures for illustrative--.